(12) United States Patent
Karam

(10) Patent No.: US 11,762,189 B2
(45) Date of Patent: Sep. 19, 2023

(54) LIQUID LENSES

(71) Applicant: CORNING INCORPORATED, Corning, NY (US)

(72) Inventor: Raymond Miller Karam, Santa Barbara, CA (US)

(73) Assignee: CORNING INCORPORATED, Corning, NY (US)

( * ) Notice: Subject to any disclaimer, the term of this patent is extended or adjusted under 35 U.S.C. 154(b) by 666 days.

(21) Appl. No.: 16/642,693

(22) PCT Filed: Aug. 31, 2018

(86) PCT No.: PCT/US2018/049092
§ 371 (c)(1),
(2) Date: Feb. 27, 2020

(87) PCT Pub. No.: WO2019/046718
PCT Pub. Date: Mar. 7, 2019

(65) Prior Publication Data
US 2020/0192080 A1 Jun. 18, 2020

Related U.S. Application Data

(60) Provisional application No. 62/553,466, filed on Sep. 1, 2017.

(51) Int. Cl.
*G02B 26/00* (2006.01)
*G02B 3/14* (2006.01)
*G02B 27/64* (2006.01)

(52) U.S. Cl.
CPC ............. *G02B 26/005* (2013.01); *G02B 3/14* (2013.01); *G02B 27/646* (2013.01)

(58) Field of Classification Search
CPC ...... G02B 3/14; G02B 26/005; G02B 26/004; G02B 27/646; G02B 13/0075; G02B 3/12;
(Continued)

(56) References Cited

U.S. PATENT DOCUMENTS 6,072,976 A * 6/2000 Kuriyama ............ G03G 15/162
399/302
8,390,934 B2 3/2013 Kong et al.
(Continued)

FOREIGN PATENT DOCUMENTS

DE 102014104026 B3 8/2015
EP 2070468 A1 6/2009
EP 2071367 A1 6/2009

OTHER PUBLICATIONS

Invitation To Pay Additional Fees of the International Searching Authority; PCT/US2018/049092; dated Dec. 12, 2018; 12 Pages; European Patent Office.
(Continued)

*Primary Examiner* — Brandi N Thomas
(74) *Attorney, Agent, or Firm* — Tamika A. Crawl-Bey

(57) ABSTRACT

A liquid lens can have a chamber configured to improve the performance of the liquid lens, such as by improving the tilt response time and/or by reducing optical aberrations. The chamber can have sidewalls that conform to a shape of a truncated cone. The cone angle, and wide end diameter, and narrow end diameter can be selected by balancing competing factors. The liquid lens can include two fluids, and the fluid fill ratio can be selected to improve the performance of the liquid lens. In some embodiments, the sidewalls can conform to a portion of a sphere.

18 Claims, 29 Drawing Sheets

(58) Field of Classification Search
CPC .......... G02B 27/0068; G02B 2207/115; G02B 27/0927; G02B 27/0955; G02B 30/27; G02B 7/028; G02B 7/09; G02B 9/34; G02B 1/06; G02B 7/28; G02B 30/28; G02B 3/00; G02B 30/25; G02B 5/003; G02B 7/04; G02B 1/043; G02B 2027/0178; G02B 2027/0187; G02B 23/14; G02B 23/243; G02B 26/02; G02B 27/017; G02B 27/0172; G02B 3/0006; G02B 30/00; G02B 7/02; G02B 7/021; G02B 1/04; G02B 13/06; G02B 13/12; G02B 15/00; G02B 21/025; G02B 21/22; G02B 23/24; G02B 23/2407; G02B 23/2423; G02B 23/2438; G02B 26/06; G02B 26/0891; G02B 26/12; G02B 27/0006; G02B 27/0075; G02B 27/10; G02B 27/286; G02B 3/005; G02B 3/0056; G02B 3/0062; G02B 3/08; G02B 30/10; G02B 30/30; G02B 30/36; G02B 5/10; G02B 5/3083; G02B 6/3524; G02B 6/3528; G02B 7/285; G02B 9/50; A61B 1/0019; A61B 3/14; A61B 1/00011; A61B 1/00034; A61B 1/00036; A61B 1/00042; A61B 1/00052; A61B 1/0011; A61B 1/00186; A61B 1/0684; A61B 1/128; A61B 1/227; A61B 1/233; A61B 1/267; A61B 1/303; A61B 1/31; A61B 2090/061; A61B 2090/309; A61B 2090/3612; A61B 2090/363; A61B 2090/372; A61B 2090/373; A61B 2090/3937; A61B 2560/0214; A61B 2560/0431; A61B 2560/0493; A61B 2562/146; A61B 2562/227; A61B 2576/00; A61B 3/0025; A61B 3/1208; A61B 5/0077; A61B 5/441; A61B 5/6898; A61B 90/20; A61B 90/30; A61B 90/361; A61B 1/24; A61B 1/04; A61B 1/00057; A61B 1/00096; A61B 1/00101; A61B 1/00108; A61B 1/00126; A61B 1/00163; A61B 1/00181; A61B 1/00193; A61B 1/042; A61B 1/045; A61B 1/051; A61B 1/0625; A61B 1/0669; A61B 1/0692; A61B 1/07; A61B 1/247; A61B 3/12; A61B 5/0088; A61B 5/1076; A61B 5/726; G02F 1/13306; G02F 1/294; G02F 1/134309; G02F 1/29; G02F 2203/28; G02F 1/13718; G02F 1/13756; G02F 1/13; G02F 1/133371; G02F 1/133526; G02F 1/1343; G02F 1/1326; G02F 1/133711; G02F 1/134381; G02F 1/13471; G02F 1/13781; G02F 2201/124; G02F 1/1323; G02F 1/1333; G02F 1/133377; G02F 1/13345; G02F 1/13363; G02F 1/1337; G02F 1/1339; G02F 1/13394; G02F 1/13396; G02F 1/13398; G02F 1/13439; G02F 1/135; G02F 2202/40; G02F 2203/06; G02F 2203/07

See application file for complete search history.

(56) References Cited

U.S. PATENT DOCUMENTS

| | | | |
|---|---|---|---|
| 8,400,558 | B2 | 3/2013 | Berge et al. |
| 9,201,174 | B2 | 12/2015 | Karam et al. |
| 9,703,115 | B2 | 7/2017 | Schneider |
| 2006/0152814 | A1 | 7/2006 | Peseux |
| 2007/0063048 | A1 | 3/2007 | Havens et al. |
| 2008/0316611 | A1 | 12/2008 | Berge |
| 2012/0113525 | A1* | 5/2012 | Kong .................. G02B 26/004 359/665 |
| 2013/0114120 | A1 | 5/2013 | Jung et al. |

OTHER PUBLICATIONS

Berry et al; "Fluidic Microoptics With Adjustable Focusing and Beam Steering for Single Cell Optogenetics"; Optics Express, vol. 25, No. 14 (2017), 16 PAGES.

International Search Report and Written Opinion of the International Searching Authority; PCT/US2018/049092; dated Mar. 20, 2019; 22 Pages; European Patent Office.

Simon et al; "Optical Design Rules of a Camera Module With a Liquid Lens and Principle of Command for AF and OIS Functions"; Proc. SPIE 7849, Optical Design and Testing IV; (2010) pp. 784903-1-784903-14.

* cited by examiner

US 11,762,189 B2

LIQUID LENSES

CROSS-REFERENCE TO RELATED APPLICATIONS

This application claims the benefit of priority under 35 U.S.C. § 371 of International Application No. PCT/US2018/049092, filed on Aug. 31, 2018, which claims the benefit of priority under 35 U.S.C. § 119 of U.S. Provisional Application No. 62/553,466, filed Sep. 1, 2017, the content of each of which is incorporated herein by reference in its entirety.

INCORPORATION BY REFERENCE

U.S. Pat. No. 9,201,174, issued Dec. 1, 2015, and titled LIQUID LENS ARRAYS, is hereby incorporated by reference in its entirety.

BACKGROUND

Field of the Disclosure

Some embodiments disclosed herein relate to variable focus lenses, such as liquid lenses.

SUMMARY OF CERTAIN EMBODIMENTS

Certain example embodiments are summarized below for illustrative purposes. The embodiments are not limited to the specific implementations recited herein. Embodiments may include several novel features, no single one of which is solely responsible for its desirable attributes or which is essential to the embodiments.

Various embodiments disclosed herein can relate to a variable focus lens, which can include a chamber, a first liquid contained in the chamber, and a second liquid contained in the chamber. The first liquid and the second liquid can be substantially immiscible to form a liquid interface between the first liquid and the second liquid. The liquid lens can have one or more first electrodes, which can be insulated from the first and second liquids. The one or more first electrodes can be disposed at a corresponding one or more locations in the lens (e.g., four electrodes in four quadrants). The liquid lens can include one or more second electrodes in electrical communication with the first liquid. A position of the liquid interface can be variable based at least in part on voltages applied to the electrodes. The liquid lens can include a first window and a second window. The chamber can be disposed between the first window and the second window to transmit light along an optical path that passes through the liquid interface between the first liquid and the second liquid. The chamber can be shaped to enhance performance of the variable focus lens.

The liquid interface can tilt in response to signals delivered to the electrodes so that the optical axis of the liquid interface is angled relative to a structural axis of the variable focus lens by an optical tilt angle. The variable focus lens (e.g., with the liquid interface at 0 diopters) can have a 10% to 90% response time for a transition from an optical tilt angle of 0 degrees to an optical tilt angle of 0.6 degrees (e.g., in response to a step function input) of about 100 ms or faster, about 80 ms or faster, about 70 ms or faster, about 60 ms or faster, about 50 ms or faster, about 40 ms or faster, about 30 ms or faster, about 20 ms or faster, about 10 ms or faster, or at least about 5 ms, or any ranges or values therebetween. The variable focus lens can output light with optical aberrations having a total wavefront error of about 600 nm or less, about 500 nm or less, about 400 nm or less, about 300 nm or less, about 200 nm or less, or at least about 150 nm, or any values or ranges therebetween, as the fluid interface moves between 10% and 90% of the transition from 0 degrees to 0.6 degrees of optical tilt.

The chamber of the variable focus lens can have a height of about 2.0 mm or less, about 1.0 mm or less, about 0.75 mm or less, about 0.6 mm or less, or at least about 0.5 mm, or any values or ranges therebetween. The chamber can include a side wall having a shape of a truncated cone. The side wall can be angled relative to a structural axis of the variable focus lens by about 20 degrees or more, about 25 degrees or more, about 30 degrees or more, about 35 degrees or more, about 40 degrees or more, about 50 degrees or more, about 60 degrees or more, or by 85 degrees or less, or any values or ranges therebetween, The chamber can include a side wall having a shape that substantially conforms to a sphere. A top of the side wall can align with a center of the sphere. The variable focus lens can have a sidewall that has a narrow opening having a first diameter and a wide opening having a second diameter, and the ratio of the second diameter to the first diameter can be between about 4 to 1 and about 1.1 to 1. The ratio of the second diameter to the first diameter can be about 4 to 1, about 3 to 1, about 2 to 1, about 1.75 to 1, about 1.5 to 1, about 1.25 to 1, about 1.2 to 1, about 1.15 to 1, or any values or ranges therebetween.

The variable focus lens of any one of claims 0 to 0, comprising a sidewall that has a narrow opening having a first diameter and a wide opening having a second diameter, wherein the liquid, interface when at 0 diopters and no optical tilt angle has a third diameter, and the ratio of the third diameter to the first diameter can between about 3 to 1 and about 1.05 to 1. The ratio of the third diameter to the first diameter can be about 3 to 1, about 2.5 to 1, about 2 to 1, about 1.75 to 1, about 1.5 to 1, about 1.25 to 1, about 1.2 to 1, about 1.15 to 1, about 1.1 to 1, about 1.05 to 1, about 1.03 to 1, or any values or ranges therebetween.

Various embodiments disclosed herein can relate to a camera system having an image sensor and a the variable focus lens according to various embodiments disclosed herein. The variable focus lens can output light for producing an image via the image sensor. The light output by the variable focus lens can have optical aberrations having a total wavefront error of about 500 nm or less, about 400 nm, about 300 nm or less, about 200 nm or less, about 150 nm or less, during optical tilt, or any values or ranges therebetween. The image sensor can have pixels with a pixel size of 1.4 microns or less, although other pixel sizes can be used, as described herein.

Various embodiments can relate to a liquid lens having a chamber that includes a side wall having a shape of a truncated cone with a narrow end and a wide end. The narrow end of the truncated cone can have a diameter of about 1.5 mm to about 2.2 mm, or about 1.7 mm to about 2.0 mm, or between 1.8 mm to 1.85 mm. The wide end of the truncated cone has a diameter of about 2 mm to about 3 mm, or about 2.25 mm to about 2.75 nun, or about 2.4 mm to about 2.5 mm. The truncated cone can have a cone height of about 400 microns to about 600 microns, or about 450 microns to about 550 microns. The side wall can be angled relative to a structural axis of the truncated cone by a cone angle of about 20 degrees to about 40 degrees, or about 25 degrees to about 35 degrees, or at least about 30 degrees. The liquid lens can have a first liquid contained in the chamber and a second liquid contained in the chamber. The first liquid and the second liquid can be substantially immiscible to form a liquid interface between the first liquid and the second liquid. The liquid lens can have a first window disposed over the wide end of the truncated cone. The first window can be spaced apart from the wide end of the truncated cone by an above-cone height of about 20 microns to about 70 microns, or about 30 microns to about 60 microns, or about 40 microns to about 50 microns. The liquid lens can have a second window disposed under the narrow end of the truncated cone. The chamber can be disposed between the first window and the second window to transmit light along an optical path that intersects the liquid interface, the first window, and the second window. The liquid lens can have a first insulated electrode disposed at a first quadrant in the liquid lens and insulated from the first and second liquids, a second insulated electrode disposed at a second quadrant in the liquid lens and insulated from the first and second liquids, a third insulated electrode disposed at a third quadrant in the liquid lens and insulated from the first and second liquids, a fourth insulated electrode disposed at a fourth quadrant in the liquid lens and insulated from the first and second liquids, in some implementations. The liquid lens can have a common electrode in electrical communication with the first liquid. A position of the liquid interface can be based at least in part on one or more voltages applied to the common electrode and the insulated electrodes. The liquid interface can tilt in response to different voltages applied between the insulated electrodes so that an optical axis of the liquid interface is angled relative to the structural axis by an optical tilt angle.

The liquid lens (e.g., with the liquid interface at 0 diopters or flat) has a 10% to 90% response time for a transition from an optical tilt angle of 0 degrees to an optical tilt angle of 0.6 degrees (e.g., in response to a step function input) of about 100 ms or less, about 75 ms or less, about 60 ms or less, about 50 ms or less, about 40 ms or less, about 30 ms or less, or at least about 25 ms, or any value or ranges therebetween. The liquid lens (e.g., with the liquid interface at 0 diopters or flat) can output light with optical aberrations having a total wavefront error as the liquid interface moves from 0 degrees of optical tilt to 0.6 degrees of optical tilt (e.g., in response to a step function input) of about 500 nm or less, of about 400 nm or less, of about 300 nm or less, or of at least about 250 nm, or any values or ranges therebetween. The liquid lens (e.g., with the liquid interface at 0 diopters or flat) can output light with optical aberrations having a total wavefront error after 25 ms as the liquid interface moves from 0 degrees of optical tilt to 0.6 degrees of optical tilt (e.g., in response to a step function input) of about 400 nm or less, of about 350 nm or less, or about 25 nm or less, or at least about 200 nm, or any values or ranges therebetween. The liquid lens (e.g, with the liquid interface at 0 diopters or flat) can output light with coma optical aberration after 25 ms as the liquid interface moves from 0 degrees of optical tilt to 0.6 degrees of optical tilt (e.g., in response to a step function input) of about 200 nm or less, about 150 nm or less, about 125 nm or less, about 100 nm or less, or at least about 50 nm, or any values or ranges therebetween. The liquid lens (e.g., with the liquid interface at 0 diopters or flat) can output light with trefoil optical aberration after 25 ms as the liquid interface moves from 0 degrees of optical tilt to 0.6 degrees of optical tilt (e.g., in response to a step function input) of about 400 nm or less, about 300 nm or less, about 200 nm or less, or at least about 100 nm, or any ranges or values therebetween.

The first liquid can have a first liquid height and the second liquid can have a second liquid height when the liquid interface is flat. The first liquid height and the second liquid height vary by no more than about 30%, about 20%, about 15%, about 10%, about 5%, about 3%, about 2%, about 1%, or substantially 0%, or any values or ranges therebetween. A ratio between an active portion of the liquid interface and an inactive portion of the liquid interface can be between about 2 to 1 and about 4 to 1, or between about 2.5 to 1 and about 3.5 to 1, when the liquid interface is flat.

Various embodiments disclosed herein can relate to a liquid lens, which can include a chamber forming a cavity having a cavity height that is about 600 microns or less, a first liquid contained in the chamber, and a second liquid contained in the chamber. The first liquid and the second liquid can be substantially immiscible to form a liquid interface between the first liquid and the second liquid. The liquid lens can have a plurality of insulated electrodes that are insulated from the first and second liquids and a common electrode in electrical communication with the first liquid. A position of the liquid interface can be based at least in part on voltages applied to the electrodes. The liquid interface can tilt in response to different voltages applied between the insulated electrodes to produce an optical tilt angle. The liquid lens (e.g., with a liquid interface at 0 diopters or flat) can be configured to output light with optical aberrations having a total wavefront error after 25 ms as the liquid interface moves from 0 degrees of optical tilt to 0.6 degrees of optical tilt (e.g., in response to a step function input) of about 350 nm or less, or of about 325 nm or less, or of about 300 nm or less, or of about 275 nm or less, or of about 250 nm or less, or any ranges or values bounded therein.

The chamber can have a sidewall in a shape of a truncated cone, and the side wall can be angled relative to a structural axis of the truncated cone by a cone angle of at least about 20 degrees, at least about 25 degrees, at least about 30 degrees, or about 40 degrees or less, or any values or ranges therein. The chamber can have a sidewall in a shape of a truncated cone having a wide end and a narrow end. A ratio between a diameter of the wide end and a diameter the narrow end is between about 1 and about 2, or between 1.2 and about 1.5, or any ranges or values therein. The plurality of insulated electrodes can include four insulated electrodes disposed in four respective quadrants in the liquid lens. In some embodiments, the liquid lens can have only four insulated electrodes, which in some cases can be driven independently.

The liquid lens (e.g., having a fluid interface at 0 diopters or a flat shape) can have a 10% to 90% response time for a transition from an optical tilt angle of 0 degrees to an optical tilt angle of 0.6 degrees (e.g., in response to a step function input) between about 20 nm and about 100 ms, or between about 25 ms and about 75 ms, or between about 50 ms and about 70 ms, or any value or ranges between any of these values. The liquid lens can output light with optical aberrations having a total wavefront error of between about 200 nm and about 400 nm, or between about 250 nm and about 350 nm, or between about 275 nm and about 325 nm, after 25 ms as the liquid interface moves from 0 degrees of optical tilt to 0.6 degrees of optical tilt (e.g., in response to a step function input) (e.g., with a fluid interface at 0 diopters). A height of the second liquid when the liquid interface is flat can be about 40% to about 60% of the cavity height, or about 40%, about 45%, about 50%, about 55%, about 60%, or any values or ranges therebetween. A ratio between an active portion at a central region of the liquid interface and an inactive portion at a peripheral region of the liquid interface cart be between about 2 to 1 and about 4 to 1 when the liquid interface is flat, or between about 2.5 to 1 and about 3.5 to 1, or any values or ranges therein.

Various embodiments disclosed herein can relate to a liquid lens having a chamber, a first liquid contained in the chamber, and a second liquid contained in the chamber. The first liquid and the second liquid can be substantially immiscible to form a liquid interface between the first liquid and the second liquid. The liquid lens can have one or more insulated electrodes that can be insulated from the first and second liquids and a common electrode in electrical communication with the first liquid. A position of the liquid interface can be based at least in part on voltages applied to the electrodes. The liquid interface can have an active portion at a center region of the liquid interface that transmits light output by the liquid lens to produce an image. The liquid interface can have an inactive portion at a peripheral region of the liquid interface that does not substantially contribute to the image. The inactive portion occupies at least about 15%, or at least about 20%, or at least about 22%, or at least about 24%, or 50% or less of the area of the flat liquid interface. The inactive portion occupies at least about 10%, about 15%, about 20%, about 25%, about 30%, about 35%, about 40%, about 45%, about 50%, the area of the flat liquid interface, or any values or ranges between any of these values.

The chamber can have a sidewall in a shape of a truncated cone having a narrow end and a wide end, and a ratio between a diameter of the wide end and a diameter of the narrow end can be between about 1.1 to 1 and about 2 to 1, between about 1.2 to 1 and about 1.5 to 1, or any values or ranges therein. The chamber can have a sidewall in a shape of a truncated cone, and the side wall can be angled relative to a structural axis of the truncated cone by a cone angle of about 20 degrees to about 40 degrees, or about 25 degrees to about 35 degrees, or any ranges or values therein. The one or more insulated electrodes can include four insulated electrodes disposed in four respective quadrants in the liquid lens. The liquid interface can tilt in response to different voltages applied between the insulated electrodes so that an optical axis of the liquid interface is angled relative to a structural axis of the liquid lens by an optical tilt angle. The liquid lens can have a 10% to 90% response time between about 25 ms and about 75 ms for a transition from an optical tilt angle of 0 degrees to an optical tilt angle of 0.6 degrees(e.g., in response to a step function input) (e.g., with a fluid interface at 0 diopters), although other response times can also apply, as disclosed herein. The liquid lens can output light with optical aberrations having a total wavefront error of 350 nm or less after 25 ms as the liquid interface moves from 0 degrees of optical tilt to 0.6 degrees of optical tilt (e.g., in response to a step function input) (e.g., with a fluid interface at 0 diopters), or of 325 nm or less, or of 300 nm or less, or between about 250 nm and about 300 nm, or any values or ranges therein. A height of the second liquid when the liquid interface is flat can be about 40% to about 60% of the cavity height, or about 45% to about 55% of the cavity height.

Various additional values and ramzes for tilt response times, optical aberrations, and physical dimensions, etc. can apply to the liquid lenses, even where not specifically enumerated. For example, various plots disclosed herein show optical aberrations as a function of time. Some example embodiments are described with respect to the amount of optical aberration after 25 ms as the fluid interface tilts. However, the plots show amounts of optical aberration at various other times, which are also contemplated as being part of this disclosure, even when not specifically described in detail. It will be understood that various other liquid lens designs can be used, such as having physical properties between the various embodiments disclosed, which can yield performance attributed between the various embodiments that are specifically discussed.

BRIEF DESCRIPTION OF THE DRAWINGS

Certain embodiments will be discussed in detail with reference to the following figures, wherein like reference numerals refer to similar features throughout. These figures are provided for illustrative purposes and the embodiments are not limited to the specific implementations illustrated in the figures.

DETAILED DESCRIPTION OF CERTAIN EMBODIMENTS

Figure 1A:
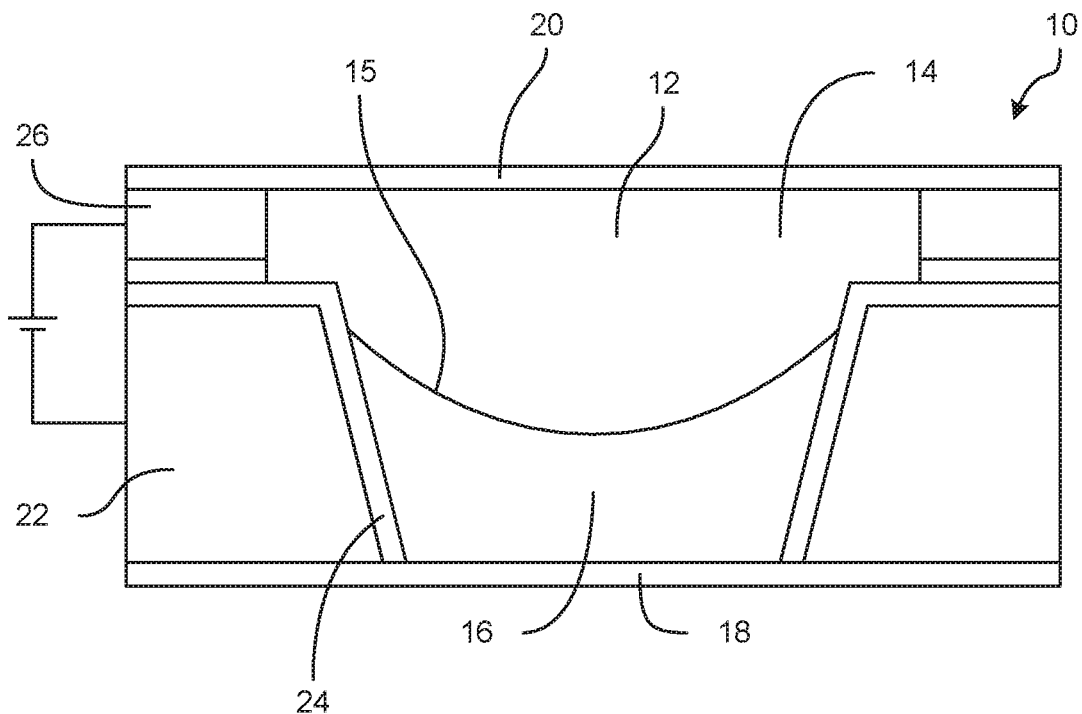
FIG. 1A is a cross-sectional view of an example embodiment of a liquid lens.

FIG. 1A is a cross-sectional view of an example embodiment of a variable focus lens 10, which can be a liquid lens. The liquid lens 10 of FIG. 1A, as well as the other liquid lenses disclosed herein, can have features that are the same as or similar to the liquid lenses disclosed in the '174 Patent, and can be made using techniques similar to those disclosed in the '174 Patent. The liquid lens 10 can have a cavity 12 that contains at least two substantially immiscible fluids (e.g., liquids), such as a first fluid 14 and a second fluid 16, forming a fluid interface (e.g., liquid interface) 15. The first fluid 14 can be electrically conductive and the second fluid 16 can be electrically insulating. The first fluid 14 can be a polar fluid, and/or an aqueous solution, in some embodiments. The second fluid 16 can be an oil, in some embodiments. The first fluid 14 can have a higher dielectric constant than the second fluid 16. A lower window 18 (e.g., sometimes referred to as a first window), which can include a transparent plate, can be below the cavity 12, and an upper window 20 (e.g., sometimes referred to as a second window), which can include a transparent plate, can be above the cavity 12. Although the terms lower window 18 and upper window 20 are used herein, it will be understood that the liquid lens 10 can be positioned in various orientations, which can be different than the orientations shown in the example drawings, including positions where the lower window 18 is positioned higher than the upper window 20 (e.g., upside down from the position shown in FIG. 1A). A first at least one electrode 22 can be insulated from the fluids 14 and 16 in the cavity 12 by an insulation material 24. A second electrode 26 can be in electrical communication with the first fluid 14. For example, in some embodiments, the second electrode 26 can be in direct electrical contact with the first fluid 14. While in other embodiments, the second electrode 26 can be in indirect electrical communication with the first fluid 14 without direct contact between the second electrode 26 and the first fluid 14, such as by capacitive coupling.

Figure 1B:
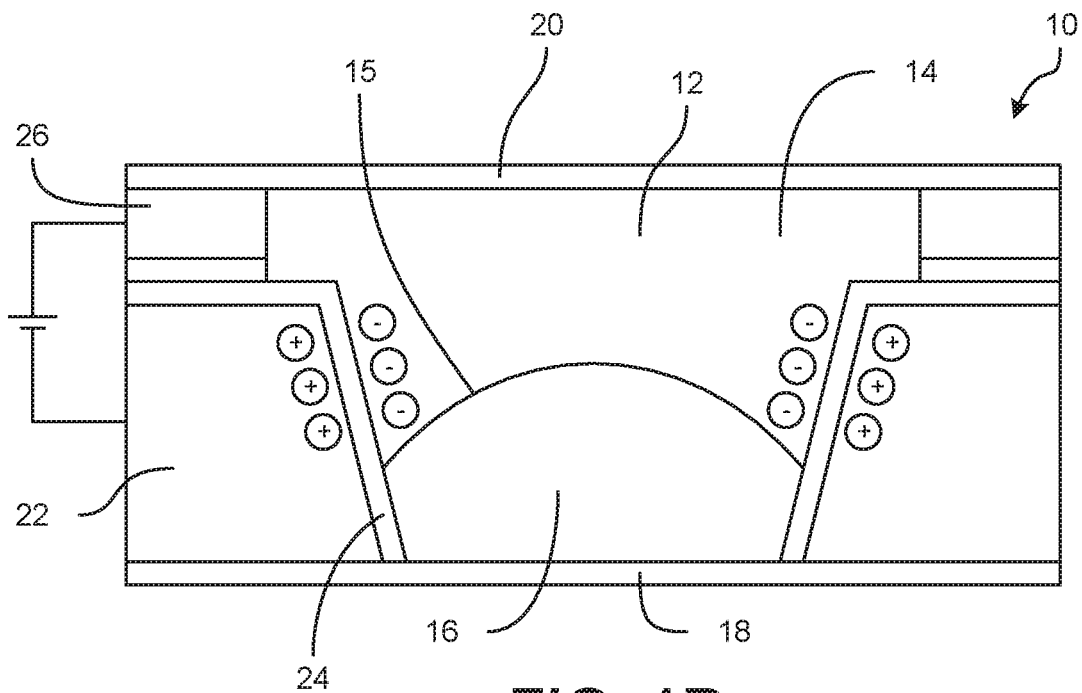
FIG. 1B is a cross-sectional view of an example embodiment of a liquid lens.

Voltages can be applied between the electrodes 22 and 26 to control the shape of the fluid interface 15 between the fluids 14 and 16, such as to vary the focal length of the liquid lens 10. FIG. 1A shows the liquid lens 10 in a first state where no voltage is applied between the electrodes 22 and 26, and FIG. 1B shows the liquid lens 10 in a second state where a voltage is applied between the electrodes 22 and 26. The chamber 12 can have one or more side walls made of a hydrophobic material. For example the insulating material 24 can be hydrophobic. In some embodiments, the insulating material 24 can be parylene, which can be insulating and hydrophobic. In some embodiments, a separate hydrophobic layer can be used. When no voltage is applied, the hydrophobic material on the side walls can repel the first fluid 14 (e.g., an aqueous solution) so that the second fluid 16 (e.g., an oil) can cover a relatively large area of the side walls, such as to produce the fluid interface 15 shape shown in FIG. 1A. When a voltage is applied between the first electrode 22 and the first fluid 14 via the second electrode 26, the first fluid 14 can be attracted to the first electrode 22 and/or the wettability of the first fluid 14 on the hydophobic material on the side walls can increase, which can drive the location of the fluid interface 15 down the side wall so that more of the side wall area is in contact with the first fluid 14. The fluid interface 1.5 can be driven to various different positions by applying different amounts of voltage between the electrodes 22 and 26.

Figure 2A:
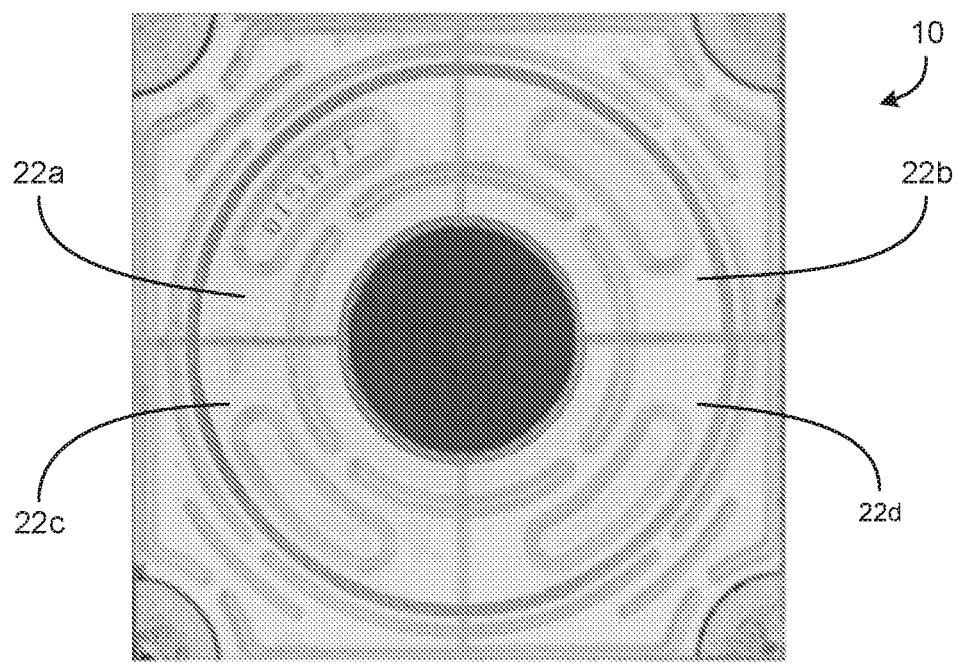
FIG. 2A shows an example embodiment of a liquid lens having four quadrant electrodes.

FIG. 2A shows a plan view of an example embodiment of a liquid lens 10. In some embodiments, the first at least one electrode 22 can include multiple electrodes 22a-d positioned at different locations about the liquid lens 10. For example, the liquid lens 10 can have four electrodes 22a, 22b, 22c, and 22d, which can be positioned in four quadrants of the liquid lens 10. In other embodiments, the first at least one electrode 22 can include various numbers of electrodes (e.g., 1 electrode, 2 electrodes, 4 electrodes, 6 electrodes, 8 electrodes, 12 electrodes, 16 electrodes, 32 electrodes, or more, or any values therebetween). The electrodes 22a-d can be driven independently (e.g., having the same or different voltages applied thereto), which can be used to position the fluid interface 15 at different locations on the different quadrants of the liquid lens 10.

Figure 2B:
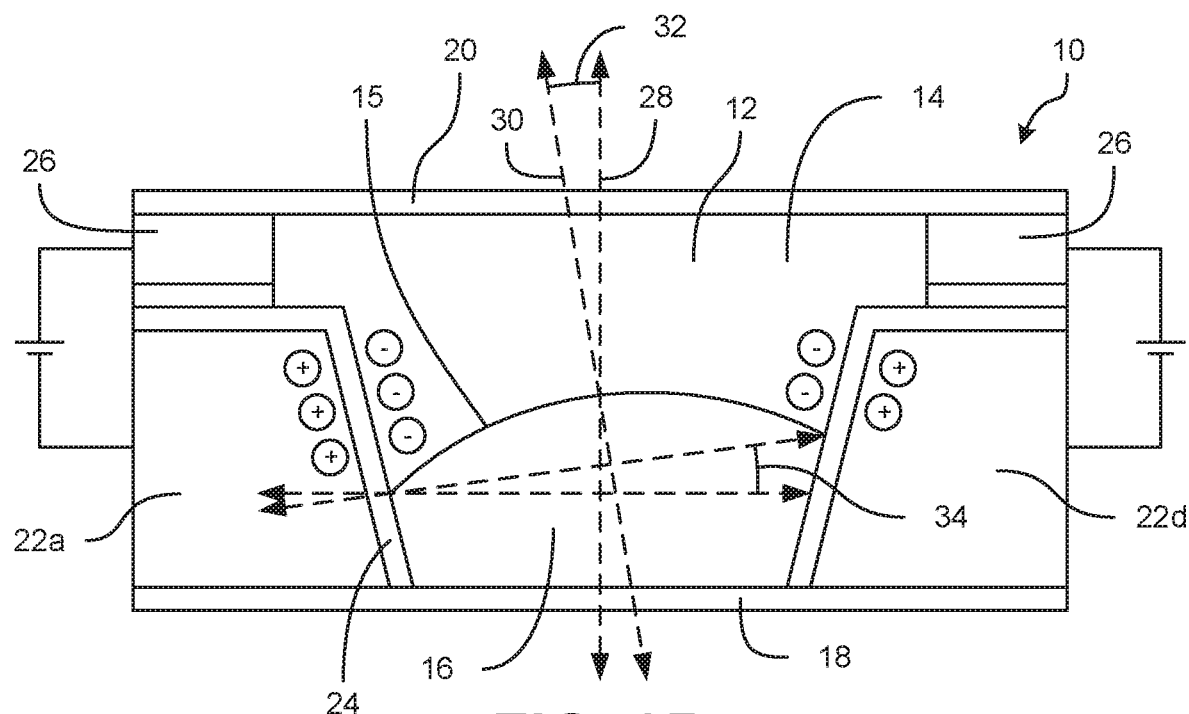
FIG. 2B is a cross-sectional view of an example embodiment of a liquid lens.

FIG. 2B shows a cross-sectional view taken through the electrodes 22a. and 22d. If more voltage is applied to the electrode 22a than to the electrode 22d the fluid interface 15 can be pulled further down the sidewall at the quadrant of the electrode 22a, which can cause the fluid interface 15 to tilt, as shown in FIG. 2B for example. The optical axis 30 of the liquid lens 10 can be tilted relative to the structural axis 28 of the liquid lens 10 in various different directions and by various different amounts by applying different voltages to the electrodes 22a-d. The structural axis 28 can be an axis of rotational symmetry of the liquid lens 10 or of a portion thereof (e.g., of the cavity 12, of a truncated cone, etc.). The structural axis 28 can pass through the center of one or both of the windows 18, 20, or through a center of the cavity 12. The structural axis 28 of the liquid lens 10 can be considered a longitudinal axis of the liquid lens. The structural axis 28 can lie on the optical axis 30 of the liquid lens 10 when the fluid interface 15 has a rotationally symmetrical shape, as shown for example, in FIGS. 1A and 1B, and/or when the electrodes 22a-d are driven by the same voltage levels, and/or when the fluid interface 15 is not tilted. The direction and/or magnitude of the optical tilt angle 32 between the optical axis 30 of the liquid lens 10 and the structural axis 28 of the liquid lens 10 can be controlled by driving the electrodes 22a-d to modify the shape of the fluid interface 15. The optical tilt can be used by the camera system to provide optical image stabilization, off-axis focusing, etc. In some cases, different voltages can be applied to the electrodes 22a-d to compensate for forces applied to the liquid lens 10 so that the liquid lens 10 maintains on-axis focusing. The light 30 that passed through the tilted fluid interface 15 can converge towards, or diverge away from, a direction that is angled by the optical tilt angle 32 relative to the direction along which the light entered the liquid lens 10. The fluid interface 15 can be tilted by physical tilt angle 34 that produces the optical tilt angle 32. The relationship between the optical tilt angle 32 and the physical tilt angle 34 depends at least in part on the indices of refraction of the fluids 14 and 16. For example, in some embodiments, the first fluid 14 can have an index of refraction between about 1.35 and about 1.42, or between about 1.37 and about 1.4 (e.g., about 1.38 or 1.39) and the second fluid 16 can have an index of refraction between about 1.45 and about 1.55, or between about 1.47 and about 1.52 (e.g., about 1.49 or 1.5). The difference between the indices of refraction of the first and second fluids 14 and 16 can be between about 0.07 and 0.15, between about 0.09 and about 0.13 (e.g., about 0.11). Various other fluids with different indices of refraction can be used, in some embodiments. Various embodiments herein are discussed in connection with a transition from 0 degrees to 0.6 degrees of optical tilt. In some embodiments, this can correspond to a transition from 0 degrees to about 8 degrees of physical tilt of the fluid interface 15.

Figure 3:
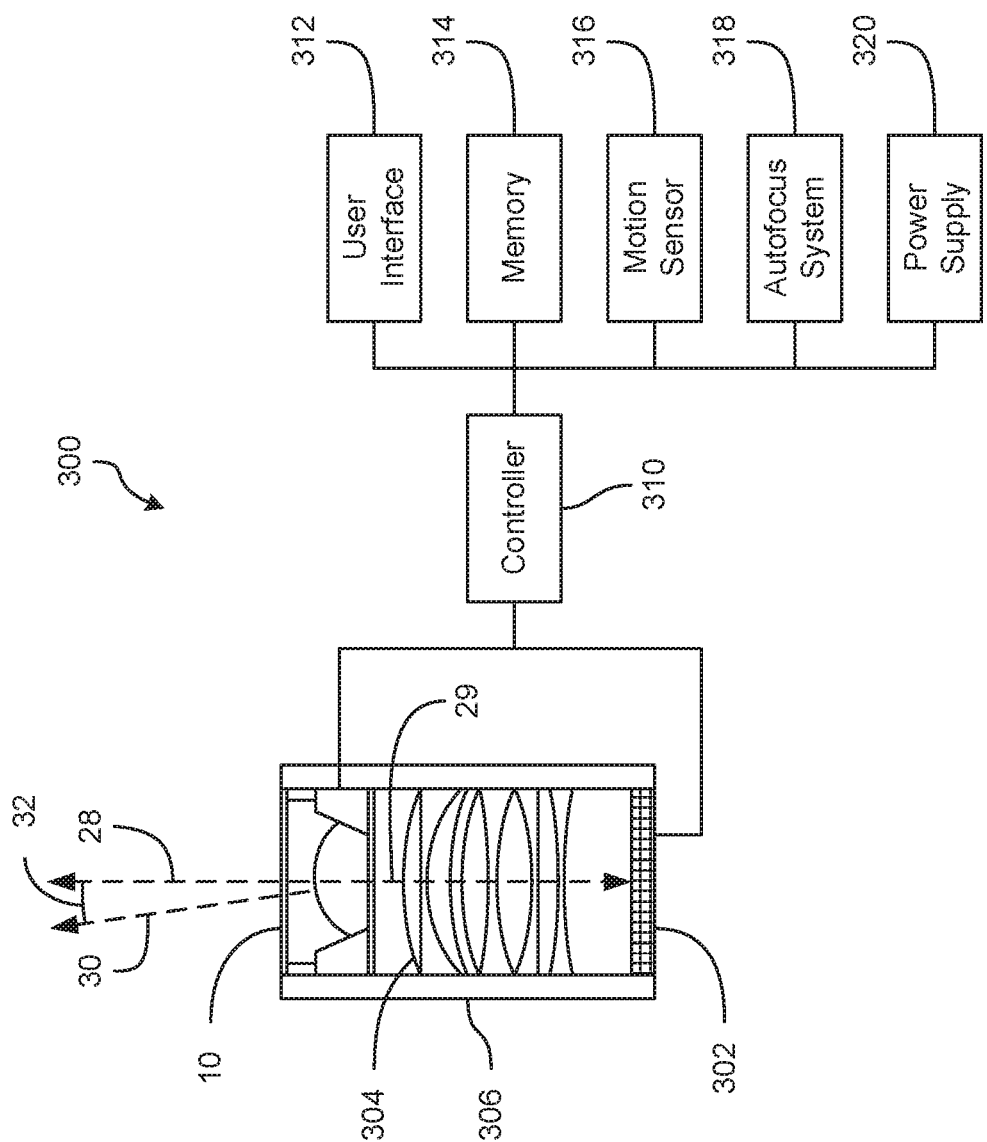
FIG. 3 is a schematic drawing of an example embodiment of a camera system.

FIG. 3 shows an example embodiment of a camera system 300, which can include a variable focus lens 10, such as a liquid lens. The variable focus lens 10 can be similar to or the same as the other variable focus lenses described herein. The camera system 300 can be incorporated into a mobile electronic device, such as a smartphone, a cell phone, a tablet computer, a laptop computer, etc. In some embodiments, the camera system 300 can be used in a dedicated camera device, such as a point-and-shoot camera, a digital single-lens reflex (DSLR) camera, or any other suitable type of camera. In some embodiments, the camera system 300 can be incorporated into other devices or systems, such as a car or other automobile or motorized vehicle, etc.

The camera system 300 can include an image sensor 302, which can be a charge-coupled device (CCD) sensor, or a complementary metal-oxide semiconductor (CMOS) sensor, or any other suitable type of image sensor. The image sensor 302 can receive light and generate electrical signals to produce an electronic image. In some embodiments, the image sensor 302 can include photographic film, which can be exposed to light to produce an image on the photographic film. A digital image sensor 302 can have a plurality of sensor pixels, which can have a pixel size between about 0.5 microns and about 10 microns. For example, the pixels of the image sensor 302 can have a pixel size of about 0.5 microns, about 0.6 microns, about 0.7 microns, about 0.8 microns, about 0.9 microns, about 1.0 microns, about 1.1 microns, about 1.2 microns, about 1.5 microns, about 2 microns, about 2.5 microns, about 5 microns, about 7.5 microns, about 8 microns, about 9 microns, or about 10 microns, or any values therebetween, or any ranges bounded by any combination of these values, although values outside these ranges can be used in some instances. The image sensor 302 can have a pixel density of about 1000 pixels per $mm^2$, about 1200 pixels per $mm^2$, about 1500 pixels per $mm^2$, about 2500 pixels per $mm^2$, about 5000 pixels per $mm^2$, about 10,000 pixels per $mm^2$, about 25,000 pixels per $mm^2$, about 50,000 pixels per $mm^2$, about 100,000 pixels per $mm^2$, about 250,000 pixels per $mm^2$, about 500,000 pixels per $mm^2$, about 750,000 pixels per $mm^2$, about 850,000 pixels per $mm^2$, about 900,000 pixels per $mm^2$, about 950,000 pixels per $mm^2$, or about 1,000,000 pixels per $mm^2$, or about 2,000,000 pixels per $mm^2$, or about 3,000,000 pixels per $mm^2$, or about 4,000,000 pixels per $mm^2$, or about 5,000,000 pixels per $mm^2$, or any values therebetween, or any ranges hounded by any combination of these values, although values outside these ranges can be used in some instances, The variable focus lens (e.g., liquid lens) 10 can direct light to the image sensor 302 to produce an image. The camera system 300 can include a stack of one or more lens elements 304, which can be fixed in position, and which can be positioned between the variable focus lens 10 and the image sensor 302. The one or more lens elements 304 can include various lens types, such as any combination of biconvex, plano-convex, positive meniscus, negative meniscus, plano-concave, biconcave, doublet, aspherical, and achromatic lens elements, etc. The lens elements 304 can perform a variety of optical operations on the light that is directed to the image sensor 302, such as focusing, defocusing, and reducing optical aberrations. In some implementations, the one or more lens elements 304 can be omitted, and the liquid lens 10 can direct light to the image sensor 302 without intermediate optical elements. In some embodiments, the liquid lens 10 can be positioned between the one or more lens elements 304 and the image sensor 302. In some embodiments, the liquid lens 10 can be positioned between lens elements 304. In some embodiments, the camera system 300 can include a second variable focus lens 10, and the lens system can use the two variable focus lenses 10 to implement a camera zoom function (e.g., an optical zoom function).

A housing 306 can position the variable focus lens 10 and/or the one or more lens elements 304 relative to the image sensor 302. The housing 306 can be an enclosed structure, or any other suitable support structure that is configured to position the elements of the camera system 300. An optical axis 29 of the one or more lens elements 302 can align with the structural axis 28 of the liquid lens 10, which can also align with the optical axis 30 of the liquid lens 10 when no optical tilt is applied to the liquid lens 10. When an optical tilt angle 32 is applied to the liquid lens 10, the optical axis 30 of the liquid lens 10 can be angled relative to the optical axis 29 of the one or more lens elements 304. The optical axis 29 can intersect the image sensor 302, such as at a center region thereof. In some embodiments, one or more reflective optical elements (e.g., mirrors) can be used to redirect light in the camera system 300, such as between the liquid lens 10 and the image sensor 302.

The camera system 300 can include a controller 310. The controller 310 can be configured to operate the variable focus lens 10, such as to adjust the focal length and/or focal direction. For example, the controller 310 can be configured to drive the electrodes of the liquid lens 10 with voltages that are configured to implement particular focal lengths and/or focal directions. The controller 310 can control the image sensor 302. For example, the controller 310 can process signals received from the image sensor 302 to produce images. The controller 310 can be used to control other components as well, such as a shutter (e.g., a physical shutter not shown in FIG. 3) or an electronic shutter that enables the image sensor 302 at select times to implement shutter functionality), or the user interface 312, etc. In some embodiments, the controller 310 can operate other functionality of the device that incorporates the camera system 300, such as other functionality on a smartphone or tablet computer, etc. In some embodiments, different controllers can be used for controlling one or more of the variable focus lens 10, the image sensor 302, the user interface 312, and other components of the camera system 300 or the incorporating device.

The camera system 300 can include a user interface 312, which can be configured to receive input from a user, such as by one or more buttons, switches, dials, microphone, touchscreens, or other user input elements. The user interface 312 can receive a command to generate an image, a series of images, or a video, input to change camera settings, a command to enable, disable, or set parameters for features such as autofocus, optical image stabilization, and/or zoom. The user interface 312 can be configured to output information to a user such as by one or more display screens, speakers, printers, or other information output elements. The user interface 312 can display an image taken by the camera system, or a preview of an area being imaged, or information about settings of the camera system. In some embodiments, the user input and output elements can be combined such as for a touchscreen display.

The camera system 300 can include memory 314, which can be non-transitory computer-readable memory 314. The controller 310 can include one or more computer hardware processors, which can execute computer-readable instructions stored in the memory 314 to implement the operations and features described herein. The memory 314 can be used to store images generated by the camera system 300. The memory 314 can be used to store information about settings and parameters for the camera system 300 and/or the Images generated thereby. In some embodiments, the camera system 300 can include multiple memory modules, which can be shared or can be dedicated to types of storage. For example a first memory module can be used to store computer-executable instructions, which can be read-only in some cases, and a second memory module can be used for storing images generated by the camera system 300.

The camera system 300 can include a motion sensor 316, which can provide information regarding motion of the camera system 300. For example the motion sensor 316 can be an accelerometer, a gyroscopic sensor, or any other suitable type of motion sensor 316 that can provide information in response to motion of the camera system 300. The motion sensor 316 can be used with the variable focus lens 10 to implement an optical image stabilization feature. The motion sensor 316 can provide motion information to the controller 310, and the controller 310 can drive the variable focus lens to at least partially compensate for the motion of the camera system 300 detected by the motion sensor 316. For example, if the camera system 300 shakes during use, the motion sensor 316 can measure that motion and provide information to the controller, regarding the movement of the camera system 300, such as the direction of movement and/or the amount of movement. By way of example, the motion sensor 316 can provide information indicating that the camera system 300 has rotated in a downward direction by some amount. The controller 310 can determine parameters for driving the liquid lens 10 to at least partially compensate for the camera motion (e.g., by tilting the fluid interface 15). Some examples disclosed herein relate to tilting the fluid interface 15 to produce an optical tilt of 0.6 degrees. The controller 310 can use a lookup table or a formula to determine voltages to be applied to the four electrodes 22*a*-*d* of the liquid lens 10 to produce the optical tilt (e.g., an upward optical tilt of 0.6 degrees in this example). After a time, the motion sensor 316 can provide updated motion information (e.g., periodically), and the controller 310 can adjust the liquid lens 10 accordingly. The relationship between the physical tilt and the optical tilt can depend, at least in part on the difference between the indices of refraction of the first fluid 14 (e.g., polar fluid) and the second fluid 16 (e.g., non-polar fluid).

The camera system 300 can include an autofocus system 318. For example, the autofocus system 318 can use phase detection, image contrast detection, or laser distance detection, or any other suitable technique, to provide information for determining how to drive the focal distance of the liquid lens 10. The controller 310 can receive information and can determine how to drive the liquid lens 10 to achieve an appropriate focal distance. By way of example, an autofocus system 318 can determine that the image target is 5 meters away from the camera system. The controller 310 can use this information to determine how to drive the liquid lens 10 so that the camera system 300 achieves a focal distance of 5 meters. For example, the controller 310 can use a lookup table or a formula to determine voltages to be applied to the electrodes of the liquid lens 10 to achieve an appropriate focal length for the liquid lens 10. The controller 310 can use the liquid lens 10 to simultaneously control the focal length (e.g., for autofocus) and the focal direction (e.g., for optical image stabilization). The camera system 300 can include a power supply 320 for providing electrical power to the components of the camera system 300, such as the controller 310, the liquid lens 10, the sensors, etc. The power supply 320 can be a battery, in some embodiments.

When the liquid lens 10 moves the fluid interface 15, such as to change a focal length and/or focal direction, the fluids 14 and 16 in the liquid lens 10 take time to move positions. For example, with reference to FIGS. 1B and 2B, if the optical image stabilization system changes the liquid lens 10 from having no optical tilt angle (e.g., as shown in FIG. 1B) to having an optical tilt angle 32 in a left direction (e.g., as shown in FIG. 2B), some of the first fluid 12 would move to the left and some of the second fluid 14 would move to the right. In some cases, optical image stabilization can cause the optical tilt angle 32 to shift back and forth between different directions, such as to compensate for the shaking of the camera system 300. Changes in the focal length of the liquid lens 10 also take time. For example, with reference to FIGS. 1A and 1B, when a voltage is applied to drive the fluid interface 15 from the resting state of FIG. 1 A to the driven state of FIG. 1B, some of the first fluid 14 moves toward the sides of the cavity 12, and some of the second fluid 16 moves toward the middle of the cavity 12. The shifting of fluids 14 and 16 in the liquid lens 10 can take time, such as due to the fluid dynamics of the fluids moving relative to each other and/or relative to the boundaries of the chamber 12.

Some embodiments disclosed herein relate to liquid lenses that are configured to improve response times (e.g., by reducing the response time to make the liquid lens 10 faster). For example, increasing the height of the liquid lens 10 can improve response times. For example, increasing the distance between the fluid interface 15 and the lower window 18 and/or increasing the distance between the fluid interface 15 and the upper window 20 can decrease the response time to make the liquid lens 10 faster. Although this disclosure is not to be limited by theory, it is believed that moving the fluid interface 15 where more fluid movement occurs away from one or both of the boundary layers of the fluid 14 and 16 at the windows 18 and 20 enables the fluid near the fluid interface 15 to move more freely. Accordingly, in some cases increasing the amount of fluids 14 and/or 16 in the liquid lens 10 can improve the response time. Increasing the distance between the fluid interface 15 and the windows 18 and/or 20 can improve response time, but can have diminishing returns. Also, in some instances, it can be advantageous to reduce the cavity height, to reduce the amount of the fluids 14 and/or 16 in the liquid lens 10, or to reduce the distance between the fluid interface 15 and the windows 18 and/or 20 to increase damping as the fluid interface moves. Accordingly, a balance between competing factors can be used to determine the appropriate cavity height and fluid amounts for a liquid lens 10.

Reducing the width of the fluid interface 15 can improve the response time lower the response time). For example, reducing the diameter of the liquid lens 10 the diameter of the optical aperture at the narrow end of the chamber 12 at the lower window 18) and/or narrowing the chamber 12 (e.g., the truncated cone) can reduce the response time of the liquid lens 10. In some cases, reducing the cone angle 402 (e.g., to make the side walls steeper) can reduce the response time to speed up the liquid lens. Although this disclosure is not to be limited by theory, it is believed that reducing the amount of fluid that is moved within the liquid lens enables the liquid lens 10 to respond faster to changes in focal length and/or focal direction.

In some instances, the liquid lens 10 can introduce optical aberrations to light that is transmitted through the liquid lens 10. The shape of the fluid interface 15 can have a shape that is not optically ideal, which can introduce optical aberrations. In sonic instances, when the fluid interface is tilted to an optical tilt angle 32, the shape of the fluid interface 15 can introduce optical aberrations, such as coma, trefoil, astigmatism, etc. In sonic, embodiments, the liquid lens 10 has a limited number of electrodes (e.g., four electrodes 22*a*-*d* in FIGS. 2A and 2B) for controlling the shape of the fluid interface 15, which in some cases can prevent the fluid interface 15 from achieving an optimal shape. For example, at the transition area between two adjacent electrodes (e.g., electrodes 22*a* and 22*b* as shown in FIG. 2A), the fluid interface 15 can be influenced by both of the adjacent electrodes. Especially when the adjacent electrodes are driven to significantly different voltages (e.g., a voltage difference between adjacent electrodes of about 1 volt, about 1.5 volts, about 2 volts, about 2.5 volts, about 3 volts, about 4 volts, or more, or any values or ranges therebetween, although other voltage values and produce substantial error depending on the configuration of the liquid lens), the competing effects of the adjacent electrodes can cause the fluid interface 15 at the transition area between the adjacent electrodes to introduce optical aberration including trefoil.

Some embodiments disclosed herein relate to liquid lenses that are configured to reduce optical aberrations or to otherwise improve the optical performance of the liquid lenses. Using additional electrodes can soften the changes in voltage levels at the transition areas between electrodes. For example, a liquid lens 10 can have 8 or 16 electrodes instead of the 4 electrodes 22*a*-*d* shown in FIG. 2A, and the differences in voltages between adjacent electrodes can be reduced, thereby reducing optical aberrations from the liquid lens 10. Various numbers of electrodes can be used, as discussed herein.

Increasing the size of the fluid interface 15 can reduce optical aberrations, in some instances. For example, widening the chamber 12 of the liquid lens 10 relative to the optical aperture (e.g., widening the truncated cone that forms sidewalls of the chamber 12 by increasing the cone angle 402) can reduce some optical aberrations. Although this disclosure is not to be limited by theory, it is believed that the strongest optical aberrations (e.g., for trefoil) occur at the edges of the fluid interface 15 (e.g., where the fluid interface 15 is closest to the electrodes 22*a*-*d*). By moving the edges of the fluid interface 15 further outside the area of the liquid lens 15 that transmits light that reaches the image sensor 302 (e.g., the optical aperture), the optical aberrations can be reduced for the light that reaches the image sensor 302 to produce the image. The portions of the fluid interface that would produce stronger optical aberrations (e.g., from trefoil) can be "hidden" from the image sensor in the peripheral portion of the fluid interface. Increasing the diameter of the liquid lens 10 can reduce optical aberrations. For example, increasing the size of the narrow opening of the truncated cone (e.g., the narrow diameter 404) while keeping the cone angle 402 the same can reduce some optical aberrations. Although this disclosure is not to be limited by theory, it is believed that increasing the area of the fluid interface 15 that is spaced apart from the electrodes 22*a*-*d*, and/or increasing the distance from the electrodes 22*a*-*d* to the center of the fluid interface 15 can reduce the overall distortion on the fluid interface 15 from the voltage transitions between the electrodes 22*a*-*d*.

In some instances, some types of wavefront error can increase while other types of wavefront error decrease, can vice versa. For example, reducing the cone angle 402 (e.g., to steepen the side walls) can increase trefoil, while reducing coma. The larger fluid interface can produce more pumping as the fluid interface 15 is tilted. The larger fluid interface can take a longer time to settle, which can increase the overall coma over time. A larger cone angle 402 can result in more movement of the fluid interface 15 to produce the same amount of physical tilt 34 or optical tilt 32, which can produce more coma. Accordingly, a balance between competing factors can be used to determine the parameters for the liquid lens 10.

Figure 4:
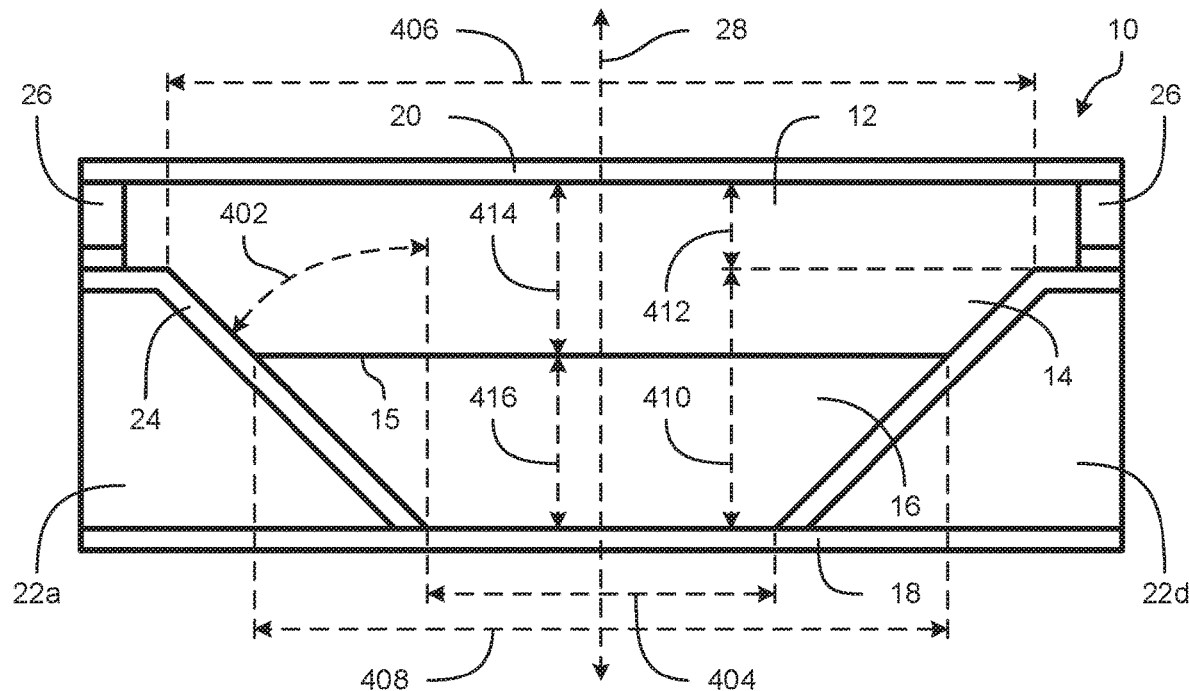
FIG. 4 is a cross-sectional view of an example embodiment of a liquid lens.
Figure 5:
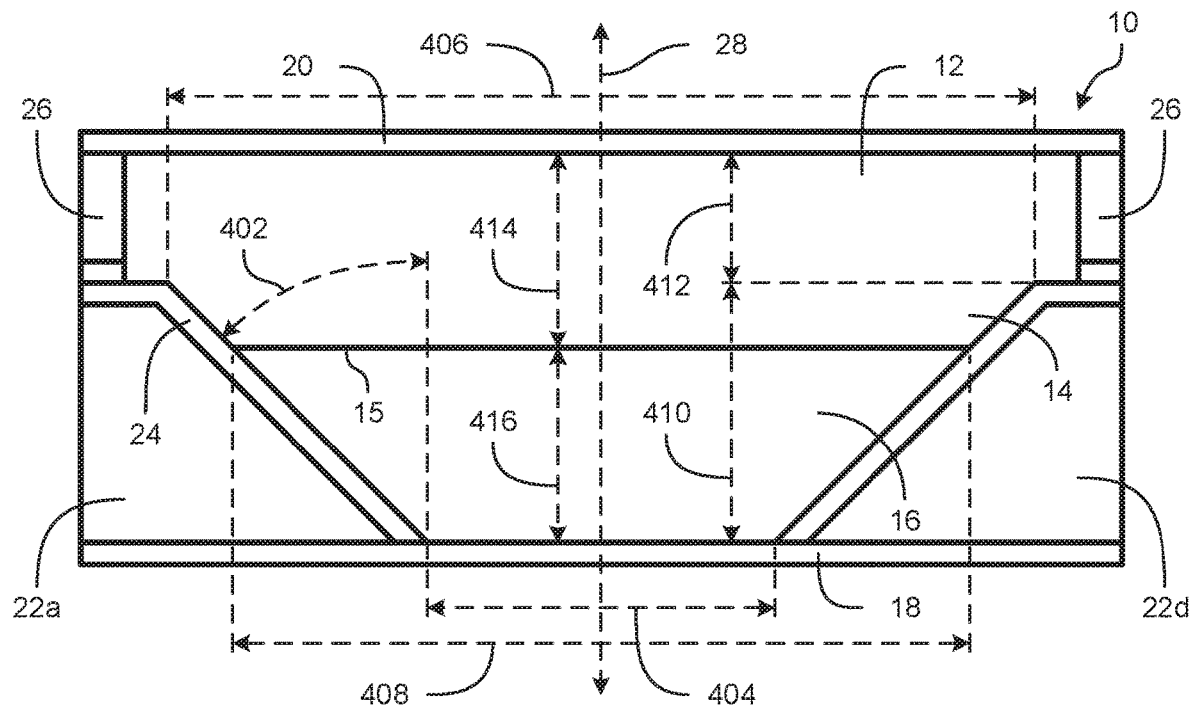
FIG. 5 is a cross-sectional view of an example embodiment of a liquid lens.

FIG. 4 and FIG. 5 show cross-sectional views of example embodiments of variable focus lenses 10, such as a liquid lenses. The liquid lens 10 can have a truncated cone structure for at least a portion of the chamber 12. In some embodiments, the liquid lens 10 can have a relatively wide truncated cone, which can reduce the influence of some optical aberrations (e.g., trefoil) on the image produced using the liquid lens. In some embodiments, the liquid lens can 10 can have a relatively narrow truncated cone, which can reduce some optical aberrations (e.g., coma), and can improve response time. The shape of the cavity 12 (e.g., including the truncated cone structure) can be selected to balance or prioritize the operational parameters of the liquid lens 10. The side wall of the truncated cone can be angled relative to the structural axis 28 by a cone angle 402. The cone angle 402 of the liquid lenses 10 disclosed herein can be about 5 degrees, about 10 degrees, about 20 degrees, about 25 degrees, about 30 degrees, about 35 degrees, about 40 degrees, about 45 degrees, about 50 degrees, about 60 degrees, about 70 degrees, about 80 degrees, about 85 degrees, or any angle therebetween, or any range of angle bounded by any combination of these angle values, although other angles outside these ranges can be used in some instances. In some implementations, at least a portion of the chamber 12 can have a cylindrical shape having an angle 402 of 0 degrees).

The truncated cone structure can have a narrow portion (e.g., a relatively narrow opening at an end of the truncated cone at the lower window 18) having a narrow diameter 404 and a wide portion (e.g., a relatively wide opening at an end of the truncated cone nearest the upper window 20) having a wide diameter 406. A ratio of the wide portion diameter 406 to the narrow portion diameter 404 can be about 1.1 to 1, about 1.2 to 1, about 1.3 to 1, about 1.4 to 1, about 1.5 to 1, about 2.0 to 1, about 2.5 to 1, about 3.0 to 1, about 3.5 to 1, about 4.0 to 1, about 4.5 to 1, about 4.8 to 1. about 5.0 to 1, or any ratio values therebetween, or any range of ratios bounded by any combination of these ratio values, although values outside these ranges can be used in some instances.

The fluid interface 15 when at 0 diopters (e.g., when flat across a plane, which can be normal to the structural axis 28) can have a flat fluid interface diameter 408. In some embodiments, driving the fluid interface with increased voltage can cause the fluid interface diameter 408 to decrease as the edge of the fluid interface 15 is driven town the sidewall of the truncated cone. Reducing the voltage applied to the liquid lens can cause the fluid interface diameter 408 to increase as the edge of the fluid interface 15 moves up the sidewall of the truncated cone. FIGS. 4 and 5 show the fluid interface at a flat state, which can produce no optical power (e.g., 0 diopters). A ratio between the flat fluid interface diameter 408 and the narrow diameter 404 can be about 1.02 to 1, about 1.05 to 1, about 1.07 to 1, about 1.08 to 1, about 1.09 to 1, about 1.1 to 1, about 1.2 to 1, about 1.5 to 1, about 2.0 to 1, about 2.5 to 1, about 3.0 to 1, about 3.5 to 1, about 4.0 to 1, about 4.5 to 1, about 4.8 to 1, about 5.0 to 1, or any ratio values therebetween, or any range of ratios bounded by any combination of these ratio values, although values outside these ranges can be used in some instances. A ratio between the wide diameter 406 of the truncated cone and the flat fluid interface diameter 408 can be about 1.02 to 1, about 1.05 to 1, about 1.07 to 1, about 1.08 to 1, about 1.09 to 1, about 1.1 to 1, about 1.2 to 1, about 1.5 to 1, about 2.0 to 1, about 2.5 to 1, about 3.0 to 1, about 3.5 to 1, about 3.8 to 1, about 4.0 to 1, about 4.5 to 1, about 5 to 1, or any ratio values therebetween, or any range of ratios bounded by any combination of these ratio values, although values outside these ranges can be used in some instances.

The narrow portion of the truncated cone can provide an optical aperture for light that is used to produce an image, and in some cases a portion of the light that enters the liquid lens 10 is not output through the optical aperture to produce an image. For example some light can enter the liquid lens 10 through the upper window 20, can pass through the fluid interface, and can impinge on the side wall of the truncated cone, or on some other structure in the liquid lens, such that the light is not output through the lower window 18 of the liquid lens 10. It should be understood that in some implementations, light can propagate through the liquid lens in the other direction, through the lower window 18, through the fluid interface 15, and through the upper window 20. The narrow portion (e.g., end) of the truncated cone can provide an optical aperture in this implementation as well.

Figure 6:
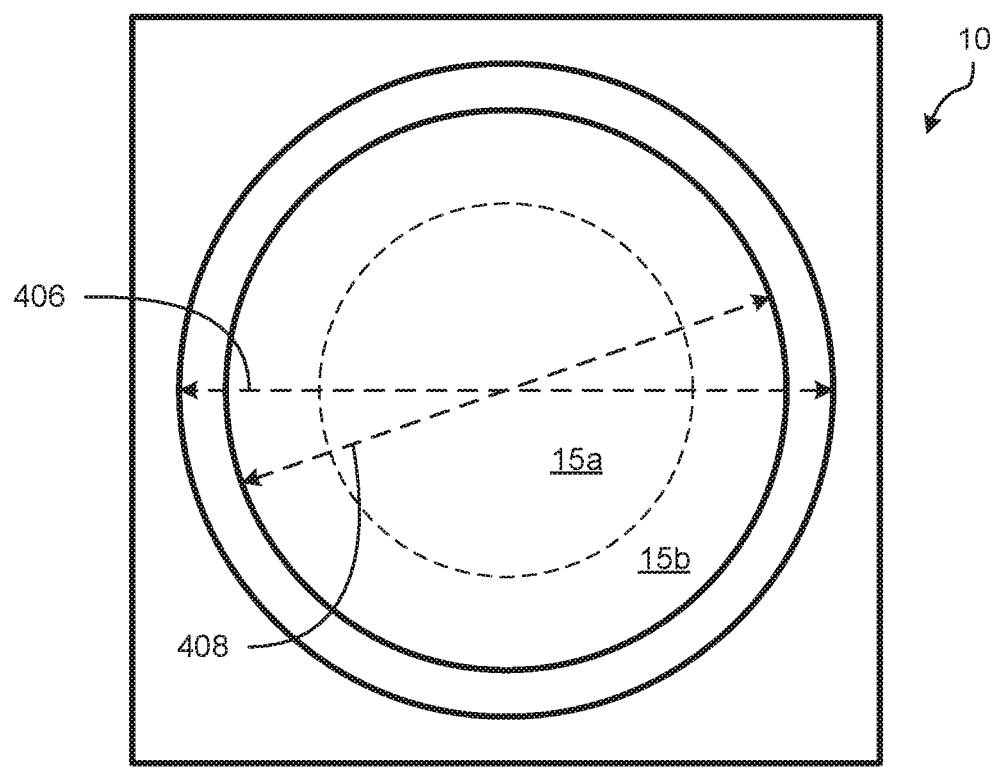
FIG. 6 shows an example of a liquid lens having a fluid interface with an active portion and an inactive portion.

With reference to FIG. 6, which shows a top-down view of the liquid lens 10, the fluid interface 15 can have an active fluid interface portion 15a and an inactive fluid interface portion 15b. Light can pass through the active fluid interface portion 15a and can be output by the liquid lens 10 for producing an image. The inactive fluid interface portion 15b does not substantially contribute to light that is output from the liquid lens 10 for producing an image. It will be understood that some small amount of light that passes through the inactive fluid interface portion 15b might be output from the liquid lens 10 and contribute to producing the image, such as if the light reflects or scatters from one or more components of the liquid lens 10. In some embodiments, light that passes through the active fluid interface portion 15a can be output from the liquid lens 10 without being reflected and/or without being scattered by the liquid lens 10. In some embodiments, a majority of the light that passes through the active fluid interface portion 15a can be output from the liquid lens 10 for producing an image, and/or a majority of the light that passes through the inactive fluid interface portion 15b is not output from the liquid lens 10 for producing an image. In some implementations, a majority of the light that passes through the inactive fluid interface portion 15b can be absorbed by the liquid lens or reflected, scattered, or otherwise redirected in a direction that does not contribute to producing the image. The active fluid interface portion 15a can include a center portion of the fluid interface 15, as can be seen in FIG. 6. The inactive fluid interface portion 15b can include a periphery portion of the fluid interface 15, as can be seen in FIG. 6. The inactive fluid interface portion 15b can surround the active fluid interface portion 15a. As the fluid interface 15 is driven to different positions, the amounts of the fluid interface 15 that are active and inactive can change. For example, as more voltage is applied to drive the fluid interface 15 down the sidewall, the area of the active fluid interface portion 15a can increase. When the applied voltage is reduce or stopped, the fluid interface 15 can move up the sidewall, which can increase the area of the inactive fluid interface portion 15b. A ratio of the area of the active fluid interface portion 15a, to the area of the inactive fluid interface portion 15b when the fluid interface 15 is flat (e.g., at 0 diopters and not titled) can be about 0.2 to 1, about 0.3 to 1, about 0.4 to 1, about 0.5 to 1. about 0.6 to 1, about 0.7 to 1, about 0.8 to 1, about 0.9 to 1, about 1 to 1, about 1.5 to 1, 1about 2 to 1, about 2.5 to 1. about 3 to 1, about 3.5 to 1, about 4 to 1, about 4.5 to 1, about 5 to 1, or any values therebetween, or any ranges bounded by any combination of these values, although other ratios outside of these ranges can be used in some implementations. The inactive portion 15b can occupy at least about 5%, about 10%, about 15%, about 20%, about 25%. about 30%, about 35%, about 40%, about 45%, about 50%, about 60%, about 70%, about 80%, or more of the area of the fluid interface (e.g., when flat), or any values therebetween, or any ranges bounded thereby, although other configurations are possible. The active portion 15a can occupy at least about 5%, about 10%, about 15%, about 20%, about 25%, about 30%, about 35%, about 40%, about 45%, about 50%, about 60%, about 70%, about 80%, or more of the area of the fluid interface (e.g., when flat), or any values therebetween, or any ranges bounded thereby, although other configurations are possible.

In some embodiments, increasing the area of the inactive fluid interface portion 15b, such as by increasing the cone angle 402 to widen the truncated cone structure of the cavity 12 and/or by adding more of the second fluid 16 to raise the level of the flat fluid interface, can reduce optical aberrations, such as by pushing more of the optical aberrations into the inactive fluid interface portion 15b. The liquid lens 10 of FIG. 4 can be configured to reduce some types of optical aberration (e.g., trefoil) for light transmitted through the liquid lens 10, as compared to the liquid lens of FIG. 2B, for example. The liquid lens 10 of FIG. 4 can have a wider cone angle 402 (e.g., 45 degrees, although various other cone angles such as 30 degrees, or 60 degrees, or more can be used) and a higher fluid interface 15, which can reduce the amount of certain optical aberrations (e.g., trefoil and/or astigmatism) produced by the active portion 15a of the fluid interface 15.

However, the liquid lens 10 of FIG. 4 can have a slower response time than the liquid lens of FIG. 2B. For example, the larger fluid interface 15 of the FIG. 4 embodiment can require more time to change position because more fluid is moved than in the FIG. 2B embodiment. The liquid lens of FIG. 5 can be configured to have a faster response time than the liquid lens of FIG. 4. The liquid lens 10 can have a cone height 410, which can be the height of the truncated cone portion of the cavity 12 along a line parallel to the structural axis 28. The liquid lens 10 can have an above-cone height 412, which can be the height of cavity 12 above the truncated cone along a line parallel to the structural axis 28. The total chamber height can be, for example, a sum of the cone height 410 and the above-cone height 412. The liquid lens 10 can have a first fluid height 414, which can be the distance along a line parallel to the structural axis 28 between the fluid interface 15 (e.g., when flat, such as at 0 diopters and not tilted) and the upper window 20. The liquid lens 10 can have a second fluid height 416, which can be the distance along a line parallel to the structural axis 28 between the fluid interface 15 (e.g., when flat, such as at 0 diopters and not tilted) and the lower window 18. The total chamber height can be a sum of the first fluid height 414 and the second fluid height 416.

As can be seen by comparing FIGS. 4 and 5, the liquid lens 10 of FIG. 5 has a larger total chamber height than the embodiment of FIG. 4. The above-cone height 412 is larger in the example embodiment of FIG. 5, and the fluid interface level is raised (e.g., by using more of the second fluid 16 in FIG. 5 than in FIG. 4). The larger first fluid height 414 can cause the area with most fluid motion, near the fluid interface 15, to be spaced farther from the upper window 20, and therefore further from the boundary layer fluid at the upper window, which can enable the fluid near the fluid interface 15 to move more rapidly (e.g., in response to changes in voltage applied to the liquid lens 10). The larger second fluid height 416 can cause the area with the most fluid motion, near the fluid interface 15, to be spaced farther from the lower window 18, and therefore further from the boundary layer fluid at the lower window, which can enable the fluid near the fluid interface 15 to move more rapidly (e.g., in response to the changes in voltage applied to the liquid lens 10). Many variations are possible. For example, the above-cone height 412 can be increased by using a larger electrode 26 or spacer between the truncated cone structure and the upper window 20. A larger cone height 410 can be used to increase the total height of the cavity 12, which can be used to increase one or both of the first fluid height 414 and the second fluid height 416. In some embodiments, the truncated cone shape can extend the full height of the cavity 12.

In some instances, coma can increase as the cavity height of the liquid lens increases. For example, increasing the cavity height while keeping the fluid interface at the middle (or any other proportional location) can result in a larger fluid interface. In some cases, the increased cavity height can reduce coma by reducing the settling time. In some cases (e.g., if the cavity height is increased to the point of diminishing, returns on the settling time), the larger fluid interface can produce more coma (e.g., when the fluid interface 15 is tilted). Competing factors can be balanced to determine the parameters of the liquid lens.

Figure 7:
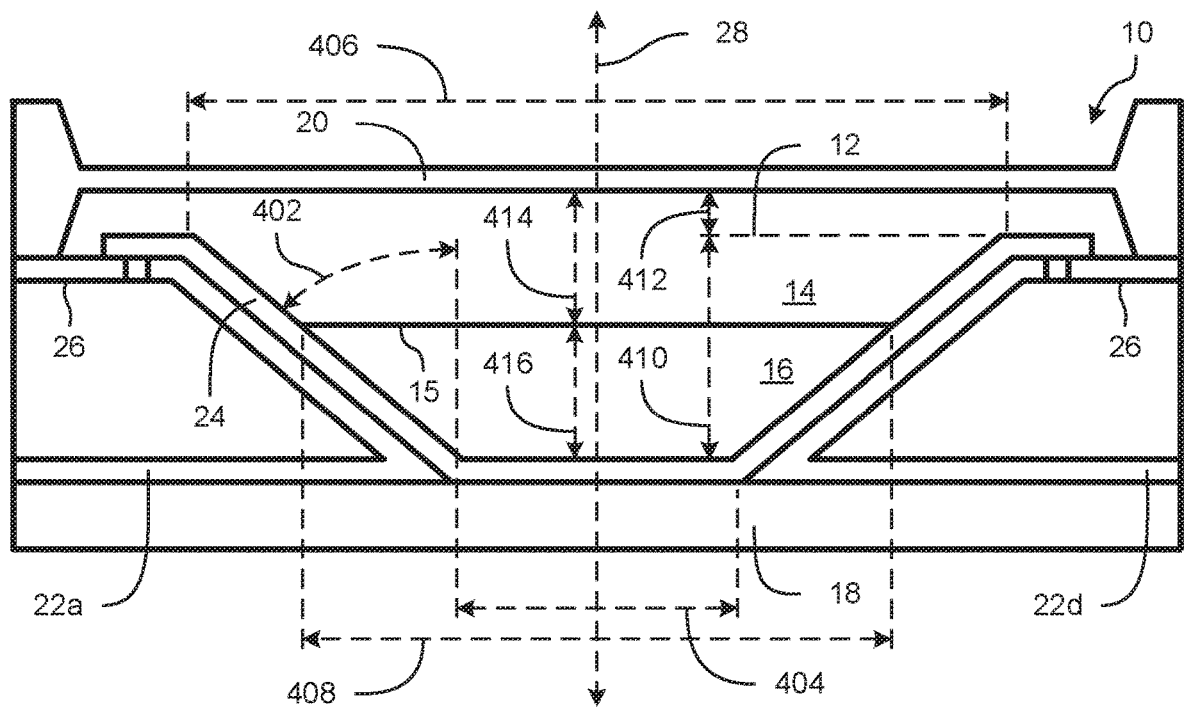
FIG. 7 is a cross-sectional view of an example embodiment of a liquid lens.
Figure 8:
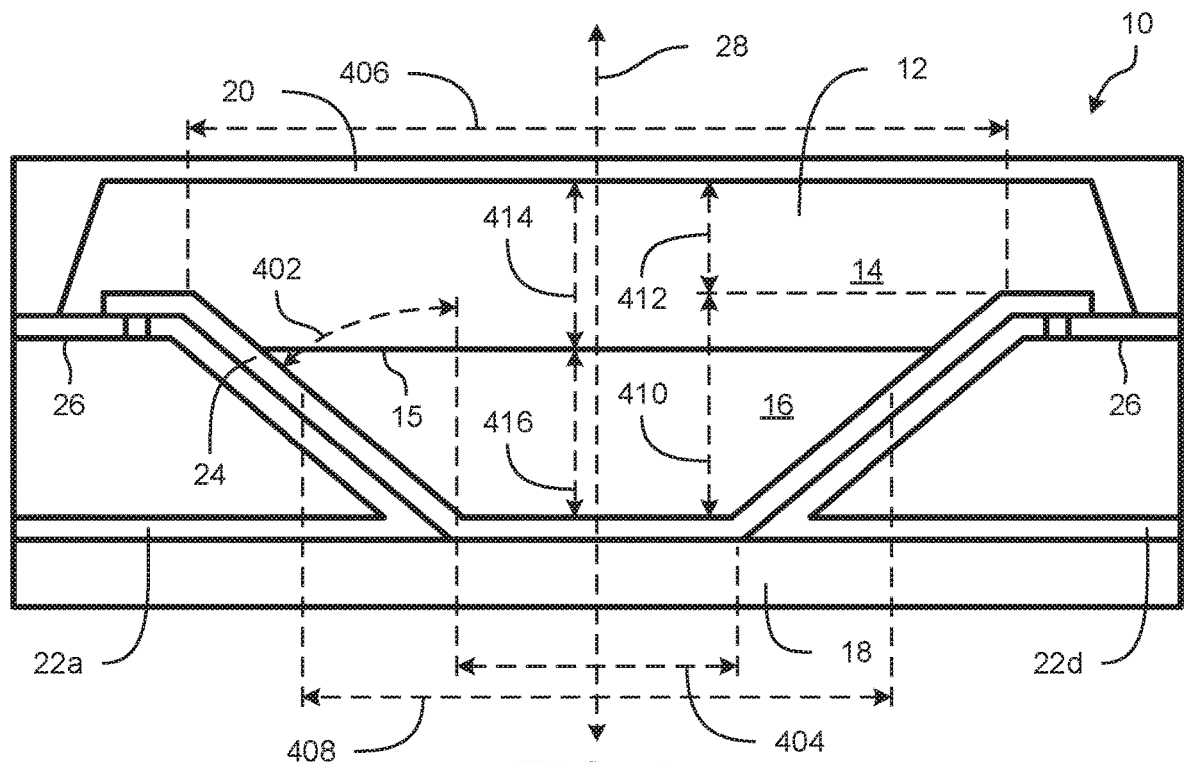
FIG. 8 is a cross-sectional view of an example embodiment of a liquid lens.

Various liquid lens structures can be used. FIG. 7 shows an example embodiment of a liquid lens 10, which can include features similar to or the same as the other liquid lenses disclosed herein and various features described in the '174 Patent. The same measurements, distances, sizes, ratios, and functionality described in connection with the liquid lenses of FIGS. 4-6 can be applied to the embodiment of FIG. 7. The liquid lens 10 of FIG. 7 can be configured to provide low optical aberrations for reasons similar to those discussed herein, e.g., in connection with FIGS. 4-6. The upper window 20 can have a narrowed central portion, which can bend to accommodate pressure changes in the liquid lens 10 (e.g., such as caused by temperature changes) and/or shock to the liquid lens 10 (e.g., such as caused by dropping a device in which the liquid lens is incorporated). In FIG. 7, the upper window 20 can be a plate of transparent material (e.g. glass), and material can be removed (e.g., by etching or any other suitable technique) from both sides of the upper window 20. The upper window 20 can have a recess on a top side and a recess on a bottom side. The measurements, such as the first fluid height 414, the above-cone height 412, and/or the total chamber height can be measured when the upper window 20 is not flexed. With reference to FIG. 8, in some embodiments, the upper window 20 can have a recess formed on the inside portion (e.g., the bottom side) of the window 20. In some instances the outside portion (e.g., the upper side) of the window 20 can be flush or flat. To make the window 20, material can be removed from the inside portion (e.g., the bottom side) of the window 20 only (e.g., via etching) without removing material from the outside portion (e.g., the upper side) of the window 20. In some embodiments, more material is removed from the inside portion (e.g., the bottom side) of the window 20 than the outside portion (e.g., upper side) to make a recess on the inside portion (e.g., the bottom side) larger (e.g., deeper) than a recess on the outside portion (e.g., the upper side) of the window 20. The recess on the inside portion (e.g., bottom side) of the window 20 of the liquid lens 10 can increase the chamber height, which can improve the liquid lens response time, or other liquid lens performance parameters, as discussed herein.

In various embodiments, the narrow opening of the truncated cone structure can have a narrow diameter 404 of about 0.25 mm, about 0.5 mm, about 0.75 mm, about 1.0 mm, about 1.25 mm, about 1.5 mm, about 1.7 mm, about 1.75 mm, about 1.8 mm, about 1.85 mm, about 1.9 mm, about 1.95 mm, about 2.0 mm, about 2.1 mm, about 2.25 mm, about 2.5 mm, about 3 mm, about 3.5 mm, about 4.0 mm, about 5 mm, about 6 mm, about 7 mm, about 8 mm, about 9 mm, about 10 mm, about 11 mm, about 12 mm, or any values therebetween, or any ranges bounded by any combination of these values, although values outside these ranges can be used in some instances, such as larger scale lenses. The wide opening of the truncated cone structure can have a wide diameter 406 of about 0.5 mm, about 1.0 mm, about 1.25 mm, about 1.5 mm, about 1.75 mm, about 2.0 mm, about 2.25 mm, about 2.5 mm, about 2.75 mm, about 3 mm, about 3.5 mm, about 4 mm, about 5 mm, about 6 mm, about 7.5 mm, about 10 mm, about 12.5 mm, about 15 mm, about 20 mm, about 30 mm, about 40 mm, about 50 mm, about 60 mm, or any values therebetween, or any ranges bounded by any combination of these values, although values outside these ranges can be used in some instances, such as larger scale lenses. The flat fluid interface (e.g., 0 diopter and no optical tilt angle) can have a diameter 408 of about 0.3 mm, about 0.5 mm, about 0.75 mm, about 1.0 mm, about 1.25 mm, about 1.5 mm, about 1.75 mm, about 2.0 mm, about 2.25 mm, about 2.5 mm, about 3 mm, about 3.5 mm, about 4.0 mm, about 5 mm, about 6 mm, about 7.5 mm, about 10 mm, about 15 mm, about 20 mm, about 25 mm, about 30 mm, about 40 mm, or any values therebetween, or any ranges bounded by any combination of these values, although values outside these ranges can be used in some instances, such as larger scale lenses.

The cone height 410 can be about 0.1 mm, about 0.2 mm, about 0.25 mm, about 0.3 mm, about 0.4 mm, about 0.5 mm, about 0.6 mm, about 0.75 mm, about 1.0 mm, about 1.25 mm, about 1.5 mm, about 1.75 mm, about 2.0 mm, about 2.5 mm, about 3 mm, about 4 mm, about 5 mm, about 6 mm, about 7 mm, about 8 mm, about 9 mm, about 10 mm, about 12 mm, or any values therebetween, or any ranges bounded by any combination of these values, although values outside these ranges can be used in some instances, such as larger scale lenses. The above-cone height 412 can be about 5 microns, about 10 microns, about 20 microns, about 25 microns, about 30 microns, about 35 microns, about 40 microns, about 45 microns, about 50 microns, about 55 microns, about 60 microns, about 65 microns, about 75 microns, about 100 microns, about 125 microns, about 150 microns, about 175 microns, about 200 microns, about 250 microns, about 300 microns, about 350 microns, about 400 microns, about 500 microns, about 700 microns, about 1.0 mm, about 1.5 mm, about 2 mm, about 3 mm, about 4 mm, about 5 mm, about 7 mm, about 8 mm, about 10 mm, or any values therebetween, or any ranges bounded by any combination of these values, although values outside these ranges can be used in some instances, such as larger scale lenses. The ratio of the cone height 410 to the above-cone height 412 can be about 20 to 1, about 17 to 1, about 15 to 1, about 13 to 1, about 12 to 1, about 11 to 1, about 10 to 1, about 9 to 1, about 8 to 1, about 7 to 1, about 5 to 1, about 3 to 1, about 2 to 1, about 1.5 to 1, about 1 to 1, about 0.75 to 1, about 0.5 to 1, about 0.25 to 1, or any values therebetween, or any ranges of ratios bounded by any combination of these values, although values outside these ranges can be used in some instances. The cone height 410 can be larger than the above-cone height 412 (or vice versa) by about 0% (same size), about 5%, about 10%, about 20%, about 30%, about 40%, about 50%, about 75%, about 100%, about 150%, about 200%, about 300%, about 400%, about 500%, about 700%, about 1,000%, about 1,500%, about 2.000%, or any values therebetween, or any ranges of values bounded by any combination of these values, although other values could be used.

The first fluid height 414 (e.g., measured when the fluid interface is flat, as discussed herein) can have a value of about 0.1 mm, about 0.15 mm, about 0.2 mm, about 0.25 mm, about 0.3 mm, about 0.35 mm, about 0.4 mm, about 0.5 mm, about 0.75 mm, about 1.0 mm, about 1.25 mm, about 1.5 mm, about 2.0 mm, about 3.0 mm, about 4.0 mm, about 5.0 mm, about 6.0 mm, or any values therebetween, or any ranges bounded by any combination of these values, although values outside these ranges can be used in some instances, such as larger scale lenses. Tice second fluid height 416 (e.g., measured when the fluid interffice is flat, as discussed herein) can have a value of about 0.1 mm, about 0.15 mm, about 0.2 mm, about 0.25 mm, about 0.3 mm, about 0.35 mm, about 0.4 mm, about 0.5 mm, about 0.75 mm, about 1.0 mm, about 1.25 mm, about 1.5 mm, about 1.75 mm, about 2.0 mm, about 2.5 mm, about 3.0 mm, about 4.0 mm, about 5.0 mm, about 6.0 mm, or any values therebetween, or any ranges bounded by any combination of these values, although values outside these ranges can be used in some instances, such as larger scale lenses.

The liquid lens 10 can be configured so that when the liquid lens 10 moves the fluid interface 15 (e.g., to adjust the focal length and/or to tilt the interface 15), the shear force on the first fluid 14 and the shear force on the second fluid 16 can be balanced. In some embodiments, the shear forces for the first and second fluids can vary by no more than about 1%, about 2%, about 3%, about 5%, about 7%, about 10%, about 15%, about 20%, about 25%, about 30%, or any values therebetween, or any ranges bounded by any combination of these values, although other values could be used. For example, when the liquid lens 10 moves the fluid interface 15 (e.g., to produce an optical tilt of 0.6 degrees), some of the first fluid 14 and some of the second fluid 16 can move in the liquid lens. The fluids 14, 16 adjacent to stationary structures in the liquid lens 10 (e.g., the lower window 18 and/or the upper window 20) can act as boundary layers for the fluid 14, 16, which can resist movement. In some cases, the shear forces can extend to and affect the movement of the fluids at the fluid interface, which can slow down the response time of the liquid lens 10. In some cases, the shear forces can increase damping in the liquid lens 10. The degree to which the shear forces can affect movement of the fluid interface 15 can depend on the viscosity of the fluid, the area of interface with the stationary structure, and/or the distance from the boundary layer to the fluid interface 15. The liquid lens 10 can be configured so that the shear force for the first fluid 14 at the fluid interface 15 and the shear force for the second fluid 16 at the fluid interface 15 can be balanced, can be substantially equal, or can vary from each other by the amounts or ranges identified above. By way of example, the first fluid 14 can be a polar fluid and can have a viscosity of 1 to 2 mPa*s (at 20 degrees Celsius), and the second fluid 16 can be a non-polar fluid and can have a viscosity of 2 to 5 mPa*s (at 20 degrees Celsius). Because the second fluid 16 can be more viscous than the first fluid 14, shear forces can have more effect further from the boundary layer in the second fluid 16 than in the first fluid 14. The second fluid height 416 can be increased as the viscosity of the second fluid 16 increases relative to the first fluid 14 to balance the shear forces (e.g., at the fluid interface 15). In some embodiments more boundary layer area (e.g., more area of contact between a fluid and stationary structure) can increase the shear force, and a heights 414, 416 of the fluids 14, 16 can be adjusted to account for the boundary layer areas in the fluids 14, 16. A ratio of the first fluid height 414 to the second fluid height 416 can be about 10 to 1, about 7 to 1, about 5 to 1, about 3 to 1, about 2 to 1, about 1.5 to 1, about 1 to 1, about 0.75 to 1, about 0.5 to 1, about 0.25 to 1, about 0.1 to 1, or any values therebetween, or any ranges of ratios bounded by any combination of these values, although values outside these ranges can be used in some instances. In some embodiments, the second fluid height 416 can be larger than the first fluid height 414 (or vice versa), such as by 0% (same size), about 5%, about 10%, about 20%, about 30%, about 40%, about 50%, about 75%, about 100%, about 150%, about 200%, about 300%, or any values therebetween, or any ranges of values bounded by any combination of these values, although other values could he used.

A ratio of the narrow portion diameter 404 of the truncated cone to the first fluid height 414 and/or the second fluid height 416 can be about 25 to 1, about 20 to 1, about 15 to 1, about 12 to 1, about 10 to 1, about 8 to 1, about 6 to 1, about 5 to 1, about 4 to 1, about 3 to 1, about 2 to 1, about 1.5 to 1, about 1.25 to 1, about 1 to 1, about 0.9 to 1, about 0.8 to 1, about 0.75 to 1, or any ratio values therebetween, or any range of values bounded by any combination of these ratio values, although other values outside these ranges could be used in some implementations. The total chamber height can be the sum of the any of the values disclosed for the cone height 410 and the above-cone height 412, or the sum of any of the values disclosed for the first fluid height 414 and the second fluid height 416. The narrow portion diameter 404 of the truncated cone can be larger than the first fluid height 414 and/or the second fluid height 416 by 0% (same size), about 5%, about 10%. about 20%, about 30%, about 40%, about 50%, about 75%, about 100%, about 150%, about 200%, about 300%. about 350%. about 400%. about 450%, about 500%. about 600%, about 700%. about 800%, about 900%, about 1.000%, or any values therebetween, or any ranges of values bounded by any combination of these values, although other values could be used. In some embodiments. The first fluid height 414 and/or the second fluid height 416 can be larger than the narrow portion diameter 404 of the truncated cone by 0% (same size), about 5%, about 10%, about 20%, about 30%, about 40%, about 50%, about 75%, about 100%. about 150%, about 200%, about 300%, about 400%, about 500%, or any values therebetween, or any ranges of values bounded by any combination of these values, although other values could be used.

This disclosure is contemplated to include various other ratios based on the sizes of components disclosed herein, and various component sizes based on the ratios listed herein. For example, where a first feature is disclosed as having sizes X1 or X2 and a second feature is described as having sizes Y1 or Y2, this disclosure is also contemplated to disclose embodiments where the ratio between the first feature and the second features is X1 to Y1, X1 to Y2, X2 to Y1, and/or X2 to Y2. The ratios can be scaled to sizes that are larger or smaller than the values described herein, such as for larger or smaller scale liquid lenses. Some embodiments disclosed herein can relate to liquid lenses 10 that are sized to be used with a smartphone or other handheld device. In some embodiments, liquid lenses can be about 5 times, about 10 times, about 20 times, or about 100 times larger than the sizes described herein, or any sizes therebetween. In some embodiments, the same ratios of component sizes can be applied to larger liquid lenses. And in some embodiments, the principles of liquid lens response times and optical aberrations can scale and be applied to larger liquid lenses.

The response time of the liquid lens can depend on one or more of the natural frequency for the liquid lens 10, the sound speed within the liquid lens (which can be a function of the fluids in the liquid lens 10), the geometry of the liquid lens 10, and/or a damping ratio of the liquid lens 10.

FIGS. 9A-9D are charts showing data from liquid lenses having different cone angles 402 as the liquid lenses are transitioned from a state of no optical tilt to a state having an optical tilt angle 32 of 0.6 degrees. The liquid lenses used for FIGS. 9A-9B had four electrodes 22a-d, a truncated cone structure having a narrow diameter 404 of 1.8 mm, a cone height of 600 microns, and an above-cone height of 30 microns, for a cavity height of 630 microns. Line 502 corresponds to a liquid lens 10 having a cone angle 402 of 30 degrees. Line 504 corresponds to a liquid lens 10 having a cone angle 402 of 40 degrees. Line 506 corresponds to a liquid lens 10 having a cone angle 402 of 50 degrees. Line 508 corresponds to a liquid lens 10 having a cone angle 402 of 60 degrees.

Figure 9A:
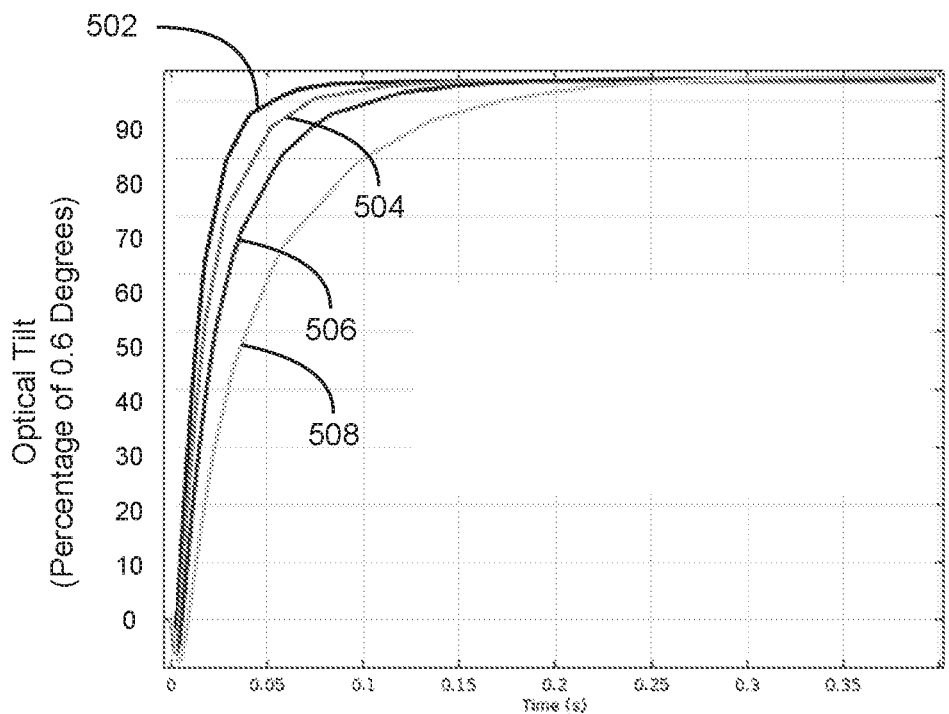
FIGS. 9A, 10A, 11A, 12A, 13A, 14, 15A, 16A, 17A, and 23A are plots showing tilt reaction times for example embodiments of liquid lenses.

FIG. 9A shows the response time of the liquid lenses. The X-axis corresponds to time in seconds, and the Y-axis corresponds to the optical tilt in percentage of 0.6 degrees of optical tilt. Various plots are provided herein showing tilting of flat fluid interfaces of example liquid lenses, although similar plots can apply to tilting a fluid interface that is curved to provide optical power. As can be seen in FIG. 9A, the liquid lens with the narrower cone angle of 30 degrees had the fastest response time, and the response time became slower as the cone angle increased. The liquid lens with a cone angle of 60 degrees had the slowest response time. Various techniques can be used to determine a response time. A 10% to 90% technique can determine the response time to be the amount of time it takes the liquid lens 10 to change from 10% to 90% of the transition (e.g., in response to a step function input). For example, for a transition from 0 degrees optical tilt angle 32 to 0.6 degrees optical tilt angle 32, the 10% to 90% response time can be the amount of time it takes for the liquid lens 10 to change from 0.06 degrees to 0.54 degrees of optical tilt angle 32 in response to a sudden change from 0 degrees to 0.6 degrees in the target optical tilt input).

Figure 9B:
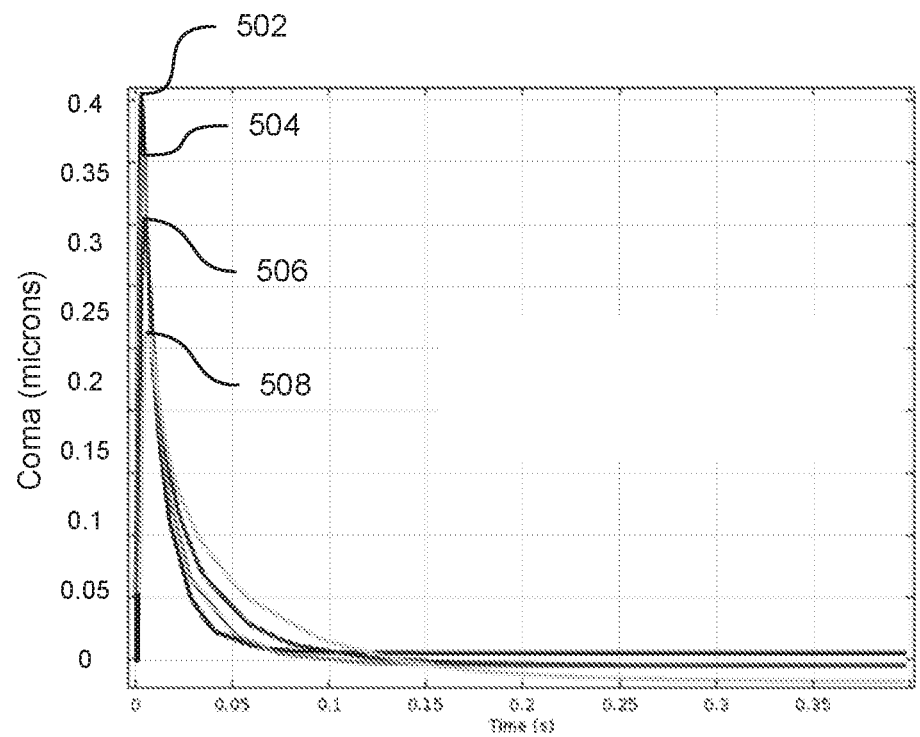
FIGS. 9B, 10B, 11B, 12B, 13B, 15B, 16B, 17B, and 23B are plots showing coma optical aberration for example embodiments of liquid lenses.

FIG. 9B shows coma optical aberration for the liquid lenses. The X-axis corresponds to time in seconds, and the Y-axis corresponds to wavefront error from coma optical aberration in microns for light output by the liquid lenses. As can be seen in FIG. 9B, the liquid lens with the narrower cone angle of 30 degrees had the most coma optical aberration, with a peak of about 0.41 microns, and the coma optical aberration decreased as the cone angle 402 increased. The liquid lens with a cone angle of 40 degrees had peak coma of about 0.36 microns. The liquid lens with a cone angle of 50 degrees had a peak coma of about 0.31 microns. The liquid lens with a cone angle of 60 degrees had a peak coma of about 0.22 microns. Although this disclosure is not to be limited by theory, it is believed that the wider cone angle causes more of the periphery of the fluid interface to be "hidden" from view so that less of the coma optical aberration is visible for the wider cone angle. However, the liquid lenses with larger cone angles can take longer to settle, which can increase the overall coma over time. The liquid lens with a cone angle of 30 degrees (e.g., line 502) can reach about 0.1 microns of coma after about 17 ms. The liquid lens with a cone angle of 40 degrees (e.g., line 504) can reach about 0.1 microns of coma by about 20 ms. The liquid lens with a cone angle of 50 degrees (e.g., line 506) can reach about 0.1 microns of coma by about 24 ms. The liquid lens with a cone angle of about 60 degrees (e.g., line 508) can reach about 0.1 microns of coma by about 30 ms. By comparing the area under the curve for the lines 502, 504, 506, and 508, it can be seen that the lower cone angle can produce less overall coma.

Figure 9C:
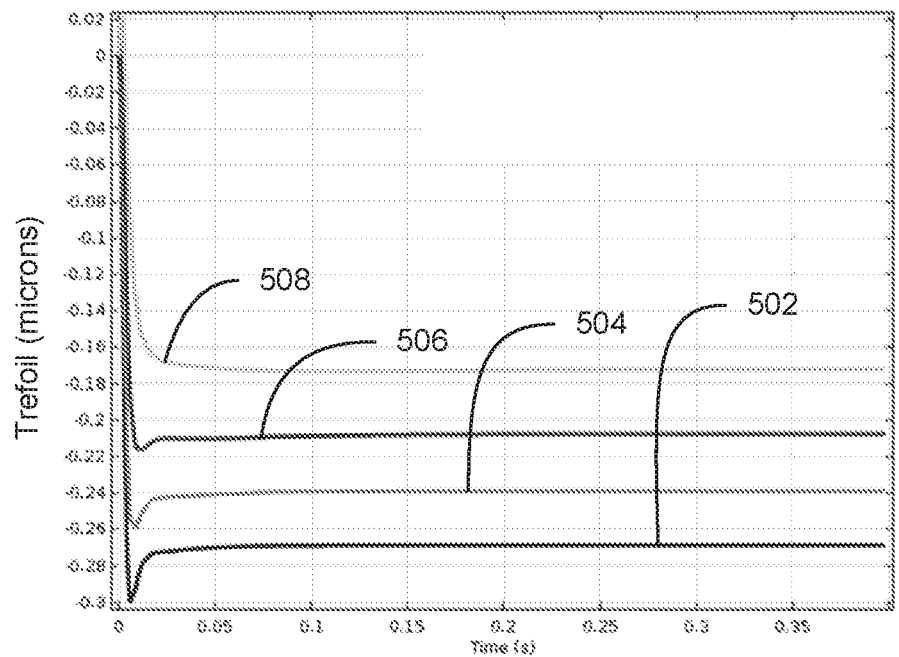
FIGS. 9C. 10C, 11C, 12C, 13C, 15C, 16C, 17C, and 23C are plots showing trefoil optical aberration for example embodiments of liquid lenses.

FIG. 9C shows trefoil optical aberration for the liquid lenses. The X-axis corresponds to time in seconds, and the Y-axis corresponds to wavefront error from trefoil optical aberration in microns for light output by the liquid lenses. In FIG. 9C, the negative numbers on the Y-axis for trefoil mean that the values that are spatially lower on the chart correspond to more trefoil optical aberration. As can be seen in FIG. 9C, the liquid lens with the narrower cone angle of 30 degrees had the most trefoil optical aberration, settling at about −0.27 microns, and the trefoil optical aberration decreased as the cone angle 402 increased. The liquid lens with a cone angle of 40 degrees had trefoil that settled at about −0.24 microns. The liquid lens with a cone angle of 50 degrees had trefoil that settled at about −0.21 microns. The liquid lens with a cone angle of 60 degrees had trefoil that settled at about −0.17 microns.

Figure 9D:
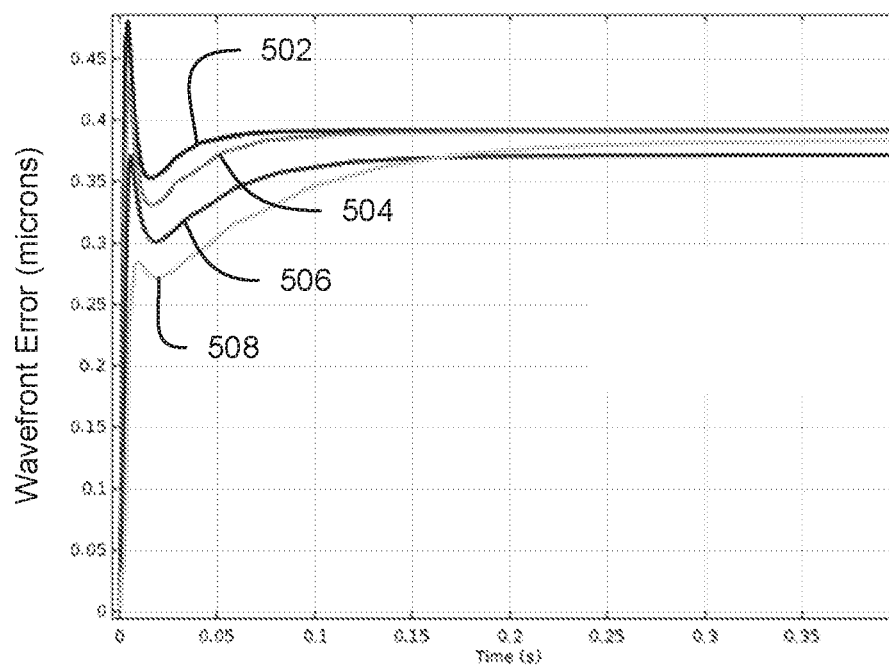
FIGS. 9D, 10D, 11D, 12D, 13D, 15D, 16D, and 17D are plots showing aggregate wavefront error for example embodiments of liquid lenses.

FIG. 9D shows total wavefront error from optical aberrations, except for piston and tilt. In various embodiments disclosed herein, the total wavefront error does not include piston or tilt, because the piston and tilt can be used to adjust the focusing of the fluid interface, and are not unintended error. The X-axis corresponds to time in seconds, and the Y-axis corresponds to wavefront error in microns. As can be seen in FIG. 9D, the liquid lens with the narrower cone angle of 30 degrees had the most wavefront error, and the wavefront error decreased as the cone angle 402 increased. In some cases, coma can increase, while trefoil (e.g., that is visible to the image sensor) can decrease, as the cone angle increases. In some cases, the trefoil can be reduce more than the coma is increased, so that increasing the cone angle has an overall effect or reducing the aggregate wavefront error. As illustrated by FIGS. 9A-9D, increasing the cone angle 402 can improve the optical quality of the liquid lens 10, such as by reducing optical aberrations. However, increasing the cone angle 402 can increase the response time to slow down the liquid lens 10.

FIGS. 10A-10D are charts showing data from liquid lenses having different cone angles 402 as the liquid lenses are transitioned from a state of no optical tilt to a state having an optical tilt angle 32 of 0.6 degrees (e.g., in response to a step-function input signal). The liquid lenses used for FIGS. 10A-10B were the same as those used for FIGS. 9A-9D, except that the truncated cone of the liquid lenses used for FIGS. 10A-10D had a narrow diameter 404 of 2.0 mm. The cone height was 600 microns, and the above-cone height was 30 microns, for a cavity height of 630 microns. Line 510 corresponds to a liquid lens 10 having a cone angle 402 of 30 degrees. Line 512 corresponds to a liquid lens 10 having a cone angle 402 of 40 degrees. Line 514 corresponds to a liquid lens 10 having a cone angle 402 of 50 degrees. Line 516 corresponds to a liquid lens 10 having a cone angle 402 of 60 degrees.

Figure 10A:
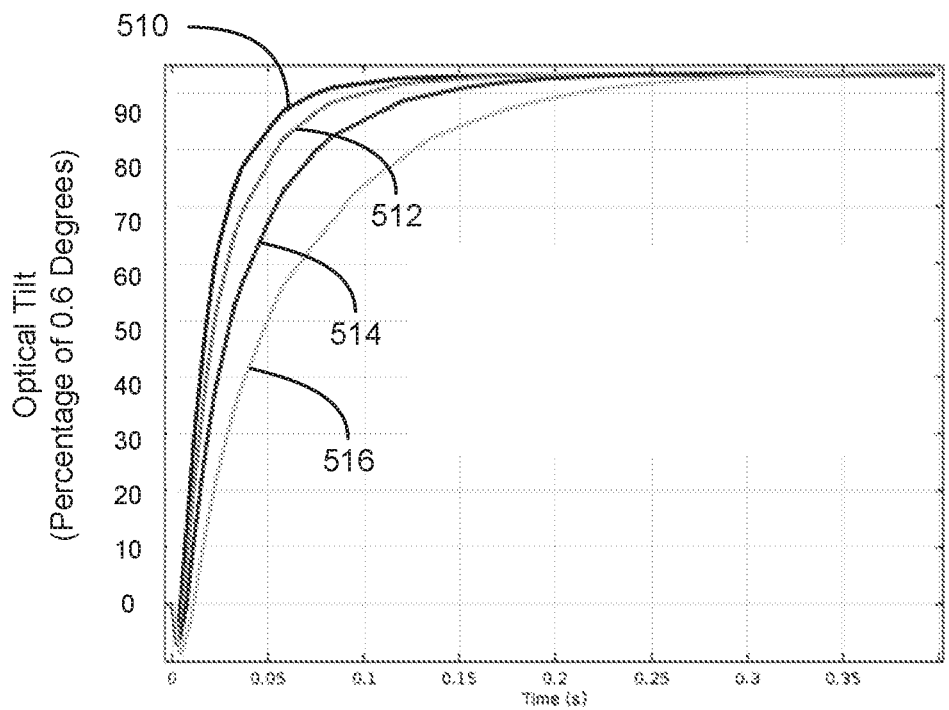

FIG. 10A is similar to FIG. 9A, and shows that the response time of the liquid lens slows down as the cone angle 402 becomes wider. A comparison of FIG. 9A to FIG. 10A shows that increasing the narrow diameter 404 of the liquid lens 10 from 1.8 mm to 2.0 mm causes the response time of the liquid lens 10 to increase, indicating that the liquid lens 10 slows down.

Figure 10B:
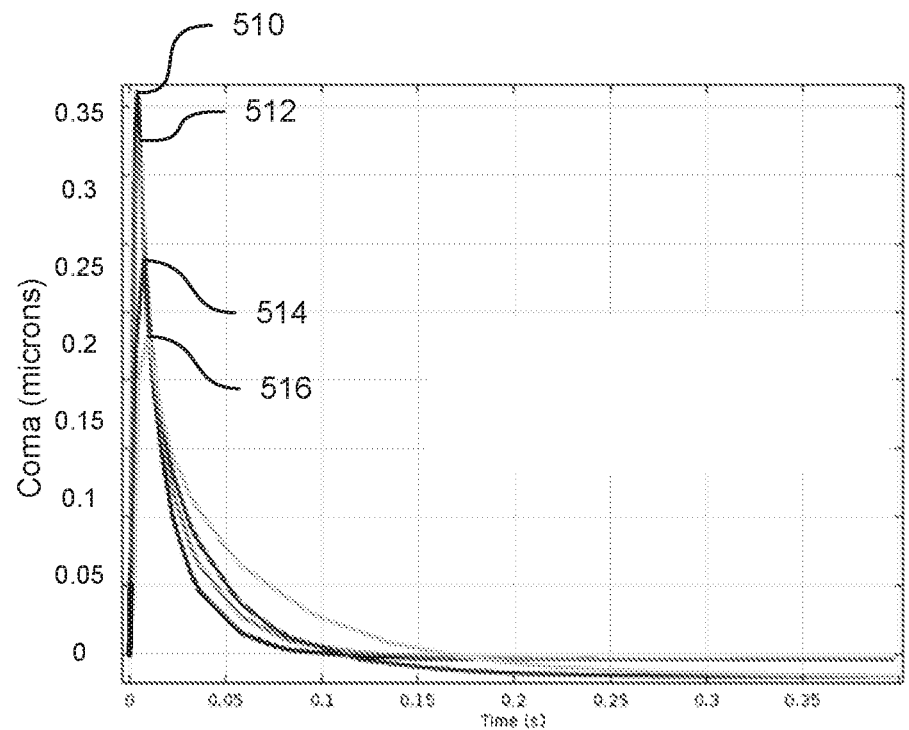

FIG. 10B is similar to FIG. 9B, and shows that peak coma optical aberration decreases as the cone angle 402 of the liquid lens 10 becomes larger to widen the truncated cone structure. However, overall coma optical aberration over time can be Increased as the cone angle 402 is increased to widen the cone. A comparison of FIGS. 9B to 10B shows that increasing the narrow diameter 404 of the liquid lens 10 from 1.8 mm to 2.0 mm causes the peak coma optical aberration to decrease. However, increasing the narrow diameter 404 caused the overall coma over time to increase.

Figure 10C:
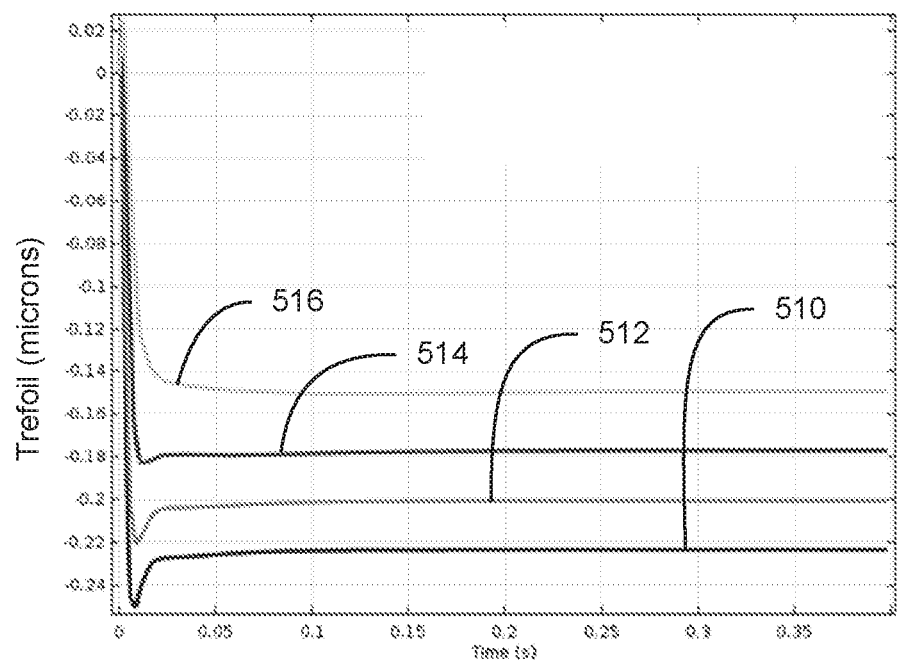

FIG. 10C is similar to FIG. 9C, and shows that trefoil optical aberration decreases as the cone angle 402 of the liquid lens 10 becomes larger to widen the truncated cone structure of the cavity 12. A comparison of FIG. 9C to 10C shows that increasing the narrow diameter 404 of the liquid lens 10 from 1.8 mm to 2.0 mm causes the trefoil optical aberration to decrease.

Figure 10D:
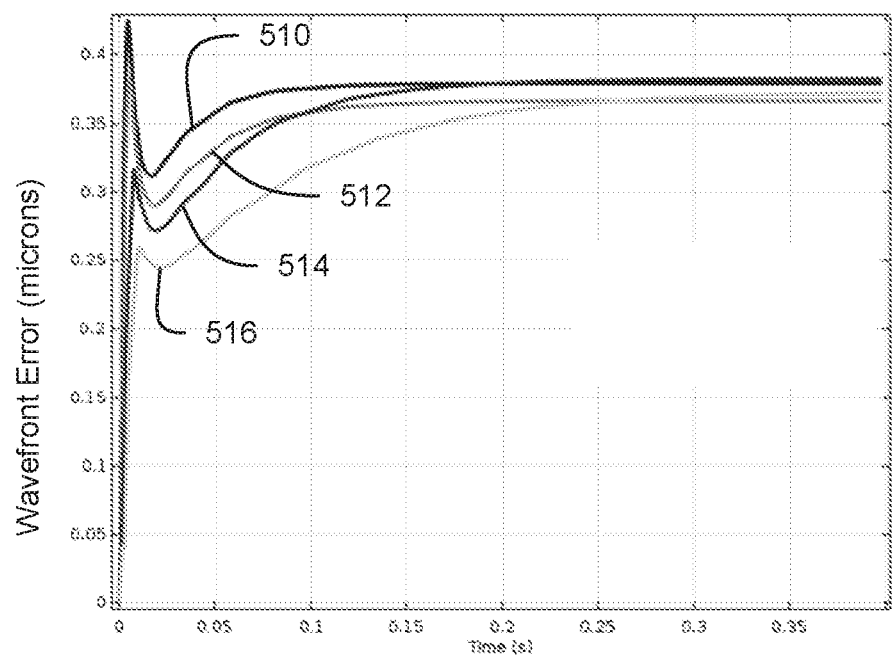

FIG. 10D is similar to FIG. 9D, and shows that wavefront error from optical aberration except for piston and tilt decreases as the cone angle 402 of the liquid lens 10 becomes larger to widen the truncated cone structure of the cavity 12. A comparison of FIG. 9D to FIG. 10D shows that increasing the narrow diameter 404 of the liquid lens 10 from 1.8 mm to 2.0 mm causes the wavefront error to decrease. In some cases, the trefoil can be reduce more than the coma is increased, so that increasing the cone angle has an overall effect or reducing the aggregate wavefront error.

FIGS. 11A-11D are charts showing data from liquid lenses having different cone angles 402 as the liquid lenses are transitioned from a state of no optical tilt to a state having an optical tilt angle 32 of 0.6 degrees (e.g., in response to a step-function input signal). The liquid lenses used for FIGS. 11A-11B were the same as those used for FIGS. 9A-9D, except that truncated cone of the liquid lenses used for FIGS. 11A-11B had a narrow diameter 404 of 2.2 mm. The cone height was 600 microns, and the above-cone height was 30 microns, for a cavity height of 630 microns. Line 520 corresponds to a liquid lens 10 having a cone angle 402 of 30 degrees. Line 522 corresponds to a liquid lens 10 having a cone angle 402 of 40 degrees. Line 524 corresponds to a liquid lens 10 having a cone angle 402 of 50 degrees. Line 526 corresponds to a liquid lens 10 having a cone angle 402 of 60 degrees.

Figure 11A:
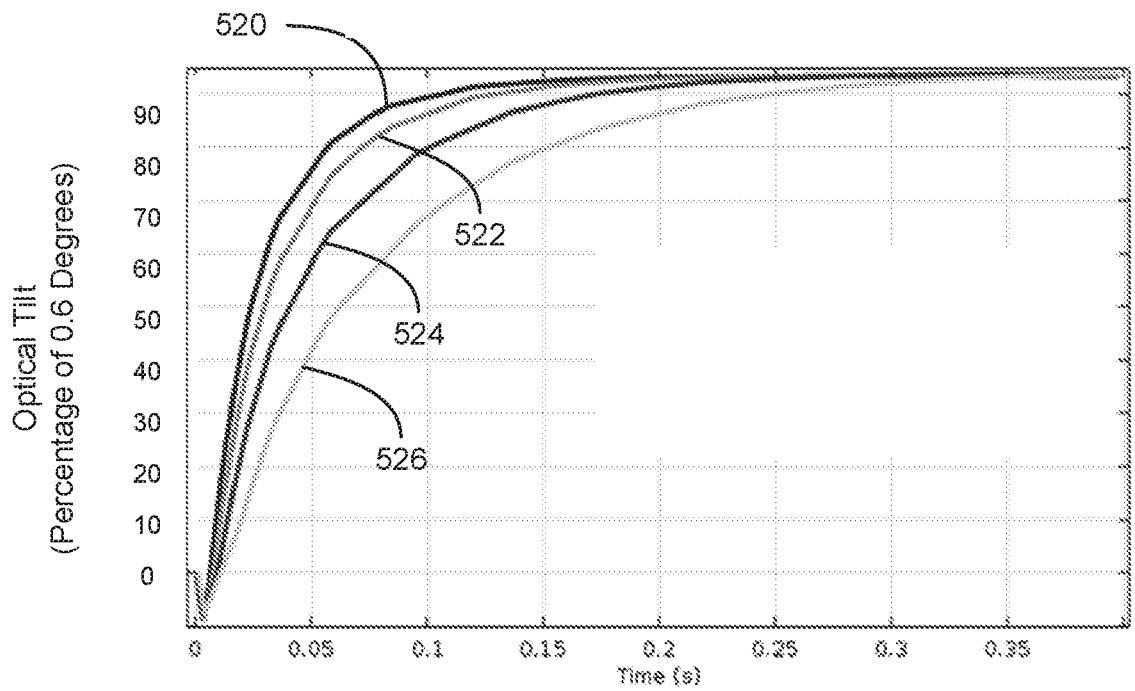

FIG. 11A is similar to FIG. 9A, and shows that the response time of the liquid lens slows down as the cone angle 402 becomes wider. A comparison of FIG. 10A and FIG. 11AA shows that increasing the narrow diameter 404 of the liquid lens 10 from 2.0 mm to 2.2 mm causes the response time of the liquid lens 10 to further increase, indicating that the liquid lens 10 has further slowed down.

Figure 11B:
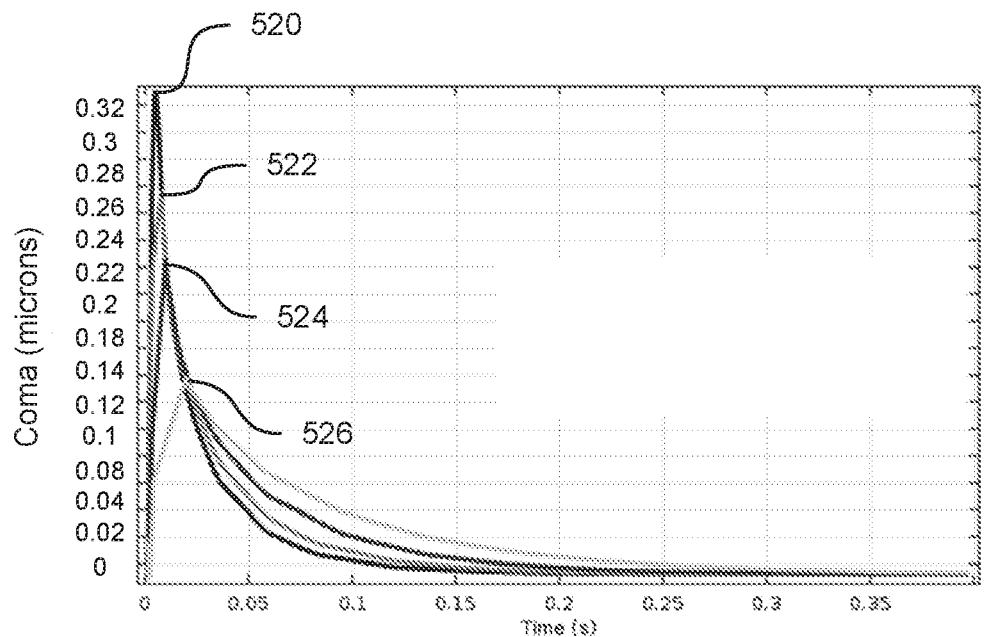

FIG. 11B is similar to FIG. 9B, and shows that peak coma optical aberration decreases as the cone angle 402 of the liquid lens 10 becomes larger to widen the truncated cone structure. However, overall coma optical aberration over time can be increased as the cone angle 402 is increased to widen the cone. A comparison of FIG. 10B to FIG. 11B shows that increasing the narrow diameter 404 of the liquid lens 10 from 2.0 mm to 2.2 mm causes the peak coma optical aberration to further decrease. However, increasing the narrow diameter 404 caused the overall coma over time to increase.

Figure 11C:
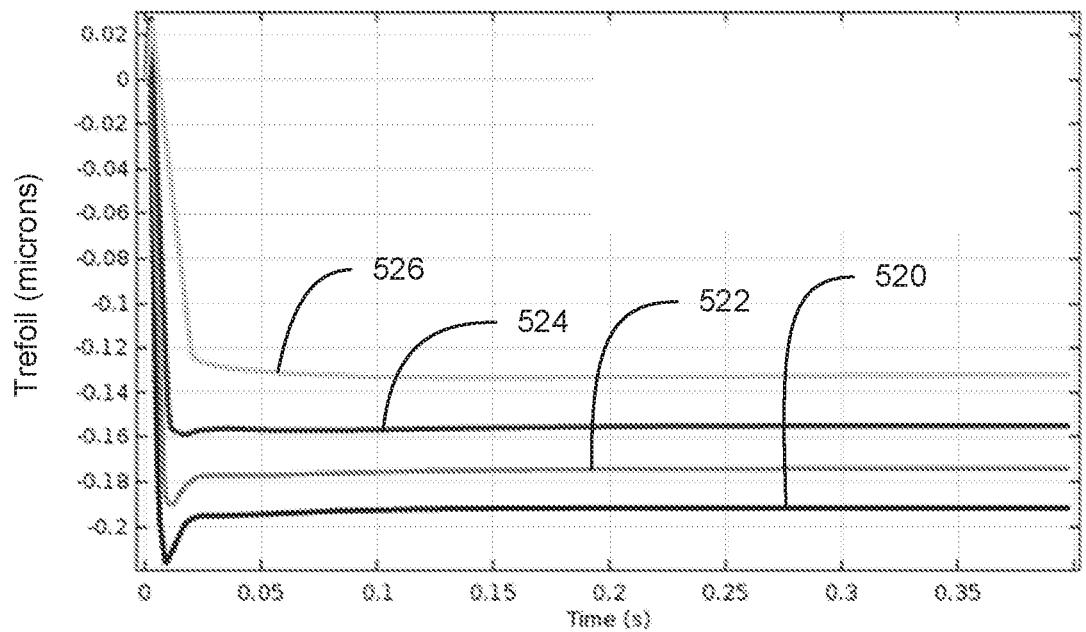

FIG. 11C is similar to FIG. 9C, and shows that trefoil optical aberration decreases as the cone angle 402 of the liquid lens 10 becomes larger to widen the truncated cone structure of the cavity 12. A comparison of FIG. 10C to FIG. 11C shows that increasing the narrow diameter 404 of the liquid lens 10 from 2.0 mm to 2.2 mm causes the trefoil optical aberration to further decrease.

Figure 11D:
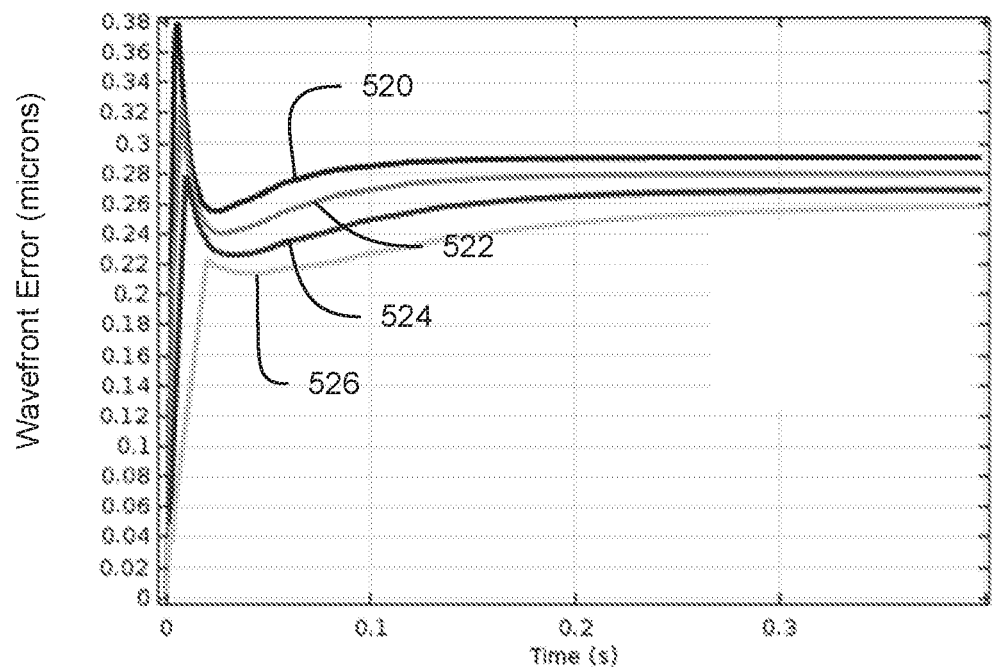

FIG. 11D is similar to FIG. 9D, and shows that wavefront error from optical aberration except for piston and tilt decreases as the cone angle 402 of the liquid lens 10 becomes larger to widen the truncated cone structure of the cavity 12. A comparison of FIG. 10D to FIG. 11D shows that increasing the narrow diameter 404 of the liquid lens 10 from 2.0 mm to 2.2 mm causes the wavefront error to decrease. In some cases, the trefoil can be reduce more than the coma is increased, so that increasing the cone angle has an overall effect or reducing the aggregate wavefront error.

As illustrated by FIGS. 9A-11D, increasing the narrow portion diameter 404 (e.g., which can operate as an optical aperture) can improve the optical quality, such as by reducing aggregate optical aberrations, but can also increase the response time, or slow down, the liquid lens 10. A wider aperture formed by widening the narrow diameter can also have other optical benefits, such as permitting more light to pass through the liquid lens to produce the images. A larger aperture can enable images to be generated faster (e.g., a faster shutter speed), and can reduce motion blur. A larger aperture can also improve the field of view characteristics of the camera system (e.g., to produce a bokeh effect in images generated by the camera system).

FIGS. 12A-12D are charts showing data from liquid lenses having different sizes for the narrow diameter 404 of the truncated cone structure in the liquid lens 10 as the liquid lenses are transitioned from a state of no optical tilt to a state having an optical tilt angle 32 of 0.6 degrees (e.g., in response to a step-function input signal). The liquid lenses used for FIGS. 12A-12D had a cone angle 402 of 30 degrees, a cone height of 600 microns, and an above-cone height of 123 microns, for a cavity height of 723 microns. For FIGS. 12A-12D, the second fluid height 416 had a value of 175 microns, which can be measured when the fluid interface 15 is flat (e.g., 0 diopters and no tilt). Line 530 corresponds to a liquid lens 10 having a narrow diameter 404 of 1.8 mm, Line 532 corresponds to a liquid lens 10 having a narrow diameter 404 of 2.0 mm, Line 534 corresponds to a liquid lens 10 having a narrow diameter 404 of 2.2 mm, Line 536 corresponds to a liquid lens 10 having a narrow diameter 404 of 2.5 mm, Line 538 corresponds to a liquid lens 10 having a narrow diameter 404 of 3.0 mm.

Figure 12A:
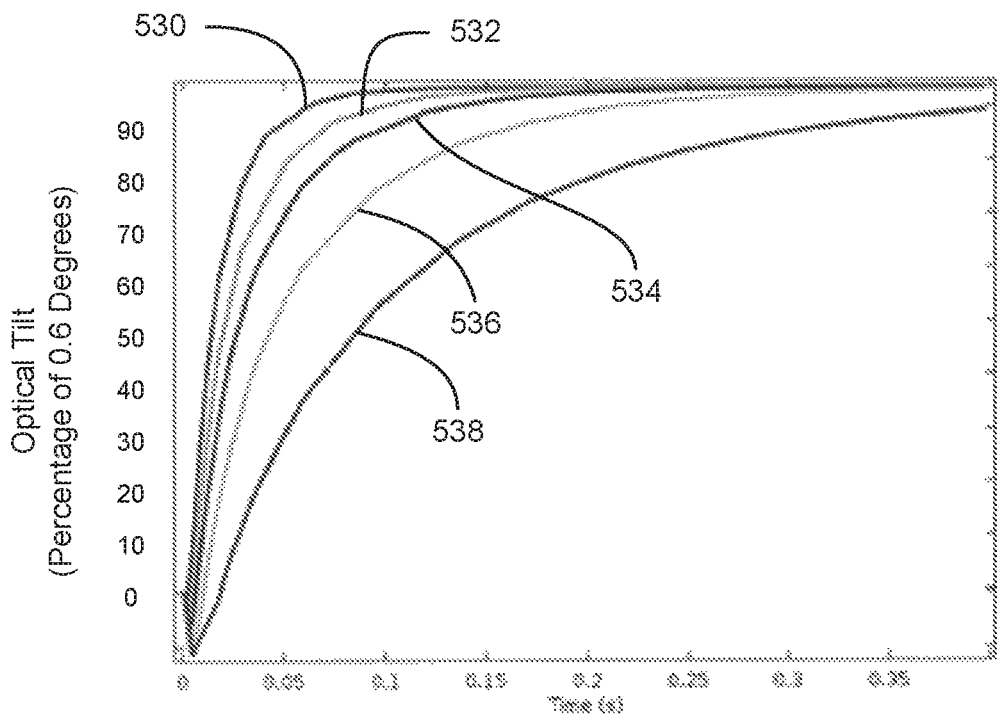
Figure 12B:
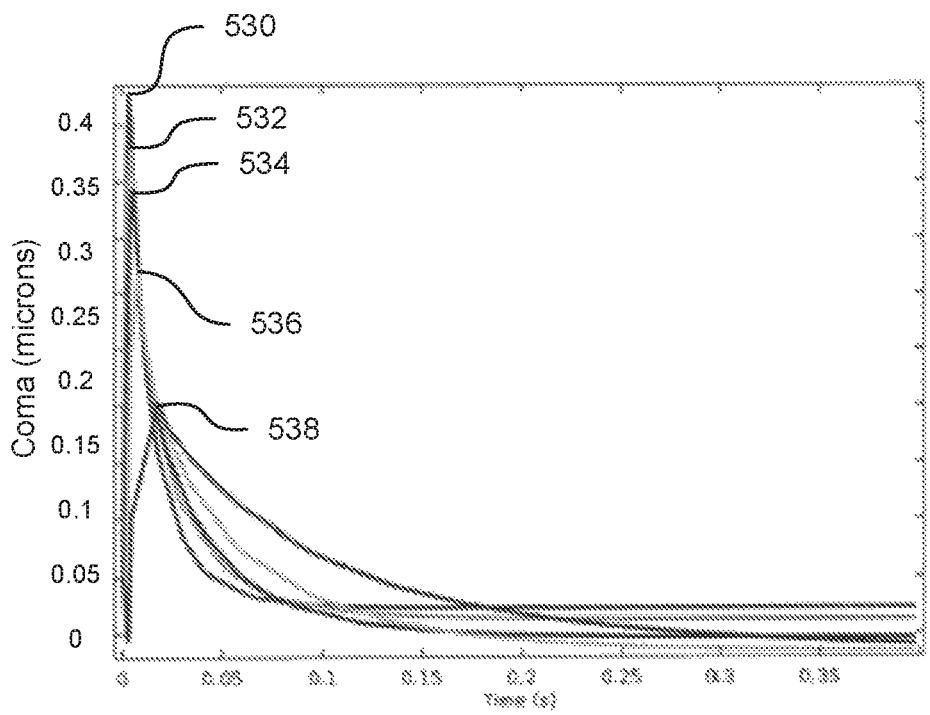
Figure 12C:
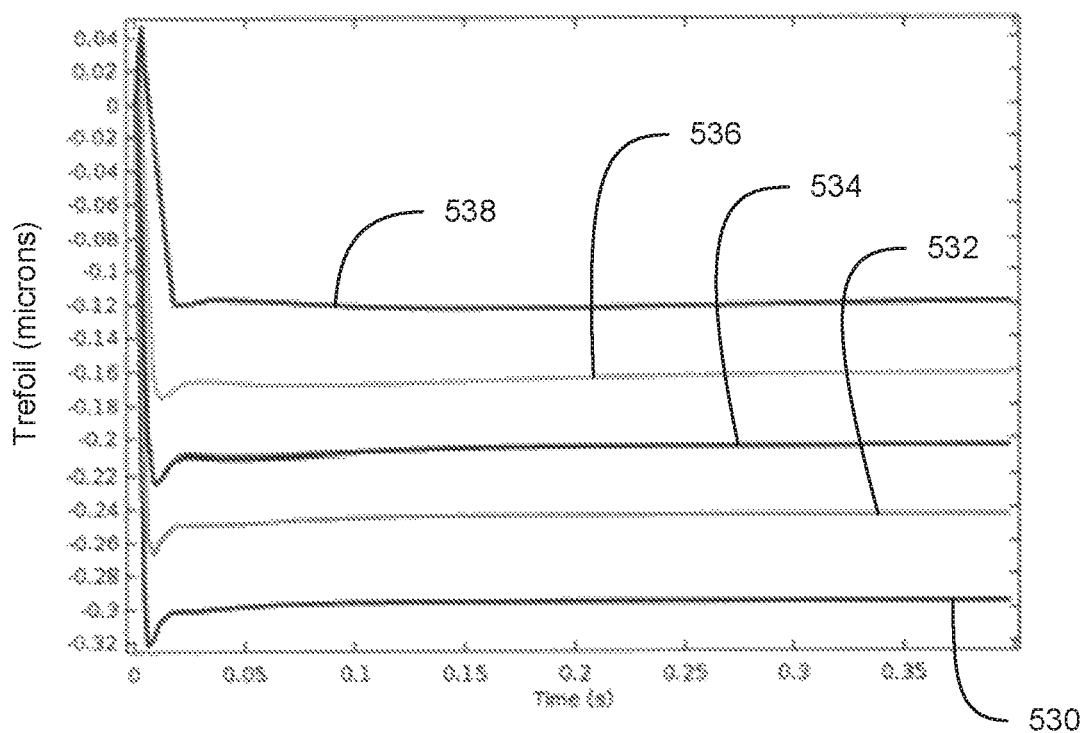
Figure 12D:
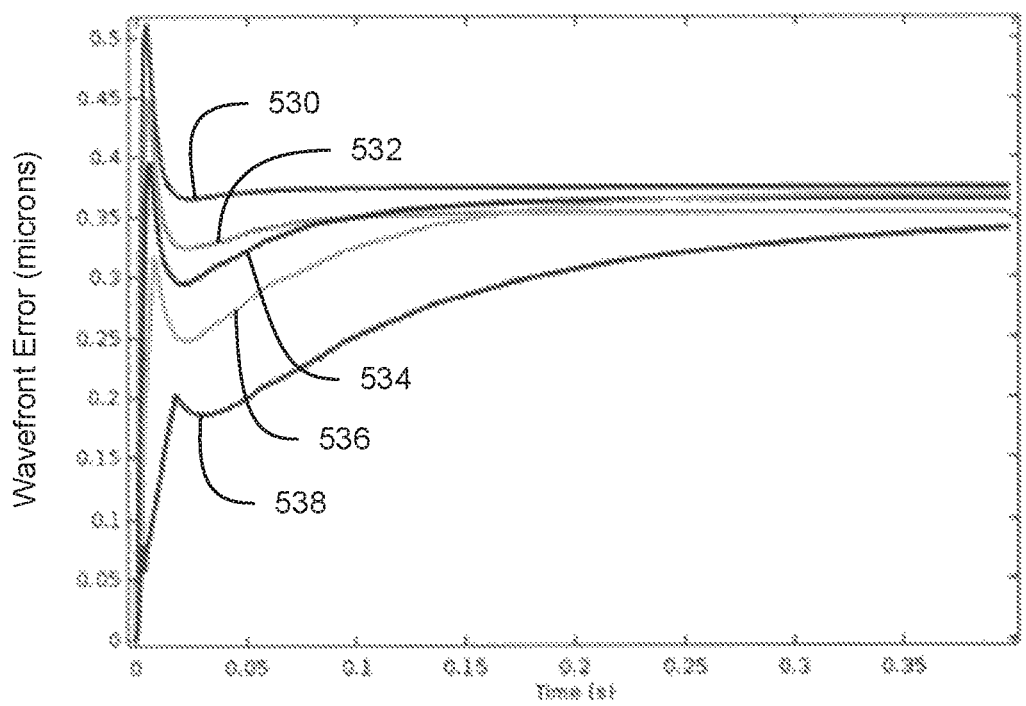

FIG. 12A is similar to FIGS. 9A, 10A, and 11A and shows that the response time of the liquid lens increases, or the liquid lens slows down, as the narrow diameter 404 of the liquid lens 10 increases from 1.8 mm to 3.0 mm. FIG. 12B is similar to FIGS. 9B, 10B, and 119 and shows that peak coma optical aberration decreases as the narrow diameter 404 of the liquid lens 10 increases from 1.8 mm to 3.0 mm. However, increasing the narrow diameter 404 caused the overall coma over time to increase. FIG. 12C is similar to FIGS. 9C, 10C, and 11C and shows that trefoil optical aberration decreases as the narrow diameter 404 of the liquid lens 10 increases from 1.8 mm to 3.0 mm. FIG. 12D is similar to FIGS. 9D, 10D, and 11D and shows that aggregate wavefront error from optical aberration except for piston and tilt decreases as the narrow diameter 404 of the liquid lens 10 increases from 1.8 mm to 3.0 mm. In some cases, the trefoil can be reduce more than the coma is increased, so that increasing the cone angle has an overall effect or reducing the aggregate wavefront error.

Figure 13A:
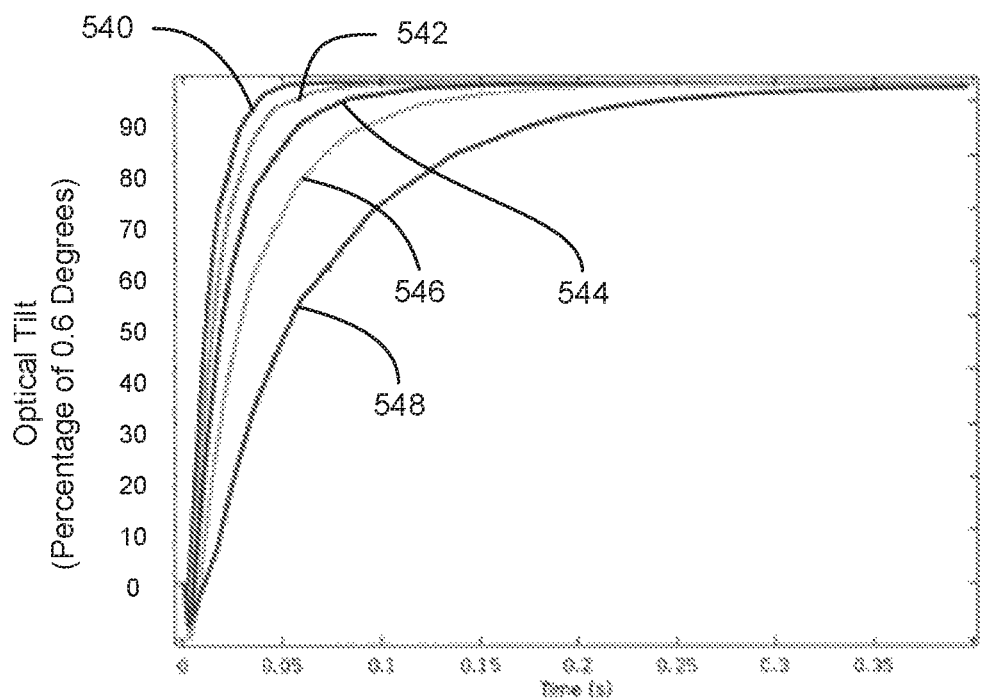
Figure 13B:
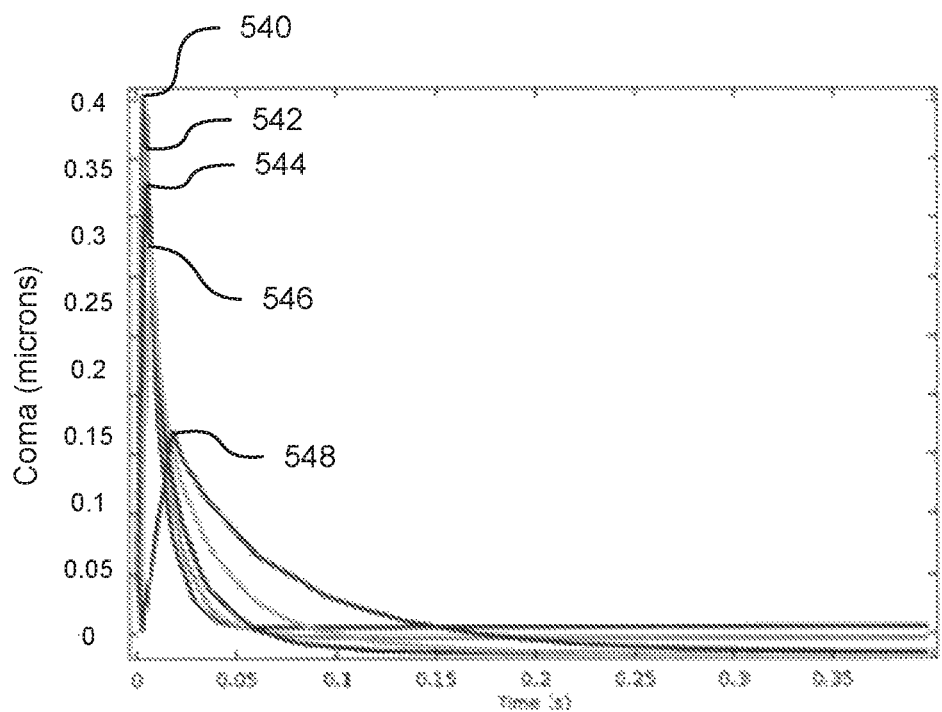

FIGS. 13A-13B are charts showing data from liquid lenses having different sizes for the narrow diameter 404 of the truncated cone structure in the liquid lens 10 as the liquid lenses are transitioned from a state of no optical tilt to a state having an optical tilt angle 32 of 0.6 degrees (e.g., in response to a step-function input signal). The liquid lenses used for FIGS. 13A-13D are the same as the liquid lenses used for FIG. 12A-12B, except that the second fluid height 416 of the liquid lenses used for FIGS. 13A-13B is 250 microns, as compared to 175 microns for the liquid lenses used in FIGS. 12A-12D. Accordingly, comparing FIGS. 12A-12D to FIGS. 13A-13D can illustrate the effect of increasing the height 416 of the second fluid 16 (e.g., the oil). For FIG. 13A-13B, the liquid lenses had a cone angle 402 of 30 degrees, a cone height of 600 microns, and an above-cone height of 123 microns. Line 540 corresponds to a liquid lens 10 having a narrow diameter 404 of 1.8 mm. Line 542 corresponds to a liquid lens 10 having a narrow diameter 404 of 2.0 mm. Line 544 corresponds to a liquid lens 10 having a narrow diameter 404 of 2.2 mm. Line 546 corresponds to a liquid lens 10 having a narrow diameter 404 of 2.5 mm. Line 548 corresponds to a liquid lens 10 having a narrow diameter 404 of 3.0 mm.

FIG. 13A is similar to FIG. 12A and shows that the response time of the liquid lens increases, or the liquid lens slows down, as the narrow diameter 404 of the liquid lens 10 increases from 1.8 mm to 3.0 mm. A comparison of FIG. 12A to FIG. 13A shows that increasing the height 416 of the second fluid 16 can reduce the response time, indicating that the liquid lens speeds up. Accordingly, adding additional fluid to the liquid lens and/or increasing the height of the liquid lens can improve the response time, making the liquid lens faster, which can be a surprising result. One may expect that increasing the amount of fluid in the liquid lens would slow the liquid lens down. Increasing the amount of the second fluid can cause the fluid interface to be positioned higher up the cone, which can result in a larger fluid interface, and one might expect that this larger fluid interface would be slower (e.g., having a longer response time). However, as discussed here, increasing the height of the second fluid was found to speed up the lens (e.g., decrease the response time).

Increasing the distance between the bottom window and the fluid interface by increasing the height of the second fluid) can improve the response time, but can have diminishing returns as additional fluid is added. Also, if additional volume of the second fluid is added to cause the fluid interface to be positioned near the top window, the response time can increase (e.g., due to shear forces at the boundary condition at the top window). Also, in some cases, the liquid lens can be designed to have increased damping, such as by positioning the fluid interface nearer to one or both of the windows. Accordingly, a balance between competing factors can be used to determine the amount of fluids to use and the position of the fluid interface. In some instances, the liquid lens can be configured so that the flat fluid interface can be positioned at about half the height of the cavity 12. In some instance the liquid lens can be configured (e.g., have fluid volumes) such that the flat fluid interface can be positioned at about 20%, about 30%, about 40%, about 50%, about 60%, about 70%, about 80%, or more of the cavity height, or any values or ranges therebetween, although other configuration are possible. In some cases, the actual position of the fluid interface can depend on the curvature of the fluid interface, which can influence the volumes of the fluids that would produce the fastest response time. For example, if a liquid lens has a fluid interface range of motion that is mostly or all concave (e.g., from the first fluid to the second fluid) such as in FIG. 1A, then the central area of the fluid interface (e.g., that is spaced away from the boundary conditions at the side walls of the cavity) can be relatively near the bottom window 18. In this embodiment, it can be advantageous to increase the volume of the second fluid 16, which can raise the fluid interface away from the bottom window 18, which can improve the response time (e.g., by positioning the central area of the fluid interface towards the middle of the cavity 12 for the average of the range of motion for the liquid lens). If a liquid lens has a fluid interface range of motion that is mostly or all convex (e.g., from the first fluid to the second fluid) such as in FIG. 1B, then the central area of fluid interface (e.g., that is spaced away from the boundary conditions at the side walls of the cavity) can be relatively near the top window 20. In some embodiments, it can be advantageous to decrease the volume of the second fluid 16, which can lower the fluid interface away from the top window 20, which can improve the response time (e.g., by positioning the central area of the fluid interface towards the middle of the cavity of the average range of motion for the liquid lens).

Figure 13C:
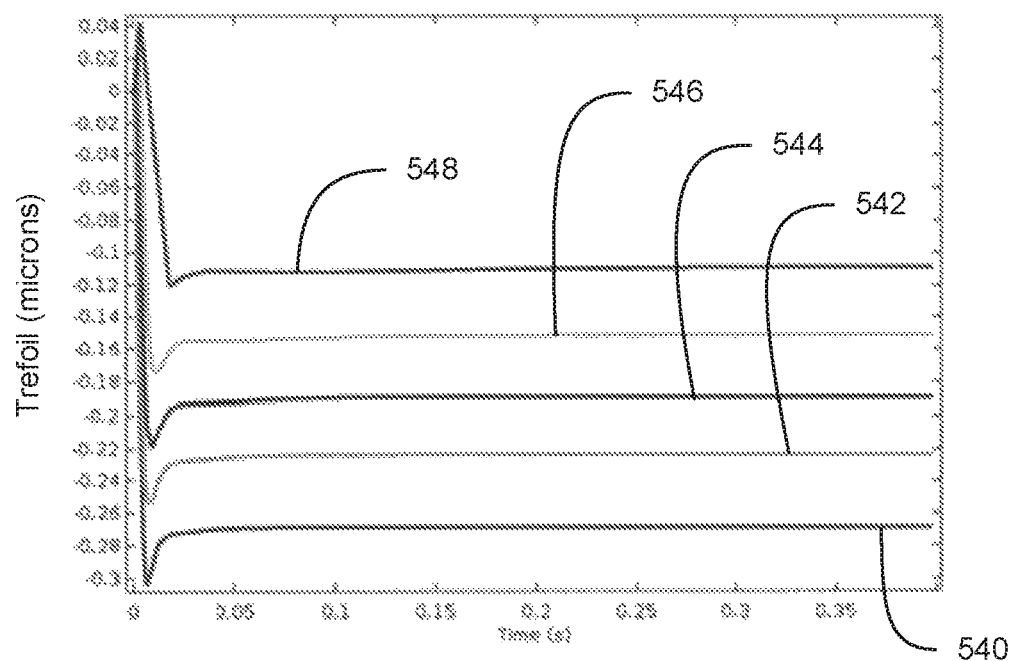
Figure 13D:
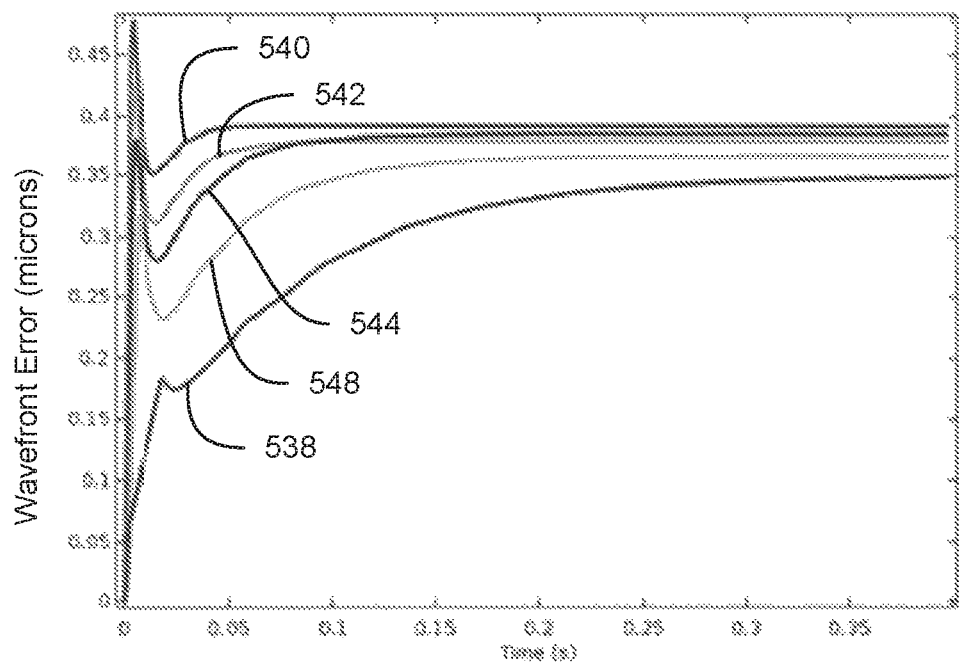

FIG. 13B is similar to FIG. 12B and shows that peak coma optical aberration decreases as the narrow diameter 404 of the liquid lens 10 increases from 1.8 mm to 3.0 mm. However, increasing the narrow diameter 404 caused the overall coma over time to increase. A comparison of FIG. 12B to FIG. 13B shows that increasing the height 416 of the second fluid 16 can reduce peak coma optical aberration for the liquid lens 10. The overall coma can also be reduced by increasing the height 416 of the second fluid 16 (e.g., to move the fluid interface towards a center of the cavity height. FIG. 13C is similar to FIG. 12C, and shows that trefoil optical aberration decreases as the narrow diameter 404 of the liquid lens 10 increases from 1.8 mm to 3.0 mm. A comparison of FIG. 12C to FIG. 13C shows that increasing the height 416 of the second fluid 16 can reduce trefoil optical aberration for the liquid lens 10. For example, moving the fluid interface 15 up the sidewalls can cause more of the periphery of the fluid interface to be hidden from the image sensor, so that the trefoil (which can be most pronounced at the periphery ) affects the resulting image less. FIG. 13D is similar to FIG. 12D and shows that aggregate wavefront error from optical aberrations except for piston and tilt decreases as the narrow diameter 404 of the liquid lens 10 increases from 1.8 mm to 3.0 mm. A comparison of FIG. 12D to FIG. 13D shows that increasing the height 416 of the second fluid 16 can reduce wavefront error for the liquid lens 10.

In some instances adding more of the second fluid (e.g., oil) to increase the height 416 of the second fluid 16 can improve both the response time of the liquid lens and the optical quality, such as by reducing optical aberrations. However, there can be limits on the amount that the second fluid height 416 can be increased. In some implementations, the available height of the liquid lens 10 can be limited, such as in a compact electronic device like a smartphone or tablet computer. In some instances, the second fluid 16 can be a relatively costly component of the liquid lens, and in some cases adding further amounts of the second fluid 16 can have diminishing return on improvements to the speed and/or optical quality of the liquid lens 10. In some cases, increasing the second fluid height can produce speed improvements in the liquid lens up to 2 mm for the second fluid height. Other lens configurations, such as using different fluids of different viscosity can have diminishing returns at other heights. In some embodiments, adding too much of the second fluid 16 can result in unacceptable color splitting, especially when the fluid interface 15 it tilted to an optical tilt angle 32. In some embodiments, optical features can be used to counter or prevent the color splitting. As can be seen in FIGS. 12A-13D, increasing the second fluid height 416 can have a more significant effect on reducing the response time than on reducing optical aberrations. In some instances, a wider cone angle 402 (e.g., 50 degrees, 60 degrees, or more) can cause increases in the second fluid height 416 to be more effective at reducing optical aberrations, for example by pushing the edge of the fluid interface 15 farther from the center of the liquid lens 10, thereby moving the edge of the fluid interface 15 out of the field of view.

Figure 14:
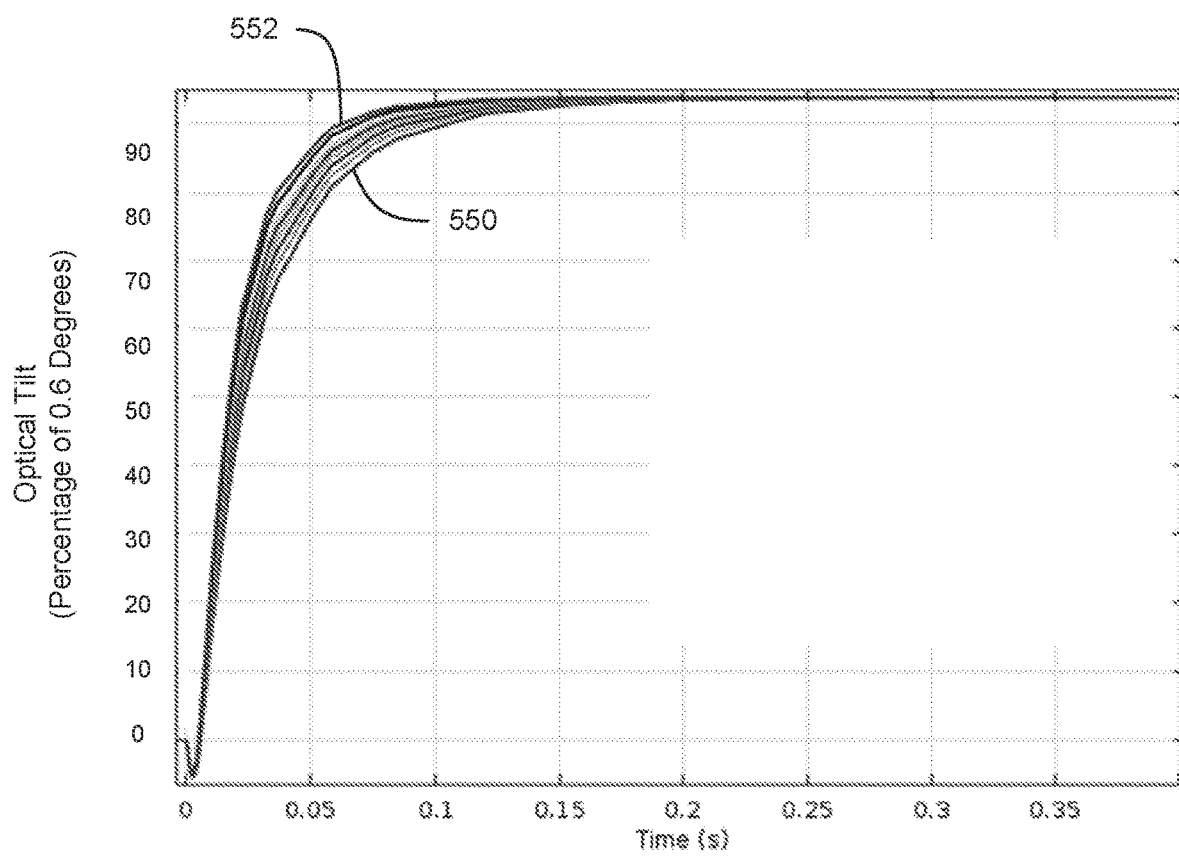

FIG. 14 is a chart showing data from liquid lenses having different sizes for the first fluid height 414 in the liquid lens as the liquid lenses are transitioned from a state of no optical tilt to a state having an optical tilt angle 32 of 0.6 degrees (e.g., in response to a step-function input signal). For FIG. 14, the liquid lenses had a cone angle 402 of 50 degrees, a cone height of 600 microns, and a narrow diameter 404 of 1.8 mm. The chart of FIG. 14 includes lines corresponding to liquid lenses having above-cone heights 412 of 30 microns, 60 microns, 90 microns, 120 microns, 150 microns, 180 microns, 240 microns, and 300 microns. Increasing the above-cone height 412 (and the overall cavity height) can cause the first fluid height 414 to increase, which can increase the distance between the fluid interface 15 and the upper window 20. The line labeled as 550 corresponds to the liquid lens having an above-cone height of 30 microns, and the line labeled as 552 corresponds to the liquid lens having an above-cone height of 300 microns. The lines between 550 and 552 in FIG. 14 are not labeled due to space limitations, but correspond to above-cone heights of 60 microns, 90 microns, 120 microns, 150 microns, 180 microns, and 240 microns (working from the bottom up). FIG. 14 illustrates that increasing the height 414 of the first fluid 14 by increasing the above-cone height 412 in the liquid lens) can reduce the response time to speed up the liquid lens 10. Accordingly, adding additional fluid to the liquid lens and/or increasing the height of the liquid lens can improve the response time, making the liquid lens faster, which can be a surprising result. One may expect that increasing the amount of fluid in the liquid lens would slow the liquid lens down. However, as discussed here, increasing the height of the first fluid was found to speed up the lens (e.g., decrease the response time).

FIGS. 15A-15D are Charts showing data from liquid lenses having different sizes for the first fluid height 414 in the liquid lens as the liquid lenses are transitioned from a state of no optical tilt to a state having an optical tilt angle 32 of 0.6 degrees (e.g., in response to a step-function input signal). For FIGS. 15A-15D, the liquid lenses had a cone angle 402 of 30 degrees, a cone height of 600 microns, a narrow diameter 404 of 1.85 mm, and a second fluid height 416 of 175 microns. Line 560 corresponds to a liquid lens having an above-cone height of 30 microns. Line 562 corresponds to a liquid lens having an above-cone height of 100 microns. Line 564 corresponds to a liquid lens having an above-cone height of 200 microns. Increasing the above-cone height 412 can cause the first fluid height 414 to increase, which can increase the distance between the fluid interface 15 and the upper window 20.

Figure 15A:
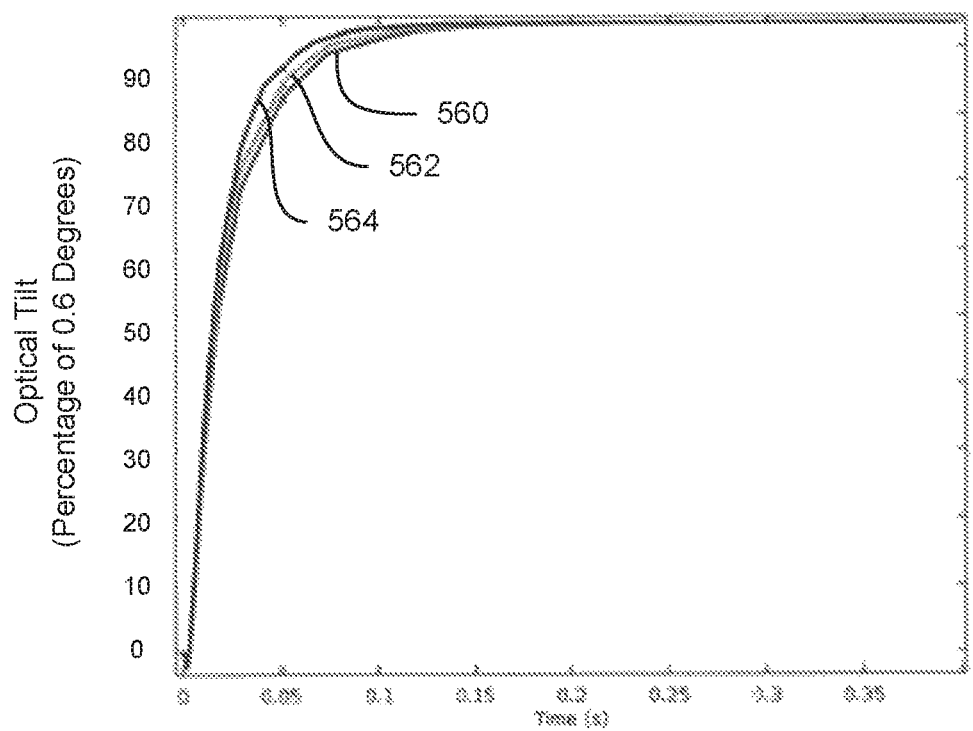
Figure 15B:
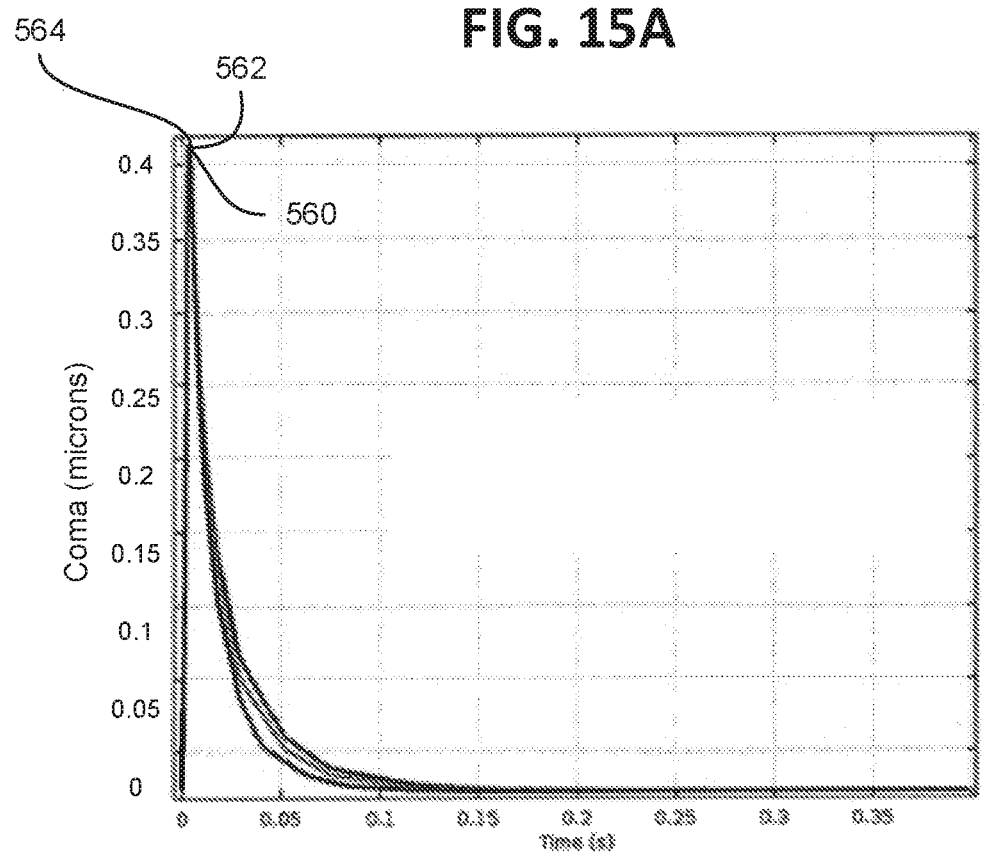
Figure 15C:
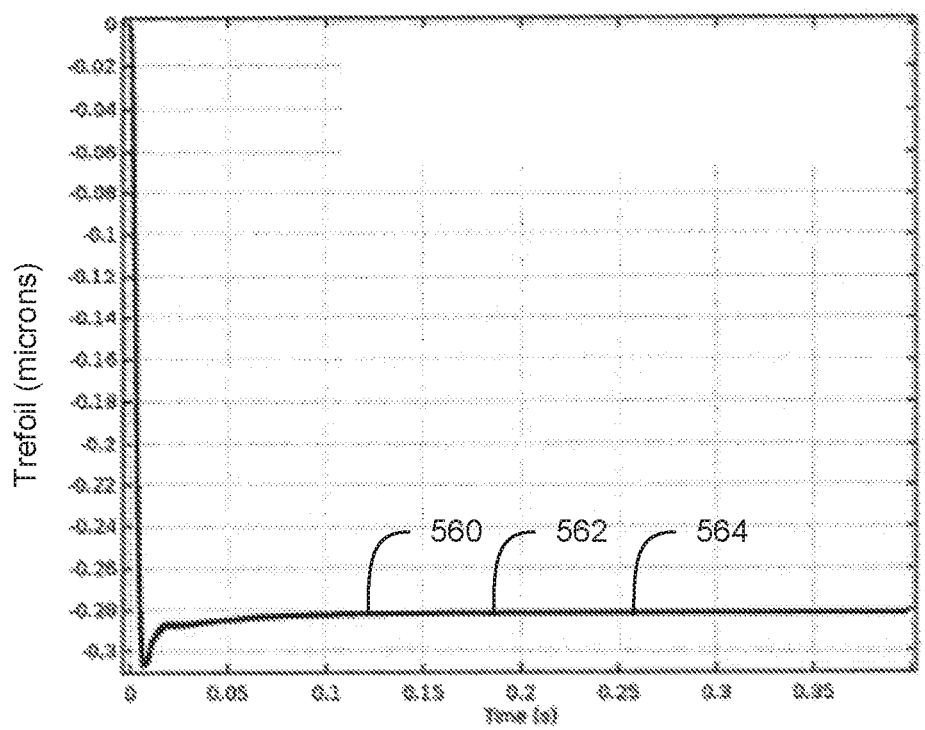
Figure 15D:
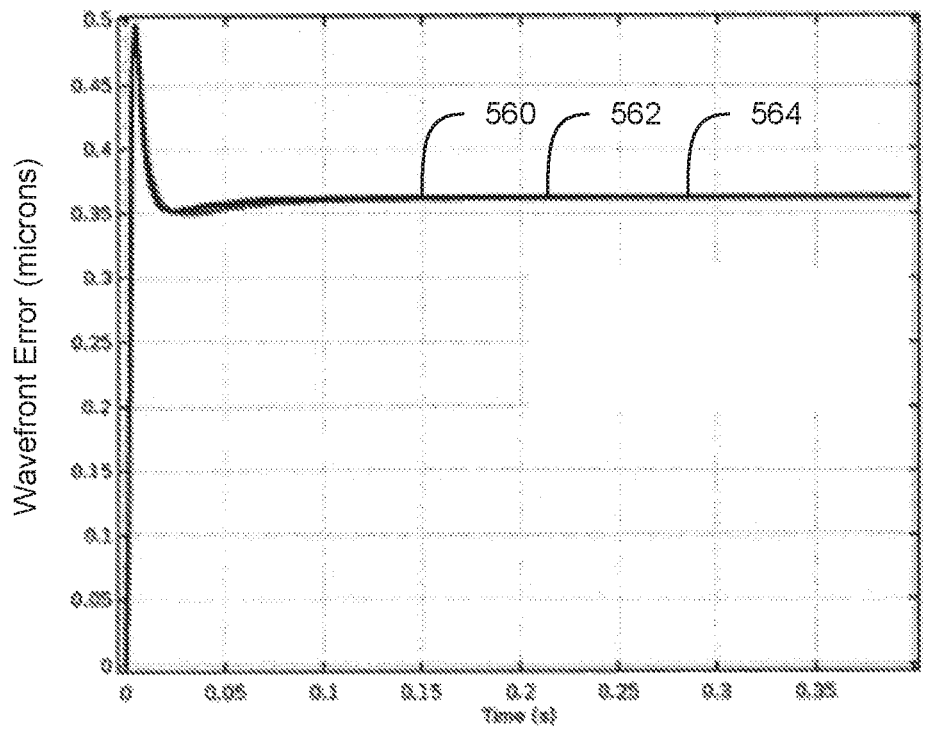

FIG. 15A shows response times similar to FIG. 9A, and shows that the response time decreases, or the liquid lens speeds up, as the first fluid height 414 increases (e.g., by increasing the above-cone height 412). The first fluid height 414 can be increased by other structural changes, such as by increasing the cone height 410. FIG. 15B shows that the liquid lenses having above-cone heights of 30 microns, 100 microns, and 200 microns have about the same amount of peak coma. The overall coma (e.g., area under the curve in plot 15B) can be lower for the larger above-cone height (e.g., line 564) and can be higher for the smaller above-cone height (e.g., line 560), by a small degree. FIG. 15C illustrates that the liquid lenses having above-cone heights of 30 microns, 100 microns, and 200 microns can have about the same amount of trefoil optical aberration. FIG. 15D illustrates that the liquid lenses having above-cone heights of 30 microns, 100 microns, and 200 microns can have about the same amount of wavefront error from optical aberrations, not including piston and tilt.

FIGS. 16A-16D are charts showing data from liquid lenses that are the same as those used for FIGS. 15A-15D, except that the liquid lenses of FIGS. 16A-16D have a second fluid height 416 of 250 micros, as opposed to the 175 microns as in FIGS. 15A-15D. Accordingly, comparing FIGS. 15A-15D to FIGS. 16A-16D can be illustrative of the effect of changing the second fluid height 416 in the liquid lens 10. For FIGS. 16A 16D, the liquid lenses had a cone angle 402 of 30 degrees, a cone height of 600 microns, a narrow diameter 404 of 1.85 mm, and a second fluid height 416 of 250 microns. Line 570 corresponds to a liquid lens having an above-cone height of 30 microns. Line 572 corresponds to a liquid lens having an above-cone height of 100 microns. Line 574 corresponds to a liquid lens having an above-cone height of 200 microns. Increasing the above-cone height 412 can cause the first fluid height 414 to increase, which can increase the distance between the fluid interface 15 and the upper window 20.

Figure 16A:
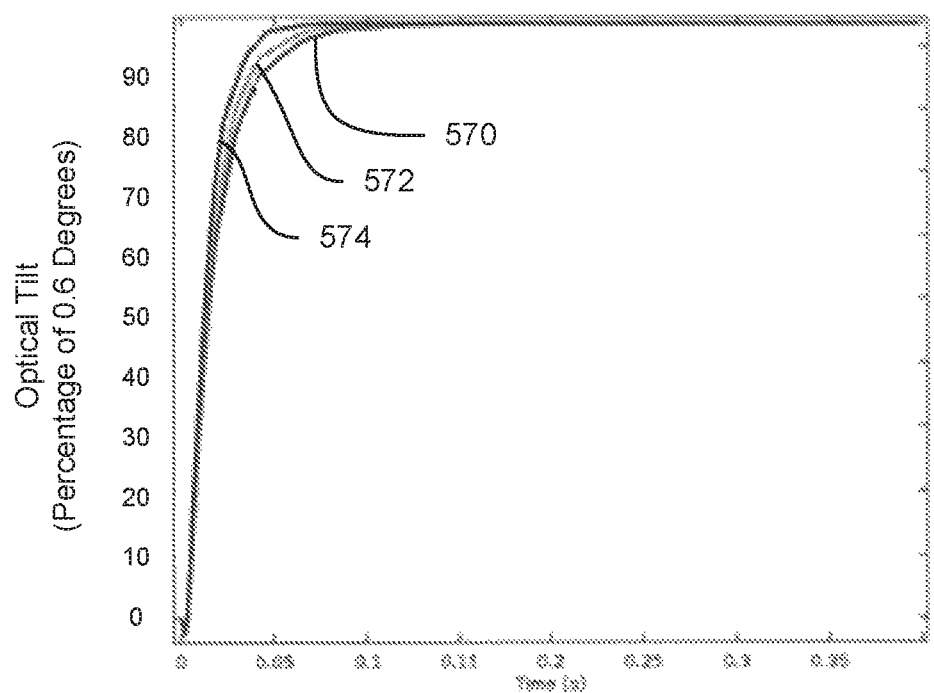
Figure 16B:
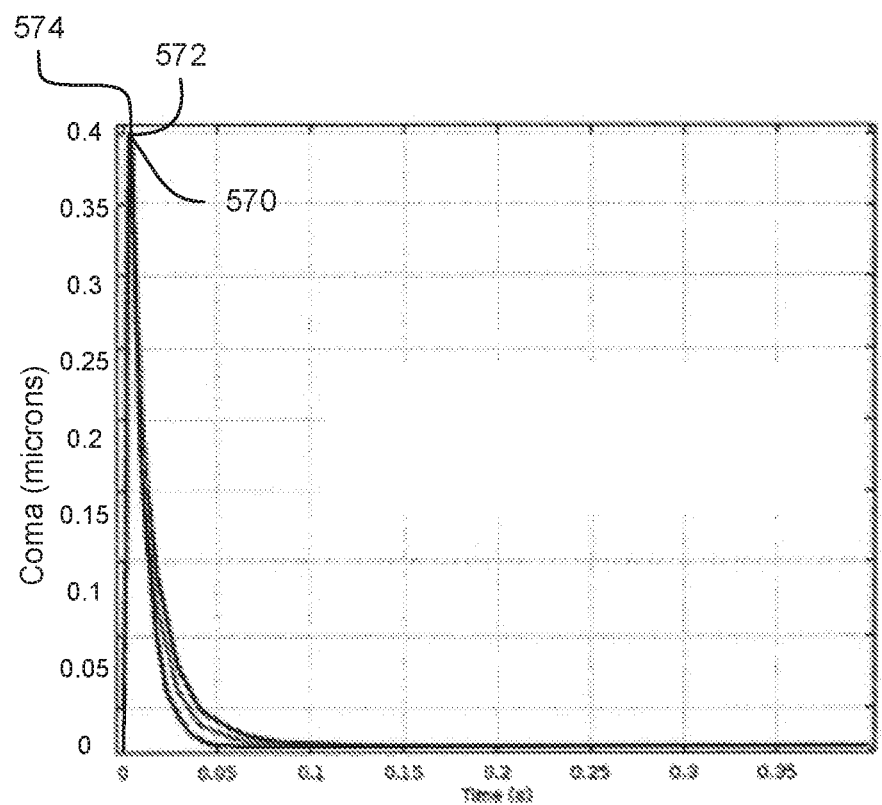
Figure 16C:
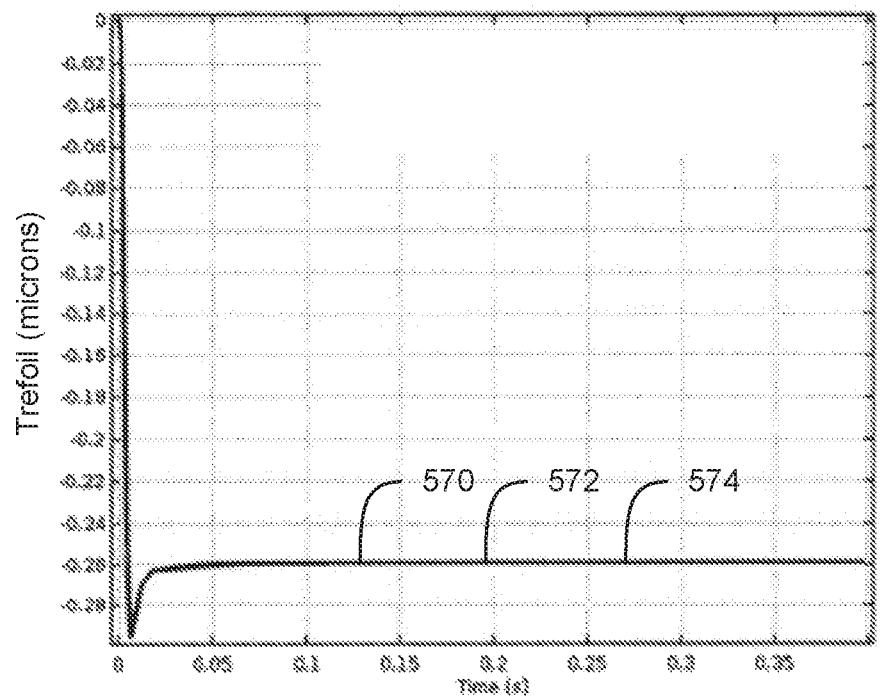
Figure 16D:
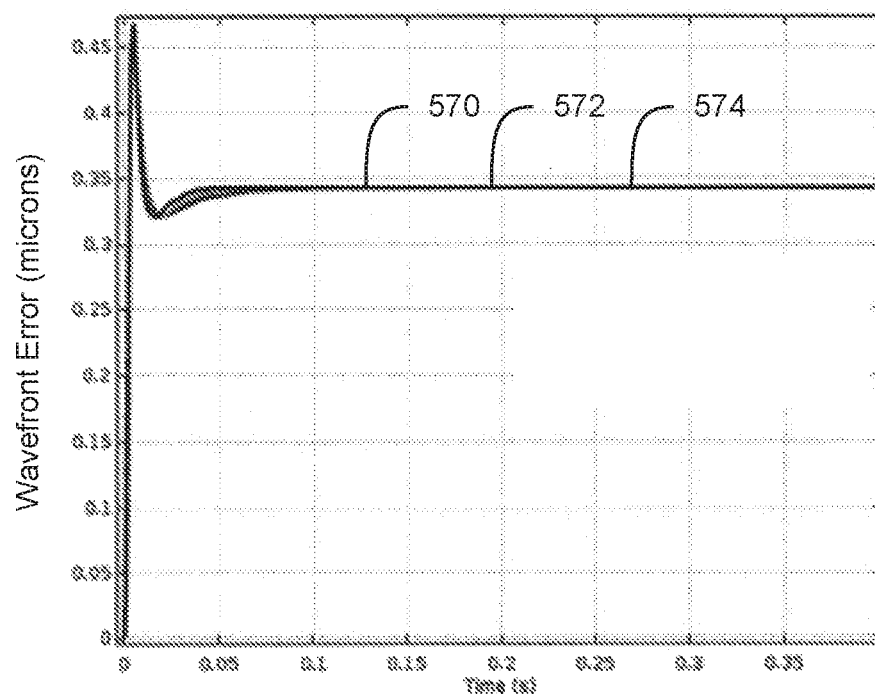

FIG. 16A shows response times similar to FIG. 9A, and shows that the response time decreases, or the liquid lens speeds up, as the first fluid height 414 increases by increasing the above-cone height 412). A comparison of FIG. 15A to FIG. 16A shows that increasing the second fluid height 416 from 175 microns to 250 microns can cause the response time to decrease, indicating the liquid lens speeds up. FIG. 16B shows that the liquid lenses having above-cone heights of 30 microns, 100 microns, and 200 microns have about the same amount of peak coma. The overall coma (e.g., area under the curve in plot 16B) can be lower for the larger above-cone height (e.g., line 574) and can be higher for the smaller above-cone height line 570), by a small degree. A comparison of FIG. 15B to FIG. 16B shows that increasing the second fluid height 416 from 175 microns to 250 microns can reduce coma optical aberration, in some cases by only a relatively small degree. FIG. 16C illustrates that the liquid lenses having above-cone heights of 30 microns, 100 microns and 200 microns can have about the same amount of trefoil optical aberration. A comparison of FIG. 15C to 16C shows that increasing the second fluid height 416 from 175 microns to 250 microns can reduce trefoil optical aberration, in some cases by only be a relatively small degree. FIG. 16D illustrates that the liquid lenses having above-cone heights of 30 microns, 100 microns, and 200 microns can have about the same amount of wavefront error from optical aberrations, not including piston and tilt. A comparison of FIG. 15D to 16D shows that increasing the second fluid height 416 from 175 microns to 250 microns can reduce wavefront error from optical aberrations, not including piston and tilt, in some cases by only a relatively small degree.

In some embodiments, the liquid lens 10 can have a chamber 12 that includes a truncated cone (e.g., an inverted truncated cone, depending on the orientation) structure. When the fluid interface 15 is not tilted, the edge of the fluid interface 15 can have the shape of a circle. When the fluid interface 15 is tilted to an optical tilt angle 32, the edge of the fluid interface 15 can have an elliptical shape, which can degrade the optics of the liquid lens 10. For example, the elliptical shape of the fluid interface 15 can cause astigmatism in the light transmitted through the liquid lens 10. In some cases, the astigmatism can be worse for a cavity shape with a lower cone angle 402 (e.g., steeper side walls), than for a cavity shape with a larger cone angle 402 (e.g., wider angled side walls). Accordingly, various factors can be balanced to determine the properties of the liquid lens.

FIGS. 17A-17D are charts showing data from liquid lenses having different cone heights 410 and different fluid amounts as the liquid lenses are transitioned from a state of no optical tilt (e.g., a flat fluid interface) to a state having an optical tilt angle 32 of 0.6 degrees (e.g., in response to a step-function input signal). The liquid lenses used for FIGS. 17A-17D had a narrow diameter of 1.8 mm, a cone angle of 30 degrees, and an above-cone height of 30 microns. For lines 580, 582, and 584, the liquid lenses had a fill ratio of 0.5, with the flat fluid interface at the middle of the cavity, and with the first fluid height substantially equal to the second fluid height. For lines 590, 592, and 594, the liquid lenses had a fill ratio of 0.6, with the flat fluid interface at 60% of the cavity height (e.g., with a ratio between the first fluid height to the second fluid height of 4 to 6). For lines 580 and 590, the liquid lenses had a cone height of 400 microns (for a cavity height of 430 microns). For lines 582 and 592, the liquid lenses had a cone height of 500 microns (for a cavity height of 530 microns). For lines 584 and 594, the liquid lenses had a cone height of 600 microns (for a cavity height of 630 microns).

Figure 17A:
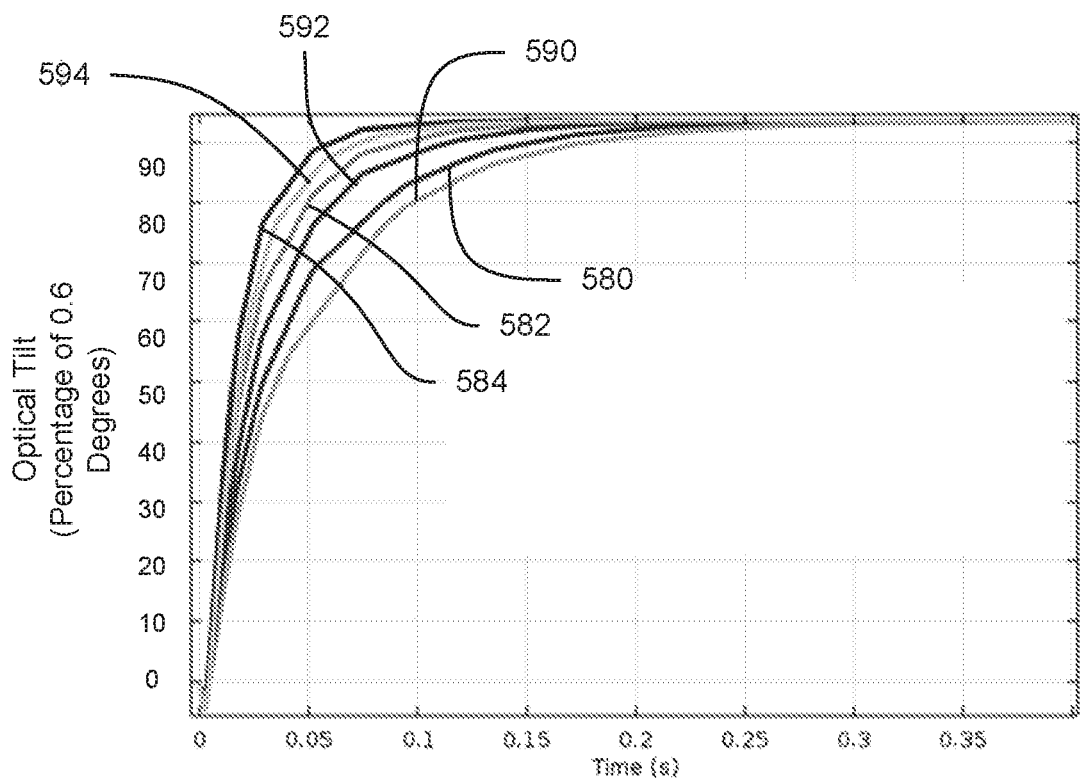
Figure 17B:
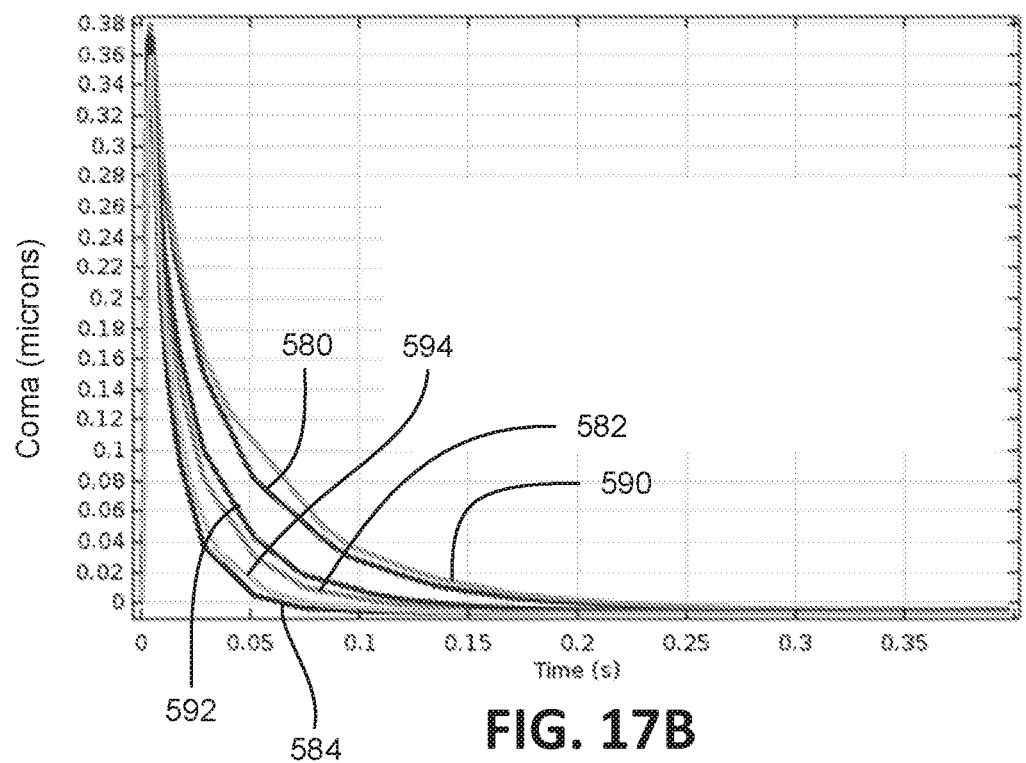

FIG. 17A is similar to FIG. 9A, and shows that the response time of the liquid lens improves as the cone height (and cavity height) increase. FIG. 17A also shows that the fill ratio of 0.5 produced a faster response time than the fill ratio of 0.6. FIG. 17B is similar to FIG. 9B, and that that overall coma optical aberration over time can be reduced by increasing the cone height (and cavity height). FIG. 17B also shows that the overall coma can be lower for the fill ratio of 0.5 than for 0.6. For the liquid lens of line 580, the coma can settle to 0.1 microns after about 45 ms. For the liquid lens of line 582, the coma can settle to 0.1 microns after about 26 ms. For the liquid lens of line 584, the coma can settle to 0.1 microns after about 17 ms. For the liquid lens of line 590, the coma can settle to 0.1 microns after about 58 ms. For the liquid lens of line 592, the coma can settle to 0.1 microns after about 29 ms. For the liquid lens of line 594, the coma can settle to 0.1 microns after about 20 ms. For the liquid lens of line 580, the coma can settle to about 0.17 microns after about 25 ms. For the liquid lens of line 582, the coma can settle to about 0.1 microns after about 25 ms. For the liquid lens of line 584, the coma can settle to about 0.06 microns after about 25 ms. For the liquid lens of line 590, the coma can settle to about 0.18 microns after about 25 ms. For the liquid lens of line 592, the coma can settle to about 0.12 microns after about 25 ms. For the liquid lens of line 594, the coma can settle to about 0.07 microns after about 25 ms.

Figure 17C:
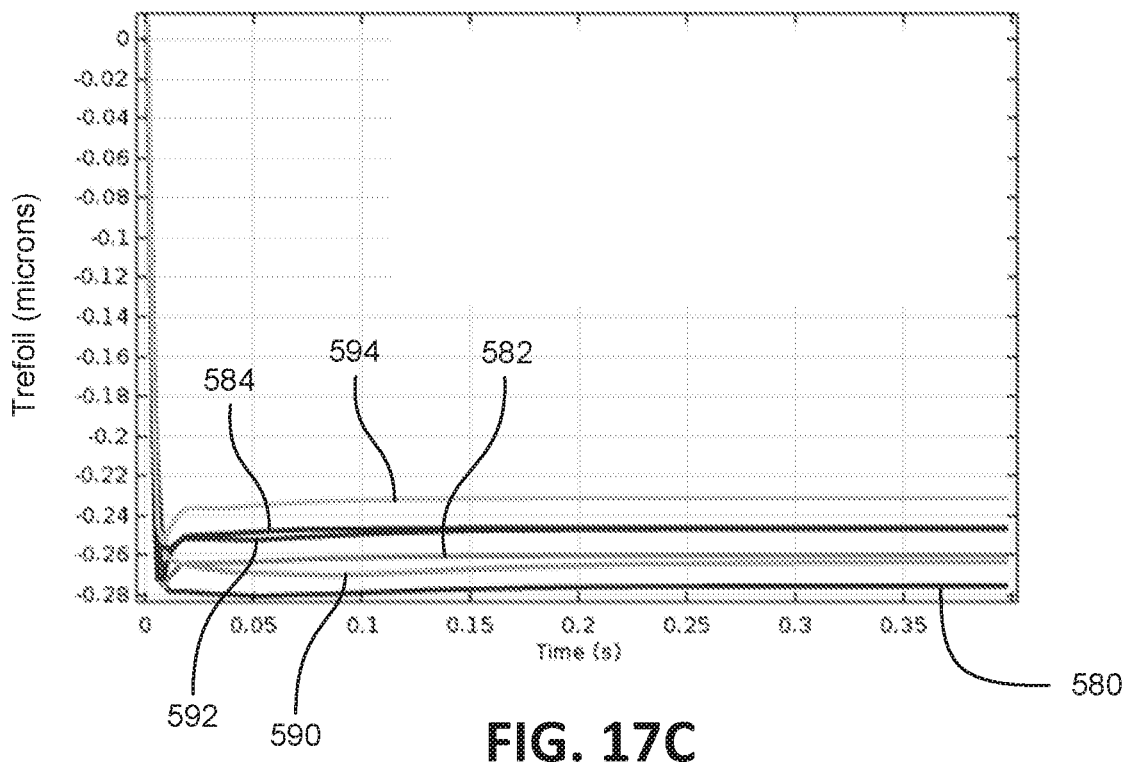
Figure 17D:
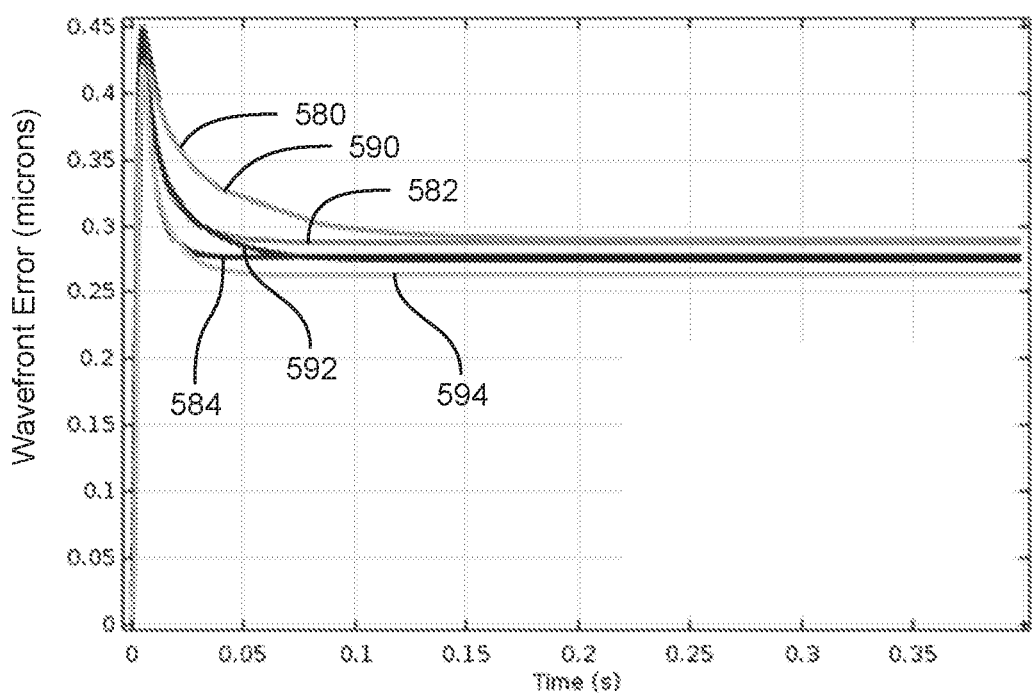

FIG. 17C is similar to FIG. 9C, and shows that trefoil optical aberration can decrease as the cone height (and cavity height) is increased, with the same fluid fill ratio. The taller cavity height with the same fill ratio can position the fluid interface higher up the sidewall, which can result in a larger peripheral region of the fluid interface that is "hidden" from the image sensor. FIG. 17C also shows that changing the fill ratio from 0.5 to 0.6 can decrease the trefoil. Changing the fill ratio from 0.5 to 0.6 can move the fluid interface up higher in the cavity, and increase the size of the peripheral portion of the fluid interface that is "hidden" from the image sensor. In some cases, increasing the fill ratio can increase some optical aberration (e.g., coma) while reducing other optical aberration (e.g., trefoil). Competing factors can be balanced to select a fluid fill ratio for a liquid lens. FIG. 17D is similar to FIG. 9D, and shows total wavefront error (except for piston and tilt). As can be seen in FIG. 17D, the wavefront error can be reduced by increasing the cone height from 400 microns (lines 580 and 590) to 500 microns (lines 582 and 592), and fluffier by increasing the cone height to 600 microns (lines 584 and 594). For a cone height of 600 microns (lines 584 and 594), increasing the fill ratio from 0.5 to 0.6 can reduce the overall wavefront error. For a cone height of 500 microns (lines 582 and 592), increasing the fill ratio from 0.5 to 0.6 can reduce the overall wavefront error. For a cone height of 400 microns (lines 580 and 590), the wavefront error is about the same for the fill ratios of 0.5 and 0.6. For the liquid lens of line 580, the wavefront error can be about 0.35 microns after about 25 ms. For the liquid lens of line 582, the wavefront error can be about 0.31 microns after about 25 ms. For the liquid lens of line 584, the wavefront error can be about 0.28 microns after about 25 ms. For the liquid lens of line 590, the wavefront error can be about 0.35 microns after about 25 ms. For the liquid lens of line 592, the wavefront error can be about 0.31 microns after about 25 ms. For the liquid lens of line 594, the wavefront error can be about 0.28 microns after about 25 ms.

Various examples are provided herein with optical aberrations measured in response to a step function tilt input that suddenly changes from 0 degrees optical tilt to 0.6 degrees of optical tilt (which can be achieved using the physical tilt angle of about 8 degrees, for example). In some cases, when implementing optical image stabilization, the tilt inputs can be more like a sinusoidal input than a step function input. For example, a person holding a camera (e.g., on a smartphone) can have a hand that shakes (e.g,. at about 10 Hz) at a generally sinusoidal pattern.

The fluid fill ratio can be relative to the full cavity height, or to the cone height. The height of the second fluid can be 25%, 30%, 45%, 40%, 45%, 50%, 55%, 60%, 65%, 70%,or 75% of the cone height or of the cavity height, or any values or ranges therebetween, although other configurations are possible.

Figure 18A:
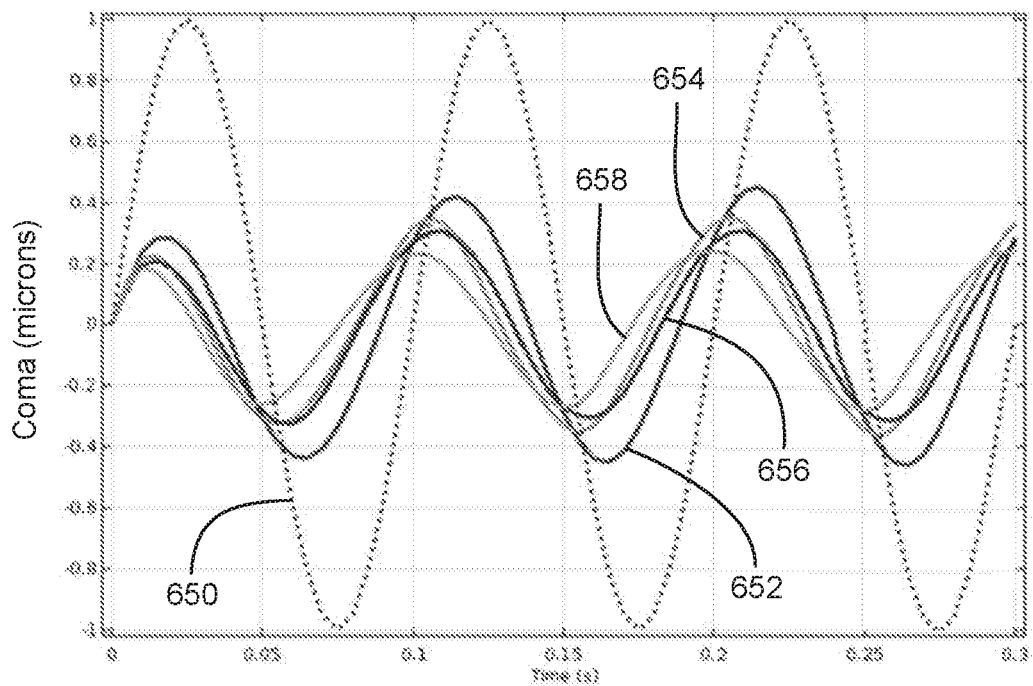
FIGS. 18A and 18B are plots showing coma optical aberration for example embodiments of liquid lenses.
Figure 18B:
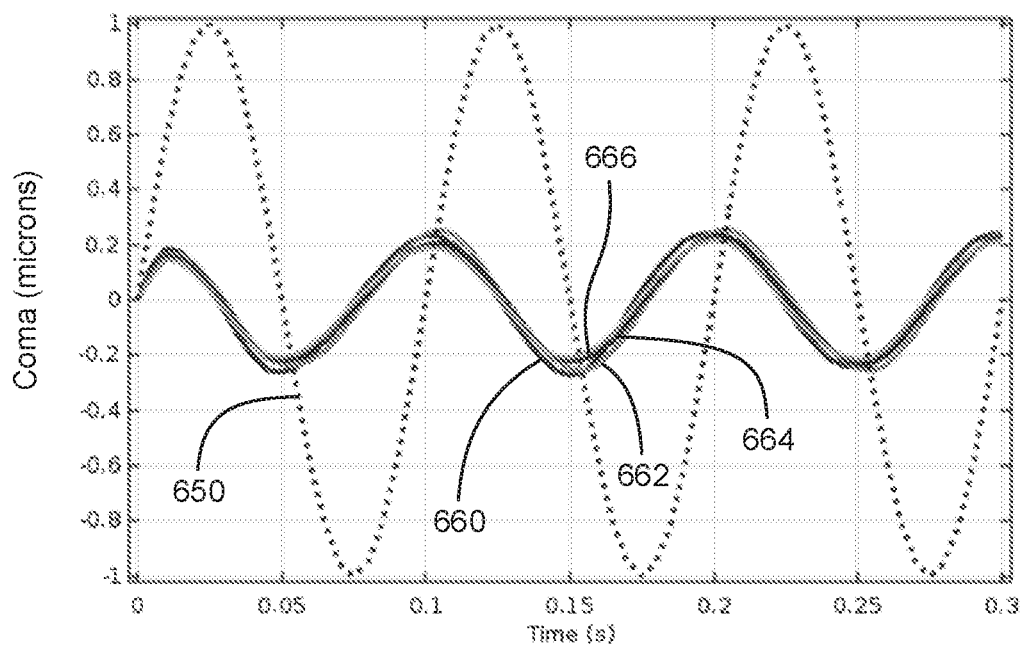

FIGS. 18A-18B show a plots of coma optical aberration resulting from a sinusoidal tilt input signal for liquid lenses having various cavity heights. The liquid lenses for FIGS. 18A and 18B had a narrow diameter of 1.8 mm, a cone angle of 30 degrees, a fill ratio of 0.5, and an above-cone height of 30 microns. Line 650 represents a sinusoidal tilt input with a frequency of 10 Hz. Line 652 represents a liquid lens having a cone height of 600 microns (e.g., for a cavity height of 630 microns). Line 654 represents a liquid lens having a cone height of 700 microns (e.g., for a cavity height of 730 microns). Line 656 represents a liquid lens having a cone height of 800 microns (e.g., for a cavity height of 830 microns). Line 658 represents a liquid lens having a cone height of 900 microns (e.g., for a cavity height of 930 microns). As the cavity height is increased from 630 microns to 930 microns (e.g., by increasing the cone height), the coma optical aberration can be reduced. In FIG. 18B, line 660 represents a liquid lens having a cone height of 900 microns (e.g., for a cavity height of 930 microns). Line 662 represents a liquid lens having a cone height of 1,000 microns (e.g., for a cavity height of 1,030 microns). Line 664 represents a liquid lens having a cone height of 1,100 microns (e.g., for a cavity height of 1,130 microns). Line 666 represents a liquid lens having a cone height of 1,200 microns (e.g., for a cavity height of 1,230 microns). As the cavity height is increased from 930 microns to 1,230 microns (e.g., by increasing the cone height), the coma optical aberration can be reduced, but the reduction in coma is much less than the coma reduction that resulted from cavity height changes between 630 microns and 930 microns. Increasing the cavity height can have diminishing returns for improving the optical quality (e.g., by reducing coma). In this particular example, the incremental improvement in coma is reduced significantly for increasing the cavity height above 930 microns, as compared to increasing the cavity height below 930 microns. Other configurations are possible, which can have diminishing returns at different cavity heights.

In some embodiments, the liquid lens 10 can have side walls that substantially conform to the shape of a sphere, which can improve the shape of the edge of the fluid interface 15 when tilted. The curved side walls might not perfectly conform to the shape of the hypothetical sphere in some locations, such as because of manufacturing tolerances or minor adjustments. For example, the curved side walls can vary from the hypothetical sphere by no more than about 15%, about 10%, about 5%, or about 3%, or any values or ranges therebetween, although other values can be used in some embodiments. In some embodiments, the side walls can substantially conform to an ellipsoid shape, an ovoid shape, or other curved shape.

Figure 19A:
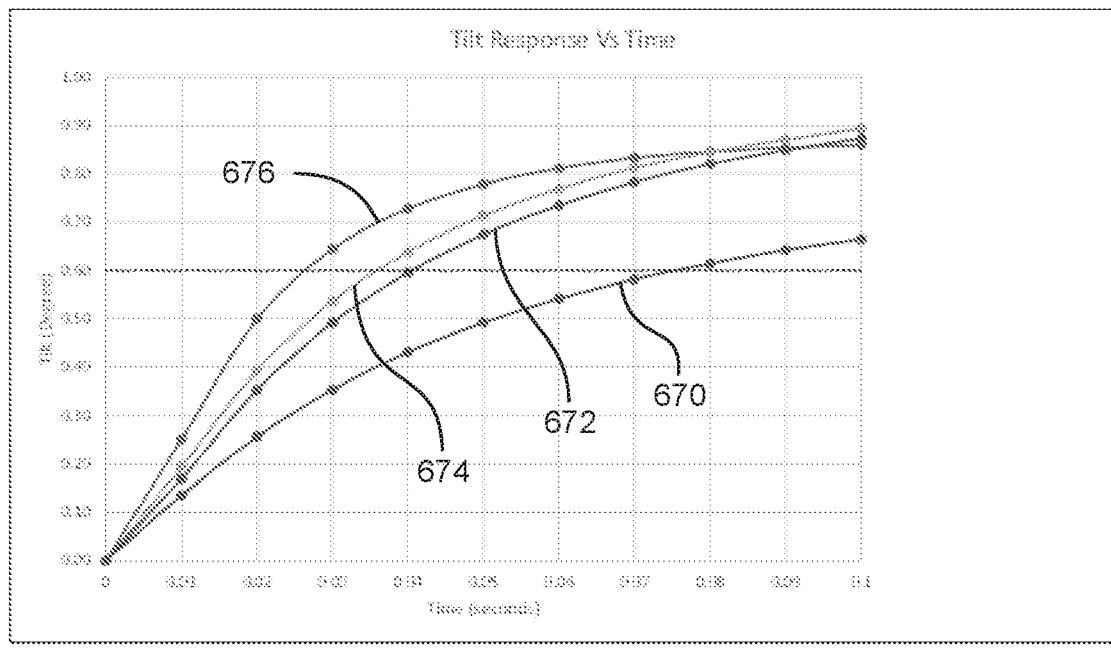
FIG. 19A is a plot showing tilt response time for example embodiments of liquid lenses.
Figure 19B:
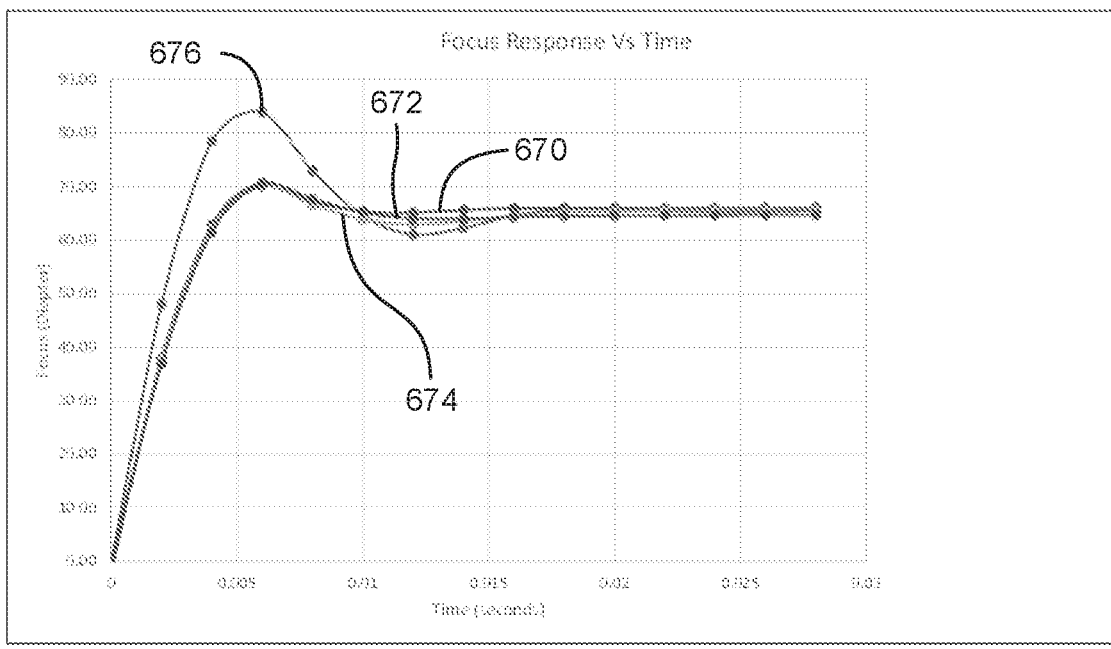
FIG. 19B is a plot showing focus response for example embodiments of liquid lenses.

FIG. 19A shows data for four liquid lenses being driven from 0 degrees of optical tilt to towards the maximum optical tilt angle for the lens geometry. FIG. 19B shows data for the four liquid lenses being driven from a state of no optical power to about 66 diopters of optical power. Line 670 corresponds to a liquid lens having a cone angle of 30 degrees, a narrow diameter of 2 mm, a cone height of 350 microns, and an above-cavity height of 30 microns (cavity height of 380 microns). Line 672 corresponds to a similar liquid lens, but having a cone height of 400 microns (cavity height of 430 microns). Line 674 corresponds to a similar liquid lens, but having a cone height of 450 microns (cavity height of 480 microns). Line 676 corresponds to a similar liquid lens, but having a cone height of 600 microns (cavity height of 630 microns). FIGS. 19A and 19B show that the cone height of 600 microns (line 676) can produce the fastest tilt response time, but the least damping (e.g., which can result in overshoot and/or oscillations). The cone height of 450 microns can produce a slower tilt response time, but more damping (e.g., which can reduce overshoot and/or oscillations). The cone height of 400 microns can produce an even slower tilt response time, but even more damping. The cone height of 350 microns can produce the slowest tilt response time of the four liquid lenses, but the most damping (which can decrease overshoot and reduce oscillations). As can be seen in FIG. 19B, the increased damping from reducing the cavity height can have diminishing returns. Competing factors can be considered when determining the parameters for the liquid lens, such as the cavity height.

Figure 20:
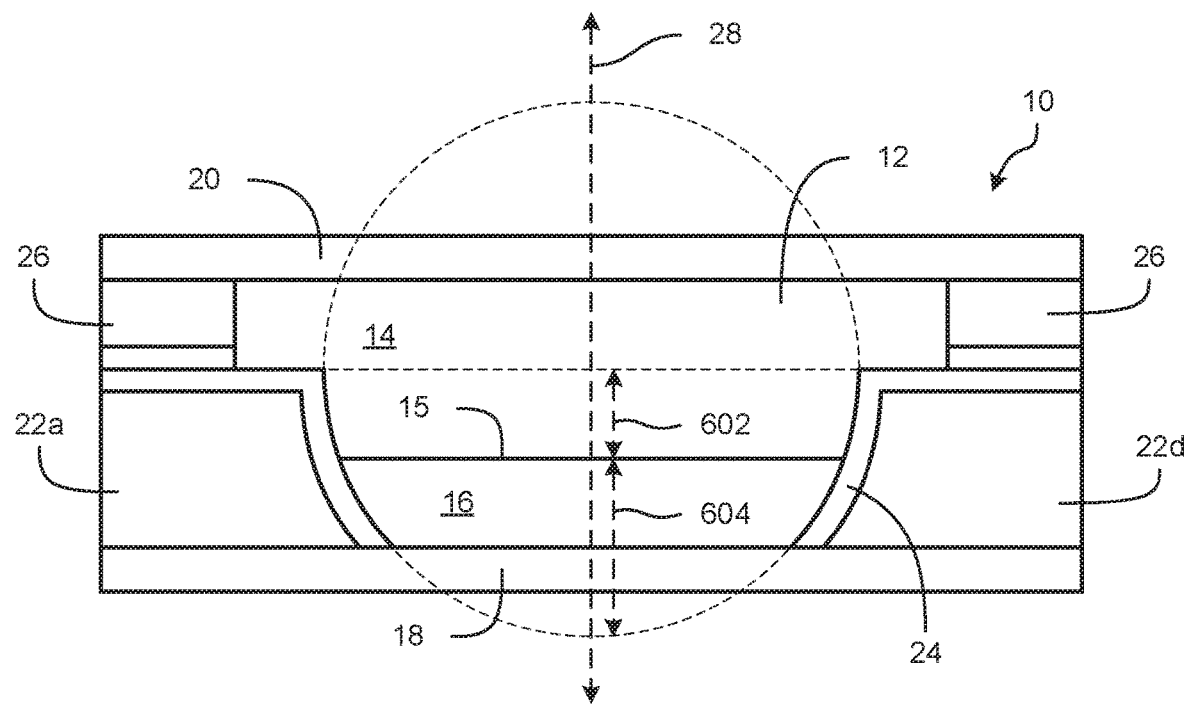
FIG. 20 is a cross-sectional view of an example embodiment of a liquid lens.

FIG. 20 is a cross-sectional view of an example embodiment of a liquid lens 10 where at least a portion of the chamber 12 includes a sidewall that conforms to a portion of a sphere. The truncated cone structure of the liquid lens chamber 12 can have curved sidewalls, which can conform to the shape of a portion of a sphere. The hypothetical sphere defined by the shape of the side wall is shown in dashed lines in FIG. 20. The sidewall can have a width that continuously decreases in size moving from the wide opening to the narrow opening. In some embodiments, the wide opening can align with the center of the hypothetical sphere, as shown in FIG. 20. The center of the hypothetical sphere is shown by a horizontal dashed line in FIG. 20. If the fluid interface 15 were positioned across the center of the sphere, then the edge of the fluid interface 15 would maintain a circular shape when tilted to have an optical tilt angle. However, the fluid interface 15 can be spaced away from the center of the sphere, so that the fluid interface 15 can have room to tilt and/or to move up and down the side walls to vary the focal length and/or focal direction of the liquid lens 10. When the fluid interface 15 is tilted, the edge of the fluid interface 15 can assume a non-circular shape. However, that non-circular shape can be closer to the shape of a circle than would be the case if the liquid lens had a straight sidewall to form the truncated cone structure. Accordingly, the curved sidewall, which can conform to the shape of a portion of a hypothetical sphere, can improve the optical performance of the liquid lens 10.

The closer the fluid interface 15 is positioned to the center of the hypothetical sphere, the more closely the shape of the edge of the tilted fluid interface 15 can approach the shape of a circle, which can improve optical quality. However, the closer the fluid interface 15 is positioned to the center of the hypothetical sphere, the smaller the range of tilt motion the fluid interface would have. Competing factors can be balance to determine the configuration of a liquid lens, such as to meet particular performance parameter. In some embodiments, the fluid interface 15 when flat (e.g., 0 diopters and no optical tilt angle) can be closer to the center of the sphere than to the edge of the sphere that intersects the structural axis 28. In FIG. 20, distance 602 is the distance from the flat fluid interface 15 to the center of the hypothetical sphere, and distance 604 is the distance from the flat fluid interface 15 to the edge of the hypothetical sphere that intersects the structural axis 28 of the liquid lens 10, where the fluid interface 15 is positioned between the center of the hypothetical sphere and the edge of the hypothetical sphere that intersects the structural axis 28 of the liquid lens 10. The ratio of the distance 604 to the distance 602 can be about 5 to 1, about 4 to 1, about 3 to 1, about 2.5 to 1, about 2 to 1, about 1.5 to 1, about 1.25 to 1, about 1.1 to 1, about 1 to 1, about 0.9 to 1, about 0.8 to 1, or about 0.75 to 1, or any values therebetween or any range bounded by any of the above values, although values outside there ranged can be used. The distance 604 can be larger than the distance 602 (or vice versa), such as by 0% (same size), about 5%, about 10%, about 20%, about 30%, about 40%, about 50%, about 75%, about 100%, about 150%, about 200%, about 300%, or any values therebetween, or any ranges of values bounded by any combination of these values, although other values could be used. The distance 602 from the flat fluid interface 15 to the center of the hypothetical sphere can be about 3%, about 5%, about 10%, about 15%, about 20%, about 25%, about 30%, about 35%, about 40%, or about 45% of the radius of the hypothetical sphere, or any values or ranges therebetween.

Figure 21:
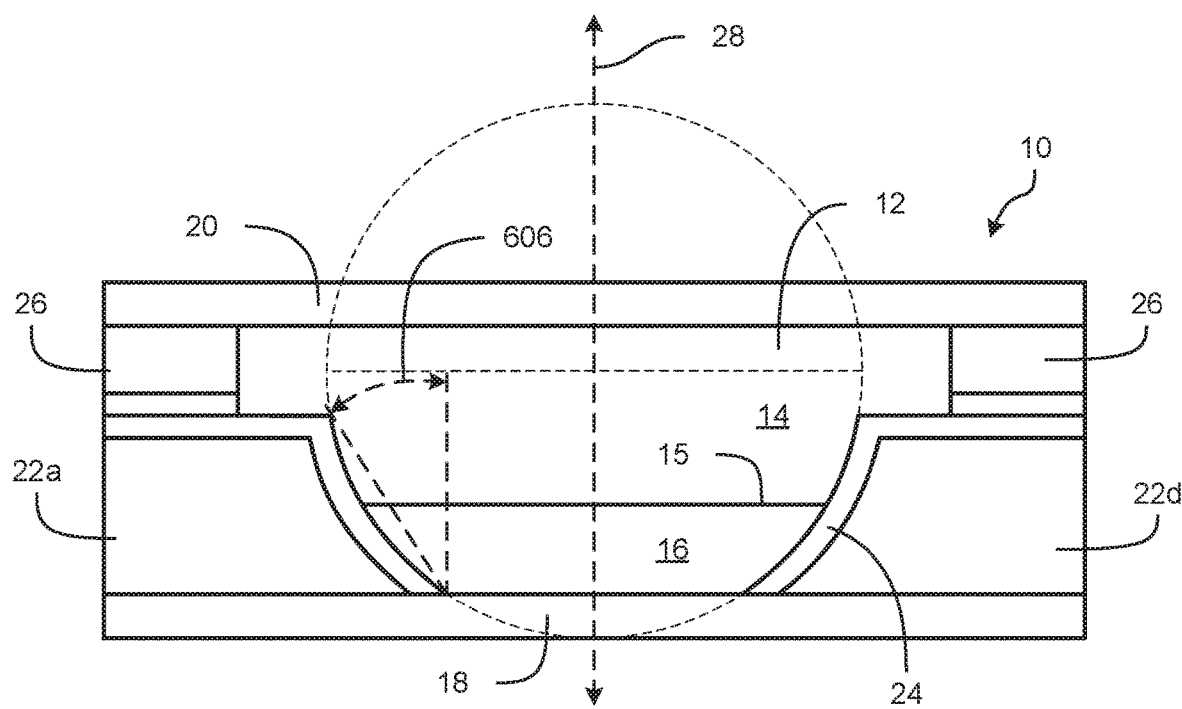
FIG. 21 is a cross-sectional view of an example embodiment of a liquid lens.

In some cases, the area of the sphere that defines the shape of the sidewall can be shifted away from the center of the sphere, as shown for example in FIG. 21, which can have the effect of widening the angle 606 of the sidewall relative to a line parallel to the structural axis 28, which can reduce optical aberrations, similar to widening the cone angle 402, as discussed herein.

Figure 22:
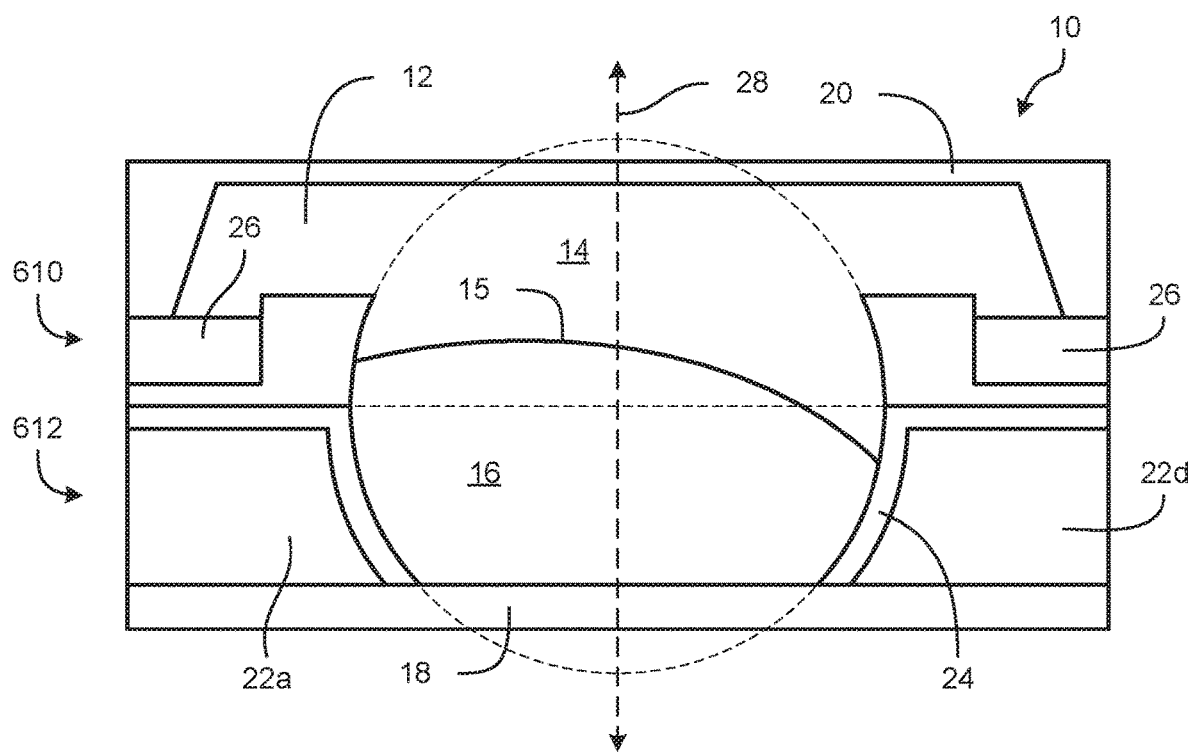
FIG. 22 is a cross-sectional view of an example embodiment of a liquid lens.

FIG. 22 shows an example embodiment of a liquid lens 10 where the fluid interface 15 is positioned at a center of the hypothetical sphere that defines the shape of the sidewall. When the fluid interface 15 is tilted to an optical tilt angle 32, a first side of the fluid interface (e.g., the right side in FIG. 22) can be positioned below the center of the sphere, and a second side (e.g., opposite of the first side) of the fluid interface (e.g., the left side in FIG. 22) can be positioned above the center of the sphere. The liquid lens 10 of FIG. 22 can have sidewalls of the cavity formed by a base portion 612 and an overhang portion 610, which can be coupled together, such as using an adhesive or bonding or a. fabrication process. Many variations are possible, The sidewalls can conform to other curved shapes, such as a toxoid, ellipsoid, ovoid, etc.

Figure 23A:
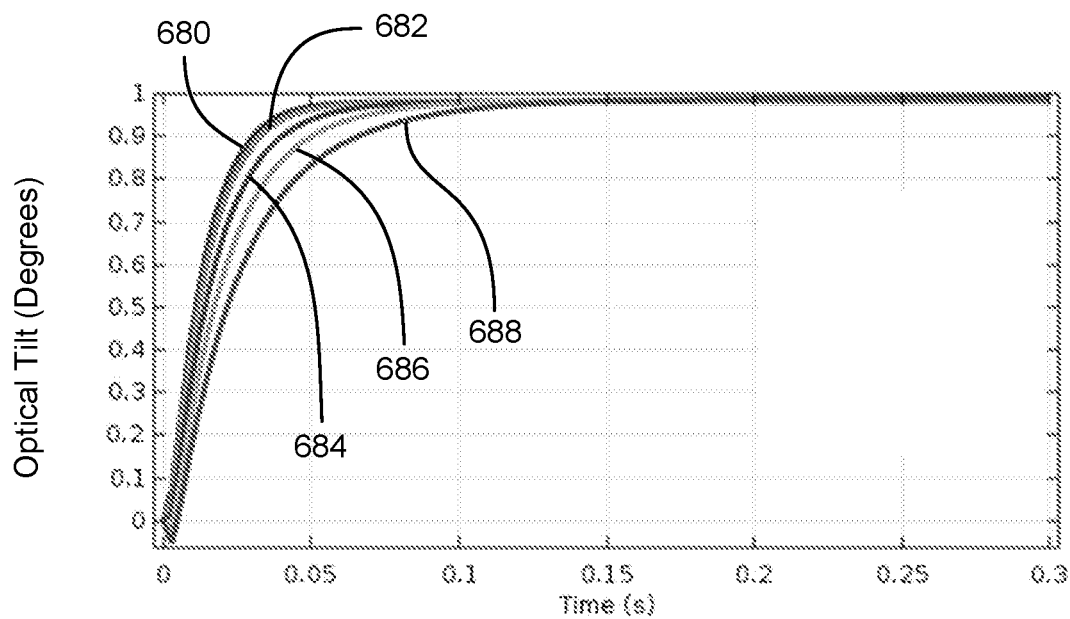
Figure 23B:
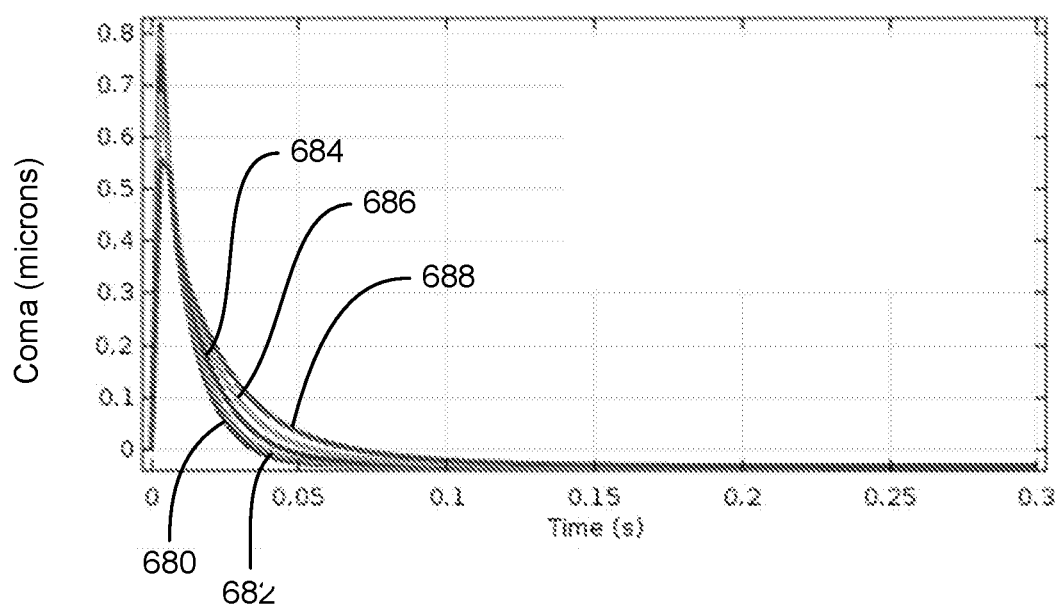
Figure 23C:
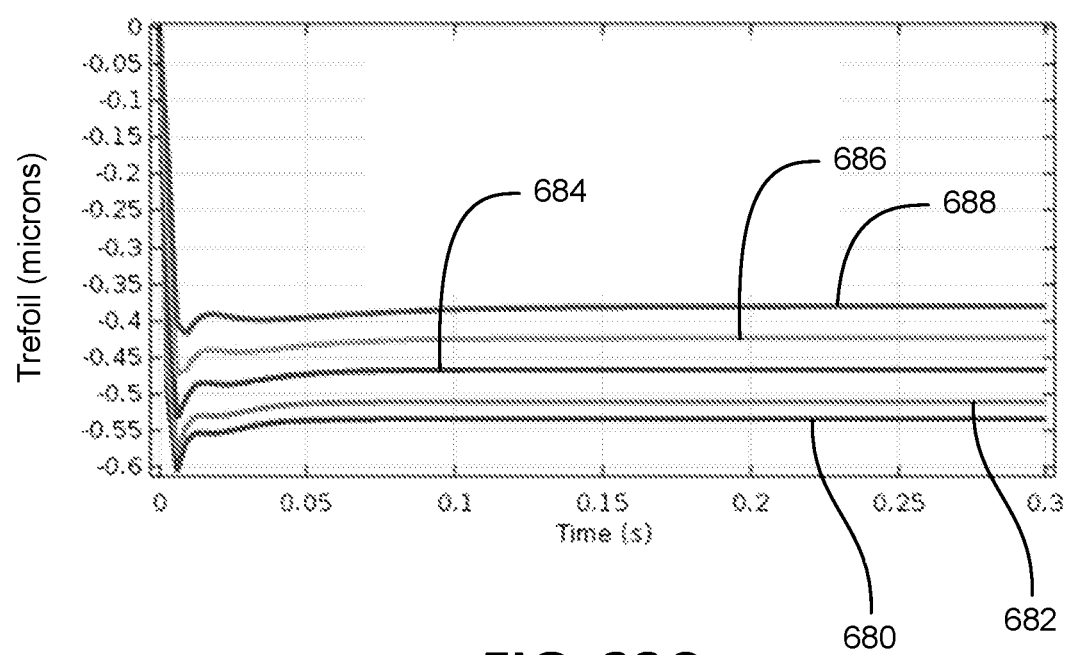

FIGS. 23A-23C are charts showing data from liquid lenses having different cone angles 402. Line 680 corresponds to a cone angle of 5 degrees. Line 682 corresponds to a cone angle of 10 degrees. Line 684 corresponds to a cone angle of 20 degrees. Line 686 corresponds to a cone angle of 30 degrees, Line 688 corresponds to a cone angle of 40 degrees. The liquid lenses of FIGS. 23A to 23C had a narrow diameter of 1.85 mm, a cone height of 500 microns, an above-cone height of 30 microns (e.g., a total cavity height of 530 microns), and a fill ratio of 0.5. In FIGS. 23A to 23C, the liquid lenses were transitioned from a state of no optical tilt (e.g., a flat fluid interface with 0 diopters of optical power) to a state having an optical tilt angle 32 of 1 degree (e.g., in response to a step-function input signal). The difference between the indices of refraction of the first and second fluids was 0.11.

FIG. 23A is similar to FIG. 9A, and shows that the response time of the liquid lens improves as the cone angle is reduced (e.g., to form steeper side walls). For example, the liquid lens of line 680 (e.g., cone angle of 5 degrees) can have a 10% to 90% response time of about 28 ms. The liquid lens of line 682 (e.g., cone angle of 10 degrees) can have a 10% to 90% response time of about 30 ms. The liquid lens of line 684 (e.g., cone angle of 20 degrees) can have a 10% to 90% response time of about 36 ms. The liquid lens of line 686 (e.g., cone angle of 30 degrees) can have a 10% to 90% response time of about 45 ms. The liquid lens of line 688 (e.g., cone angle of 40 degrees) can have a 10% to 90% response time of about 58 ms.

FIG. 23B is similar to FIG. 9B, and shows that overall coma optical aberration over time can be reduced by decreasing the cone angle. For the liquid lens of line 680 (e.g., cone angle of 5 degrees), the coma can settle to 0.1 microns after about 21 ms. For the liquid lens of line 682 (e.g., cone angle of 10 degrees), the coma can settle to 0.1 microns after about 23 ms. For the liquid lens of line 684 (e.g., cone angle of 20 degrees), the coma can settle to 0.1 microns after about 26 ms. For the liquid lens of line 686 (e.g., cone angle of 30 degrees), the coma can settle to 0.1 microns after about 30 ms. For the liquid lens of line 688 (e.g., cone angle of 40 degrees), the coma can settle to 0.1 microns after about 35 ms. The peak coma can be lower for the liquid lenses having a higher cone angle. Although this disclosure should not be limited by theory, it is believed that more of the initial fluid interface deformation that causes the coma is "hidden" outside the optical aperture for the larger fluid interfaces that result from larger cone angles. However, the larger fluid interface settles more slowly, which can result in more coma optical aberration over time.

FIG. 23C is similar to FIG. 9C, and shows that trefoil optical aberration can be reduced by increasing the cone angle. For the liquid lens of line 680 (e.g., cone angle of 5 degrees), the peak trefoil can be about 0.6 microns and can settle (e.g., after about 0.1 seconds) to about 0.53 microns. For the liquid lens of line 682 (e.g., cone angle of 10 degrees), the peak trefoil can be about 0.58 microns and can settle (e.g., after about 0.1 seconds) to about 0.51 microns. For the liquid lens of line 684 (e.g., cone angle of 20 degrees), the peak trefoil can be about 0.53 microns and can settle (e.g., after about 0.1 seconds) to about 0.47 microns. For the liquid lens of line 686 (e.g., cone angle of 30 degrees), the peak trefoil can be about 0.47 microns and can settle (e.g., after about 0.1 seconds) to about 0.425 microns. For the liquid lens of line 688 (e.g., cone angle of 40 degrees), the peak trefoil can be about 0.42 microns and can settle (e.g., after about 0.1 seconds) to about 0.38 microns.

As discussed herein, increasing the cone angle can reduce trefoil optical aberration. However, increasing the cone angle can also have adverse effects on the liquid lens, such as increasing astigmatism, increasing coma, arid/or slowing the response time of the liquid lens. Accordingly, competing factors can be considered when determining the cone angle, and other physical parameters (e.g., cone height, cavity height, aperture size, etc.), for the liquid lens. In some embodiments, a cone angle between about 15 degrees and about 45 degree, between about 20 degrees and about 40 degrees, between about 25 degrees and about 35 degrees, or of about 30 degrees, can be used for a liquid lens having a balance between these competing factors, although other configurations are possible.

Using the principles disclosed herein, a liquid lens 10 can be designed to optimize one or more parameters of the liquid lens 10. For example, a liquid lens 10 can be designed to have a fast response time, while sacrificing some amount of optical quality due to aberrations. A liquid lens can be designed to have high optical quality by reducing optical aberrations), while having a response time that is somewhat slower. A liquid lens can be designed to be less compact having a larger chamber height and/or a larger width) which can enable the liquid lens to have improved optical quality and a relatively fast response time, as compared to other liquid lenses of similar optical quality. In some embodiments, the liquid lens 10 can have a 10% to 90% response time for transitioning from 0 degrees to 0.6 degrees of optical tilt angle (e.g., in response to a step-function input signal that changes suddenly from 0 degrees to 0.6 degrees) of about 400 ms, about 300 ms, about 250 ms, about 200 ms, about 150 ms, about 100 ms, about 75 ms, about 60 ms, about 50 ms, about 40 ms, about 30 ms, about 25 ms, about 20 ms, about 15 ms, about 10 ms, about 5 ms, or any values therebetween, or any range bounded by any combination of these values. The liquid lens 10 can be configured to output light having wavefront error (e.g., maximum or average during an image acquisition time) from optical aberrations, not including piston or tilt (which are not considered error since they are used for changing the focal length and focal direction of the liquid lens 10), as the liquid lens 10 transitions (e.g., in response to a step-function input) from no tilt to 0.6 degrees of optical tilt, or to 90% of 0.6 degrees optical tilt, or from 10% to 90% towards 0.6 degrees of optical tilt, or after 25 ms of the transition, of about 500 nm, about 400 nm, about 350 nm, about 300 nm, about 250 nm, about 200 nm, about 175 nm, about 150 nm, or any values therebetween, or any ranges bounded by any combination of these values, although other values could also be used. The liquid lens 10 can be configured to output light having coma wavefront error (e.g., maximum or average during an image acquisition time) from optical aberrations, not including piston or tilt (which are not considered error since they are used for changing the focal length and focal direction of the liquid lens 10), as the liquid lens 10 transitions (e.g., in response to a step-function input) from no tilt to 0.6 degrees of optical tilt, or to 90% of 0.6 degrees optical tilt, or from 10% to 90% towards 0.6 degrees of optical tilt, or after 25 ms of the transition, of about 500 nm, about 400 nm, about 350 nm, about 300 nm, about 250 nm, about 200 nm, about 175 nm, about 150 nm, about 125 nm, about 100 nm, about 75 nm, about 50 nm, about 40 nm, about 30 nm, about 20 nm, about 10 nm, or any values therebetween, or any ranges bounded by any combination of these values, although other values could also be used. The liquid lens 10 can be configured to output light having trefoil wavefront error (e.g., maximum or average during an image acquisition time) from optical aberrations, not including piston or tilt (which are not considered error since they are used for changing, the focal length and focal direction of the liquid, lens 10), as the liquid lens 10 transitions (e.g., in response to a step-function input) from no tilt to 0.6 degrees of optical tilt, or to 90% of 0.6 degrees optical tilt, or from 10% to 90% towards 0.6 degrees of optical tilt, or after 25 ms of the transition, of about 500 nm, about 400 nm, about 350 nm, about 300 nm, about 250 nm, about 200 nm, about 175 nm, about 150 nm, or any values therebetween, or any ranges bounded by any combination of these values, although other values could also be used.

In some embodiments, a liquid lens can be configured to have less wavefront error when an image sensor having high pixel density is used. For example, an image sensor having pixels with a pixel size of 1 micron was found to have good image quality if the maximum (or average during an image acquisition time) wavefront error from optical aberrations, not including piston or tilt, is 200 nm or less. An image sensor having pixels with a pixel size of 1.2 micron was found to have good image quality if the maximum (or average during an image acquisition time) wavefront error from optical aberrations, not including piston or tilt, is 300 nm or less. An image sensor having pixels with a pixel size of 1.3 micron was found to have good image quality if the maximum (or average during an image acquisition time) wavefront error from optical aberrations, not including piston or tilt, is 375 nm or less. A camera system can use a liquid lens to produce an image having about 200 nm, about 225 nm, about 250 nm, about 275, nm, or about 300 nm of wavefront error per micron of pixel size, or any values or ranges therebetween, although other designs are possible. The liquid lens 10 can have a chamber height of about 100 microns, about 200 microns, about 300 microns, about 400 microns, about 500 microns, about 600 microns, about 700 microns, about 800 microns, about 900 microns, about 1 mm, about 1.1 mm, about 1.2 mm, about 1.3 mm, about 1.4 mm, about 1.5 mm, about 1.7 mm, about 2.0 mm, about 2.5 mm, about 3.0 mm, about 4.0 mm, about 5.0 mm, about 7 mm, about 10 mm, or any values therebetween or any range bounded by any combination of these values, although other values can be used, such as for larger scale liquid lenses, as discussed herein. The liquid lens 10 can have a total height (e.g., including the windows) of about 200 microns, about 300 microns, about 400 microns, about 500 microns, about 600 microns, about 700 microns, about 800 microns, about 900 microns, about 1 mm, about 1.1 mm, about 1.2 mm, about 1.3 mm, about 1.4 mm, about 1.5 mm, about 1.7 mm, about 2.0 mm, about 2.5 mm, about 3.0 mm, about 4.0 mm, about 5.0 mm, about 7 mm, about 10 mm, or any values therebetween or any range bounded by any combination of these values, although other values can be used, such as for larger scale liquid lenses, as discussed herein.

The liquid lens 10 can have a 10% to 90% response time for transitioning from 0 degrees to 0.6 degrees of optical tilt angle (e.g., in response to a step-function input signal) of about 100 ms or faster, and wavefront error from optical aberrations, not including piston or tilt, of about 500 nm or less. The liquid lens 10 can have a 10% to 90% response time for transitioning from 0 degrees to 0.6 degrees of optical tilt angle (e.g., in response to a step-function input signal) of about 60 ms or faster, and wavefront error from optical aberrations, not including piston or tilt, of about 400 nm or less. The liquid lens 10 can have a 10% to 90% response time for transitioning from 0 degrees to 0.6 degrees of optical tilt angle (e.g., in response to a step-function input signal) of about 50 ms or faster, and wavefront error from optical aberrations, not including piston or tilt, of about 300 nm or less. The liquid lens 10 can have a 10% to 90% response time for transitioning from 0 degrees to 0.6 degrees of optical tilt angle (e.g., in response to a step-function input signal) of about 40 ms or faster, and wavefront error from optical aberrations, not including piston or tilt, of about 200 nm or less. The liquid lens 10 can have a 10% to 90% response time for transitioning from 0 degrees to 0.6 degrees of optical tilt angle (e.g., in response to a step-function input signal) of about 20 ms or faster, and wavefront en or from optical aberrations, not including piston or tilt, of about 400 nm or less. The liquid lens 10 can have a 10% to 90% response time for transitioning from 0 degrees to 0.6 degrees of optical tilt angle (e.g., in response to a step-function input signal) of about 15 ms or faster, and wavefront error from optical aberrations, not including piston or tilt, of about 500 nm or less. Other embodiments can include liquid lenses configured to have response times and wavefront error values between these examples. The various embodiments set forth above can have a chamber height of about 5 mm or less, about 4 mm or less, about 3.0 mm or less, or about 2.0 mm or less, or about 1.5 mm or less, or about 1.0 mm or less, or about 0.75 mm or less, or about 0.6 mm or less, or about 0.5 mm or less, or about 0.4 mm or less, or about 0.3 mm or less, or any values or ranges therebetween, although other sizes can also be used.

The principles and advantages described herein can be implemented in various apparatuses. Examples of such apparatuses can include, but are not limited to, consumer electronic products, parts of the consumer electronic products, electronic test equipment, etc. The principles and advantages described herein relate to lenses. Examples products with lenses can include a mobile phone (for example, a smart phone), healthcare monitoring devices, vehicular electronics systems such as automotive electronics systems, webcams, a television, a computer monitor, a computer, a hand-held computer, a tablet computer, a laptop computer, a personal digital assistant (PDA), a refrigerator, a DVD player, a CD player, a digital video recorder (MIR), a camcorder, a camera, a digital camera, a copier, a facsimile machine, a scanner, a multi-functional peripheral device, a wrist watch, a clock, etc. Further, apparatuses can include unfinished products.

In some embodiments, the methods, techniques, microprocessors, and/or controllers described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. The instructions can reside in RAM memory, flash memory, ROM memory, EPROM memory, EEPROM memory, registers, hard disk, a removable disk, a CD-ROM, or any other form of a non-transitory computer-readable storage medium. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

The microprocessor or controllers described herein can be coordinated by operating system software, such as iOS, Android, Chrome OS, Windows XP, Windows Vista, Windows 7, Windows 8, Windows Server, Windows CE, Unix, Linux, SunOS, Solaris. iOS, Blackberry OS, VxWorks, or other compatible operating systems. In other embodiments, the computing device may be controlled by a proprietary operating system. Conventional operating systems control and schedule computer processes for execution, perform memory management, provide file system, networking, 1.10 services, and provide a user interface functionality, such as a graphical user interface ("GUI"), among other things.

The microprocessors and/or controllers described herein may implement the techniques described herein using customized hard-wired logic, one or more ASICs or FPGAs, firmware and/or program logic which causes microprocessors and/or controllers to be a special-purpose machine. According to one embodiment, parts of the techniques disclosed herein are performed by the controller 310 of FIG. 3 in response to executing one or more sequences instructions contained in a memory. Such instructions may he read into the memory from another storage medium, such as storage device. Execution of the sequences of instructions contained in the memory causes the processor or controller to perform the process steps described herein. In alternative embodiments, hard-wired circuitry may be used in place of or in combination with software instructions.

Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry.

Unless the context clearly requires otherwise, throughout the description and the claims, the words "comprise," "comprising," "include," "including," and the like are to he construed in an inclusive sense, as opposed to an exclusive or exhaustive sense; that is to say, in the sense of "including, but not limited to." The words "coupled" or connected," as generally used herein, refer to two or more elements that can be either directly connected, or connected by way of one or more intermediate elements. Additionally, the words "herein," "above," "below," and words of similar import, when used in this application, shall refer to this application as a whole and not to any particular portions of this application. Where the context permits, words in the Detailed Description using the singular or plural number can also include the plural or singular number, respectively. The words "or" in reference to a list of two or more items, is intended to cover all of the following interpretations of the word: any of the items in the list, all of the items in the list, and any combination of the items in the list. All numerical values provided herein are intended to include similar values within a range of measurement error.

Although this disclosure contains certain embodiments and examples, it will be understood by those skilled in the art that the scope extends beyond the specifically disclosed embodiments to other alternative embodiments and/or uses and obvious modifications and equivalents thereof. In addition, while several variations of the embodiments have been shown and described in detail, other modifications will be readily apparent to those of skill in the art based upon this disclosure. It is also contemplated that various combinations or sub-combinations of the specific features and aspects of the embodiments may be made and still fall within the scope of this disclosure. It should be understood that various features and aspects of the disclosed embodiments can be combined with, or substituted for, one another in order to form varying modes of the embodiments. Any methods disclosed herein need not be performed in the order recited. Thus, it is intended that the scope should not be limited by the particular embodiments described above.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. The headings used herein are for the convenience of the reader only and are not meant to limit the scope.

Further, while the devices, systems, and methods described herein may be susceptible to various modifications and alternative forms, specific examples thereof have been shown in the drawings and are herein described in detail. It should be understood, however, that the invention is not to be limited to the particular forms or methods disclosed, but, to the contrary, the invention is to cover all modifications, equivalents, and alternatives falling within the spirit and scope of the various implementations described. Further, the disclosure herein of any particular feature, aspect, method, property, characteristic, quality, attribute, element, or the like in connection with an implementation or embodiment can be used in all other implementations or embodiments set forth herein. Any methods disclosed herein need not be performed in the order recited. The methods disclosed herein may include certain actions taken by a practitioner; however, the methods can also include any third-party instinction of those actions, either expressly or by implication.

The ranges disclosed herein also encompass any and all overlap, sub-ranges, and combinations thereof. Language such as "up to," "at least," "greater than," "less than," "between," and the like includes the number recited. Numbers preceded by a term such as "about" or "approximately"

include the recited numbers and should be interpreted based on the circumstances (e.g., as accurate as reasonably possible under the circumstances, for example ±5%, ±10%, ±15%, etc.). For example, "about 3.5 mm" includes "3.5 mm." Phrases preceded by a term such as "substantially" include the recited phrase and should he interpreted based on the circumstances (e.g., as much as reasonably possible under the circumstances). For example, "substantially constant" includes "constant," Unless stated otherwise, all measurements are at standard conditions including ambient temperature and pressure.

The following claimed:

1. A liquid lens comprising:
   a chamber comprising a truncated cone portion with a side wall having a shape of a truncated cone with a narrow end and a wide end, wherein the narrow end of the truncated cone has a diameter of about 2.0 mm to about 2.5 mm, wherein the wide end of the truncated cone has a diameter of about 2.25 mm to about 2.75 mm, wherein the truncated cone has a cone height of about 300 microns to about 600 microns, and wherein the side wall is angled relative to a structural axis of the truncated cone by a cone angle of about 20 degrees to about 40 degrees;
   a first liquid contained in the chamber;
   a second liquid contained in the chamber, wherein the first liquid and the second liquid are substantially immiscible to form a liquid interface between the first liquid and the second liquid;
   a first window disposed over the wide end of the truncated cone, wherein the first window is spaced apart from the wide end of the truncated cone by an above-cone height of about 100 microns to about 300 microns;
   a second window disposed under the narrow end of the truncated cone, wherein the chamber is disposed between the first window and the second window to transmit light along an optical path that intersects the liquid interface, the first window, and the second window;
   a first insulated electrode disposed at a first quadrant in the liquid lens and insulated from the first and second liquids;
   a second insulated electrode disposed at a second quadrant in the liquid lens and insulated from the first and second liquids;
   a third insulated electrode disposed at a third quadrant in the liquid lens and insulated from the first and second liquids;
   a fourth insulated electrode disposed at a fourth quadrant in the liquid lens and insulated from the first and second liquids; and
   a common electrode in electrical communication with the first liquid, wherein a position of the liquid interface is based at least in part on voltages applied to the common electrode and the insulated electrodes, and wherein the liquid interface tilts in response to different voltages applied between the insulated electrodes so that an optical axis of the liquid interface is angled relative to the structural axis by an optical tilt angle,
   wherein the liquid lens has a 10% to 90% response time of about 100 ms or less for a transition from an optical tilt angle of 0 degrees to an optical tilt angle of 0.6 degrees in response to a step function input.

2. The liquid lens of claim 1, wherein the liquid lens has a 10% to 90% response time of about 75 ms or less for a transition from an optical tilt angle of 0 degrees to an optical tilt angle of 0.6 degrees in response to a step function input.

3. The liquid lens of claim 1, wherein the liquid lens has a 10% to 90% response time of at least about 25 ms for a transition from an optical tilt angle of 0 degrees to an optical tilt angle of 0.6 degrees in response to a step function input.

4. The liquid lens of claim 1, wherein the liquid lens outputs light with optical aberrations having a total wavefront error of about 500 nm or less as the liquid interface moves from 0 degrees of optical tilt to 0.6 degrees of optical tilt in response to a step function input.

5. The liquid lens of claim 1, wherein the liquid lens outputs light with optical aberrations having a total wavefront error of about 400 nm or less as the liquid interface moves from 0 degrees of optical tilt to 0.6 degrees of optical tilt in response to a step function input.

6. The liquid lens of claim 4, wherein the liquid lens outputs light with optical aberrations having a total wavefront error of at least about 250 nm as the liquid interface moves from 0 degrees of optical tilt to 0.6 degrees of optical tilt in response to a step function input.

7. The liquid lens of claim 1, wherein the liquid lens outputs light with optical aberrations having a total wavefront error of about 400 nm or less after 25 ms as the liquid interface moves from 0 degrees of optical tilt to 0.6 degrees of optical tilt in response to a step function input.

8. The liquid lens of claim 1, wherein the liquid lens outputs light with optical aberrations having a total wavefront error of about 350 nm or less after 25 ms as the liquid interface moves from 0 degrees of optical tilt to 0.6 degrees of optical tilt in response to a step function input.

9. The liquid lens of claim 7, wherein the liquid lens outputs light with optical aberrations having a total wavefront error of at least about 200 nm after 25 ms as the liquid interface moves from 0 degrees of optical tilt to 0.6 degrees of optical tilt in response to a step function input.

10. The liquid lens of claim 1, wherein the liquid lens outputs light with coma optical aberration of about 150 nm or less after 25 ms as the liquid interface moves from 0 degrees of optical tilt to 0.6 degrees of optical tilt in response to a step function input.

11. The liquid lens of claim 10, wherein the liquid lens outputs light with coma optical aberration of at least about 50 nm after 25 ms as the liquid interface moves from 0 degrees of optical tilt to 0.6 degrees of optical tilt in response to a step function input.

12. The liquid lens of claim 1, wherein the liquid lens outputs light with trefoil optical aberration of about 400 nm or less after 25 ms as the liquid interface moves from 0 degrees of optical tilt to 0.6 degrees of optical tilt in response to a step function input.

13. The liquid lens of claim 12, wherein the liquid lens outputs light with trefoil optical aberration of at least about 100 nm or less after 25 ms as the liquid interface moves from 0 degrees of optical tilt to 0.6 degrees of optical tilt in response to a step function input.

14. The liquid lens of claim 1, wherein the first liquid has a first liquid height and the second liquid has a second liquid height when the liquid interface is flat, and wherein a ratio of the first liquid height to the second liquid height is about 1.5 to about 2.

15. The liquid lens of claim 1, wherein a ratio between an active portion of the liquid interface and an inactive portion of the liquid interface is between about 2 to 1 and about 4 to 1 when the liquid interface is flat.

16. The liquid lens of claim 1, wherein a ratio of a diameter of the liquid interface at 0 diopters and no optical tilt angle to the diameter of the narrow end of the truncated cone is about 1.03 to about 1.15.

17. A liquid lens comprising:
a chamber comprising a truncated cone portion with a side wall having a shape of a truncated cone with a narrow end and a wide end, wherein the narrow end of the truncated cone has a diameter of about 2.0 mm to about 2.5 mm, wherein the wide end of the truncated cone has a diameter of about 2.25 mm to about 2.75 mm, wherein the truncated cone has a cone height of about 300 microns to about 600 microns, and wherein the side wall is angled relative to a structural axis of the truncated cone by a cone angle of about 20 degrees to about 40 degrees;
a first liquid contained in the chamber;
a second liquid contained in the chamber, wherein the first liquid and the second liquid are substantially immiscible to form a liquid interface between the first liquid and the second liquid;
a first window disposed over the wide end of the truncated cone, wherein the first window is spaced apart from the wide end of the truncated cone by an above-cone height of about 100 microns to about 300 microns;
a second window disposed under the narrow end of the truncated cone, wherein the chamber is disposed between the first window and the second window to transmit light along an optical path that intersects the liquid interface, the first window, and the second window;
a first insulated electrode disposed at a first quadrant in the liquid lens and insulated from the first and second liquids;
a second insulated electrode disposed at a second quadrant in the liquid lens and insulated from the first and second liquids;
a third insulated electrode disposed at a third quadrant in the liquid lens and insulated from the first and second liquids;
a fourth insulated electrode disposed at a fourth quadrant in the liquid lens and insulated from the first and second liquids; and
a common electrode in electrical communication with the first liquid, wherein a position of the liquid interface is based at least in part on voltages applied to the common electrode and the insulated electrodes, and wherein the liquid interface tilts in response to different voltages applied between the insulated electrodes so that an optical axis of the liquid interface is angled relative to the structural axis by an optical tilt angle,
wherein the liquid lens has a 10% to 90% response time of about 75 ms or less for a transition from an optical tilt angle of 0 degrees to an optical tilt angle of 0.6 degrees in response to a step function input.

18. A liquid lens comprising:
a chamber comprising a truncated cone portion with a side wall having a shape of a truncated cone with a narrow end and a wide end, wherein the narrow end of the truncated cone has a diameter of about 2.0 mm to about 2.5 mm, wherein the wide end of the truncated cone has a diameter of about 2.25 mm to about 2.75 mm, wherein the truncated cone has a cone height of about 300 microns to about 600 microns, and wherein the side wall is angled relative to a structural axis of the truncated cone by a cone angle of about 20 degrees to about 40 degrees;
a first liquid contained in the chamber;
a second liquid contained in the chamber, wherein the first liquid and the second liquid are substantially immiscible to form a liquid interface between the first liquid and the second liquid;
a first window disposed over the wide end of the truncated cone, wherein the first window is spaced apart from the wide end of the truncated cone by an above-cone height of about 100 microns to about 300 microns;
a second window disposed under the narrow end of the truncated cone, wherein the chamber is disposed between the first window and the second window to transmit light along an optical path that intersects the liquid interface, the first window, and the second window;
a first insulated electrode disposed at a first quadrant in the liquid lens and insulated from the first and second liquids;
a second insulated electrode disposed at a second quadrant in the liquid lens and insulated from the first and second liquids;
a third insulated electrode disposed at a third quadrant in the liquid lens and insulated from the first and second liquids;
a fourth insulated electrode disposed at a fourth quadrant in the liquid lens and insulated from the first and second liquids; and
a common electrode in electrical communication with the first liquid, wherein a position of the liquid interface is based at least in part on voltages applied to the common electrode and the insulated electrodes, and wherein the liquid interface tilts in response to different voltages applied between the insulated electrodes so that an optical axis of the liquid interface is angled relative to the structural axis by an optical tilt angle,
wherein the liquid lens has a 10% to 90% response time of at least about 25 ms for a transition from an optical tilt angle of 0 degrees to an optical tilt angle of 0.6 degrees in response to a step function input.

* * * * *

UNITED STATES PATENT AND TRADEMARK OFFICE
CERTIFICATE OF CORRECTION

| | |
|---|---|
| PATENT NO. | : 11,762,189 B2 |
| APPLICATION NO. | : 16/642693 |
| DATED | : September 19, 2023 |
| INVENTOR(S) | : Raymond Miller Karam |

It is certified that error appears in the above-identified patent and that said Letters Patent is hereby corrected as shown below:

In the Specification

In Column 1, Line 16, delete "1." and insert -- 1, --.

Signed and Sealed this
Thirteenth Day of February, 2024

Katherine Kelly Vidal
*Director of the United States Patent and Trademark Office*